US006868408B1

(12) United States Patent
Rosen

(10) Patent No.: US 6,868,408 B1
(45) Date of Patent: Mar. 15, 2005

(54) SECURITY SYSTEMS AND METHODS APPLICABLE TO AN ELECTRONIC MONETARY SYSTEM

(75) Inventor: Sholom S. Rosen, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/567,156

(22) Filed: May 9, 2000

Related U.S. Application Data

(63) Continuation of application No. 08/994,256, filed on Dec. 19, 1997, which is a division of application No. 08/427,287, filed on Apr. 21, 1995, now Pat. No. 5,799,087, which is a continuation-in-part of application No. 08/234,461, filed on Apr. 28, 1994, now Pat. No. 5,557,518.

(51) Int. Cl.[7] .............................................. G06F 17/60

(52) U.S. Cl. ..................... 705/64; 713/156; 713/171; 705/50; 380/228

(58) Field of Search ................................. 713/156, 168, 713/171, 173, 175, 182, 194, 200, 201; 380/228, 232, 239, 259, 255, 260; 705/41, 17, 62, 64, 18, 21, 50; 902/2, 26; 340/825.31, 825.34

(56) References Cited

U.S. PATENT DOCUMENTS

| | | |
|---|---|---|
| 3,559,175 A | 1/1971 | Pomeroy |
| 3,573,747 A | 4/1971 | Adams et al. |
| 3,749,887 A | 7/1973 | Guiliani |
| 3,852,571 A | 12/1974 | Hall et al. |
| 3,906,460 A | 9/1975 | Halpern |
| 3,932,730 A | 1/1976 | Ambrosio |
| 3,934,122 A | 1/1976 | Riccitelli |
| 3,937,925 A | 2/1976 | Boothroyd |

(List continued on next page.)

FOREIGN PATENT DOCUMENTS

| | | |
|---|---|---|
| AU | B-51249-90 | 9/1990 |
| EP | 0 172 670 A2 | 2/1986 |
| EP | 391261 B1 | 2/1986 |

(List continued on next page.)

OTHER PUBLICATIONS

"The Digital Distributed System Security Architecture", Morrie Gasser, et al., Nat'l Inst. of Standards & Tech., 12th Nat'l Computer Security Conference, Oct. 10–13, 1989.

(List continued on next page.)

*Primary Examiner*—Pierre E Elisca
(74) *Attorney, Agent, or Firm*—Morgan & Finnegan LLP

(57) ABSTRACT

An electronic-monetary system having (1) banks or financial institutions that are coupled to a money generator device for generating and issuing to subscribing customers electronic money including electronic currency backed by demand deposits and electronic credit authorizations; (2) correspondent banks that accept and distribute the electronic money; (3) a plurality of transaction devices that are used by subscribers for storing electronic money, for performing money transactions with the on-line systems of the participating banks or for exchanging electronic money with other like transaction devices in off-line transactions; (4) teller devices, associated with the issuing and correspondent banks, for process handling and interfacing the transaction devices to the issuing and correspondent banks, and for interfacing between the issuing and correspondent banks themselves; (5) a clearing bank for balancing the electronic money accounts of the different issuing banks; (6) a data communications network for providing communications services to all components of the system; and (7) a security arrangement for maintaining the integrity of the system, and for detecting counterfeiting and tampering within the system. This system includes a customer service module which handles lost money claims and links accounts to money modules for providing bank access.

40 Claims, 54 Drawing Sheets

U.S. PATENT DOCUMENTS

| | | |
|---|---|---|
| 3,971,916 A | 7/1976 | Moreno |
| 4,001,550 A | 1/1977 | Schatz |
| 4,007,355 A | 2/1977 | Moreno |
| 4,053,735 A | 10/1977 | Foudos |
| 4,120,452 A | 10/1978 | Kimura et al. |
| 4,172,552 A | 10/1979 | Case et al. |
| 4,179,064 A | 12/1979 | Yoshioka et al. |
| 4,214,230 A | 7/1980 | Fak et al. |
| 4,218,582 A | 8/1980 | Hellman et al. |
| 4,224,666 A | 9/1980 | Giraud |
| 4,256,955 A | 3/1981 | Giraud et al. |
| 4,270,042 A | 5/1981 | Case |
| 4,277,837 A | 7/1981 | Stuckert |
| 4,302,810 A | 11/1981 | Bouricius et al. |
| 4,305,059 A | 12/1981 | Benton |
| 4,320,387 A | 3/1982 | Powell |
| 4,321,672 A | 3/1982 | Braun et al. |
| 4,341,951 A | 7/1982 | Benton |
| 4,404,649 A | 9/1983 | Nunley et al. |
| 4,405,829 A | 9/1983 | Rivest et al. |
| 4,442,345 A | 4/1984 | Mollier et al. |
| 4,443,027 A | 4/1984 | McNeely et al. |
| 4,453,074 A | 6/1984 | Weinstein |
| 4,454,414 A | 6/1984 | Benton |
| 4,460,965 A | 7/1984 | Trehn et al. |
| 4,467,139 A | 8/1984 | Mollier |
| 4,498,000 A | 2/1985 | Decavele et al. |
| 4,511,970 A | 4/1985 | Okano et al. |
| 4,523,087 A | 6/1985 | Benton |
| 4,523,297 A | 6/1985 | Ugon et al. |
| 4,529,870 A | 7/1985 | Chaum |
| 4,536,647 A | 8/1985 | Atalla et al. |
| 4,549,075 A | 10/1985 | Saada et al. |
| 4,575,621 A | 3/1986 | Dreifus |
| 4,597,046 A | 6/1986 | Musmanno et al. |
| 4,614,861 A | 9/1986 | Pavlov et al. |
| 4,625,276 A | 11/1986 | Benton et al. |
| 4,629,872 A | 12/1986 | Hallberg |
| 4,630,201 A | 12/1986 | White |
| 4,634,845 A | 1/1987 | Hale et al. |
| 4,642,768 A | 2/1987 | Roberts |
| 4,650,978 A | 3/1987 | Hudson et al. |
| 4,667,088 A | 5/1987 | Kramer et al. |
| 4,673,802 A | 6/1987 | Ohmae et al. |
| 4,689,478 A | 8/1987 | Hale et al. |
| 4,692,601 A | 9/1987 | Nakano |
| 4,697,073 A | 9/1987 | Hara |
| 4,705,211 A | 11/1987 | Honda et al. |
| 4,722,055 A | 1/1988 | Roberts |
| 4,723,284 A | 2/1988 | Munck et al. |
| 4,727,243 A | 2/1988 | Savar |
| 4,727,244 A | 2/1988 | Nakano et al. |
| 4,734,568 A | 3/1988 | Watanabe |
| 4,736,094 A | 4/1988 | Yoshida |
| 4,742,215 A | 5/1988 | Daughters et al. |
| 4,748,668 A | 5/1988 | Shamir et al. |
| 4,750,119 A | 6/1988 | Cohen et al. |
| 4,751,640 A | 6/1988 | Lucas et al. |
| 4,752,676 A | 6/1988 | Leonard et al. |
| 4,752,877 A | 6/1988 | Roberts et al. |
| 4,757,185 A | 7/1988 | Onishi |
| 4,759,064 A | 7/1988 | Chaum |
| 4,766,293 A | 8/1988 | Boston |
| 4,766,539 A | 8/1988 | Fox |
| 4,767,920 A | 8/1988 | Kitta et al. |
| 4,799,156 A | 1/1989 | Shavit et al. |
| 4,822,984 A | 4/1989 | Remery et al. |
| 4,823,264 A | 4/1989 | Deming |
| 4,825,052 A | 4/1989 | Chemin et al. |
| 4,827,112 A | 5/1989 | Yoshino et al. |
| 4,837,422 A | 6/1989 | Dethloff et al. |
| 4,839,504 A | 6/1989 | Nakano |
| 4,864,109 A | 9/1989 | Minematsu et al. |
| 4,877,947 A | 10/1989 | Mori |
| 4,879,747 A | 11/1989 | Leighton et al. |
| 4,906,828 A | 3/1990 | Halpern |
| 4,914,698 A | 4/1990 | Chaum |
| 4,926,480 A | 5/1990 | Chaum |
| 4,941,173 A | 7/1990 | Boule et al. |
| 4,949,380 A | 8/1990 | Chaum |
| 4,959,788 A | 9/1990 | Nagata et al. |
| 4,962,530 A | 10/1990 | Cairns |
| 4,964,164 A | 10/1990 | Fiat |
| 4,968,873 A | 11/1990 | Dethloff et al. |
| 4,973,828 A | 11/1990 | Naruse et al. |
| 4,977,595 A | 12/1990 | Ohta et al. |
| 4,985,833 A | 1/1991 | Oncken |
| 4,987,593 A | 1/1991 | Chaum |
| 4,991,210 A | 2/1991 | Chaum |
| 4,992,646 A | 2/1991 | Collin |
| 4,995,081 A | 2/1991 | Leighton et al. |
| 4,996,711 A | 2/1991 | Chaum |
| 5,012,076 A | 4/1991 | Yoshida |
| 5,128,997 A | 7/1992 | Pailles et al. |
| 5,162,989 A | 11/1992 | Matsuda |
| 5,175,416 A | 12/1992 | Mansvelt et al. |
| 5,191,193 A | 3/1993 | Le Roux |
| 5,220,501 A | 6/1993 | Lawler et al. |
| 5,221,838 A | 6/1993 | Gutman et al. |
| 5,224,162 A | 6/1993 | Okamoto et al. |
| 5,224,163 A * | 6/1993 | Gasser et al. ................. 380/23 |
| 5,231,569 A | 7/1993 | Myatt et al. |
| 5,305,200 A | 4/1994 | Hartheimer et al. |
| 5,305,383 A | 4/1994 | Guillou et al. |
| 5,351,293 A * | 9/1994 | Michener et al. ............. 380/21 |
| 5,379,344 A | 1/1995 | Larsson et al. |
| 5,396,558 A | 3/1995 | Ishiguro et al. |
| 5,418,854 A | 5/1995 | Kaufman et al. |
| 5,453,601 A * | 9/1995 | Rosen ........................ 235/379 |
| 5,455,407 A * | 10/1995 | Rosen ........................ 235/380 |
| 5,557,518 A * | 9/1996 | Rosen ........................ 364/408 |
| 5,799,087 A * | 8/1998 | Rosen ........................ 380/24 |
| 5,920,629 A * | 7/1999 | Rosen ........................ 380/24 |
| 5,953,423 A * | 9/1999 | Rosen ........................ 380/24 |
| 5,963,648 A * | 10/1999 | Rosen ........................ 380/24 |
| 6,047,067 A * | 4/2000 | Rosen ........................ 380/24 |

FOREIGN PATENT DOCUMENTS

| | | |
|---|---|---|
| EP | 0 346 180 B1 | 12/1989 |
| EP | 0 416 916 A3 | 3/1991 |
| EP | 0 416 916 A2 | 3/1991 |
| EP | 417 007 A1 | 3/1991 |
| EP | 0 421 808 A2 | 4/1991 |
| EP | 0 500 956 A1 | 9/1992 |
| EP | 549070 A1 | 6/1993 |
| EP | 0 621 570 A1 | 10/1994 |
| FR | 0 645 773 A1 | 9/1994 |
| JP | 54-017098 | 2/1979 |
| JP | 54-119859 | 9/1979 |
| JP | 57-094877 | 6/1982 |
| JP | 58-57784 | 12/1983 |
| JP | 59-151280 | 8/1984 |
| JP | 60-008978 A | 1/1985 |
| JP | 60-146361 A | 8/1985 |
| JP | 60-196874 A | 10/1985 |
| JP | 60-198683 | 10/1985 |
| JP | 61-043034 A | 3/1986 |
| JP | 61-052793 | 3/1986 |
| JP | 61-94177 | 5/1986 |
| JP | 61-166680 | 7/1986 |
| JP | 61-38519 | 8/1986 |

| | | |
|---|---|---|
| JP | 61-233822 | 10/1986 |
| JP | 62-025372 | 2/1987 |
| JP | 62-080761 A | 4/1987 |
| JP | 62-254248 A | 11/1987 |
| JP | 62-275784 | 11/1987 |
| JP | 62-293469 A | 12/1987 |
| JP | 63-32658 | 2/1988 |
| JP | 63-39099 | 2/1988 |
| JP | 63-44274 | 2/1988 |
| JP | 63-168771 A | 7/1988 |
| JP | 63-204495 | 8/1988 |
| JP | 63-245591 | 10/1988 |
| JP | 63-257089 | 10/1988 |
| JP | 63-257885 A | 10/1988 |
| JP | 63-308669 A | 12/1988 |
| JP | 01-290096 A | 11/1989 |
| JP | 2-1049 | 1/1990 |
| JP | 2-116966 | 5/1990 |
| JP | 3-73065 | 3/1991 |
| JP | 3-92966 | 4/1991 |
| JP | 04-80866 A | 3/1992 |
| JP | 4-227567 | 8/1992 |
| JP | 5-504643 | 7/1993 |
| JP | 6-503913 | 4/1994 |
| JP | 411296711 A * | 10/1999 |
| WO | WO 8 303 018 | 9/1983 |
| WO | WO 9 116 691 | 10/1991 |
| WO | WO 9 117 528 | 11/1991 |
| WO | WO 9 308 545 | 4/1993 |
| WO | WO 9422116 | 9/1994 |

OTHER PUBLICATIONS

"SPX: Global Authentication Using Public Key Certificates", Joseph J. Tardo and Kannan Alagappan, IEEE, CH2986–8/91 (232–243).

"Practical Uses of Synchronized Clocks in Distributed Systems", Barbara Liskov, 10th Annual ACM Symposium on Principles of Distributed Computing, Aug. 19–21, 1991.

"An Architecture for Practical Delegation in a Distributed System", Morrie Gasser, Ellen McDermott, IEEE Computer Society Symposium on *Research in Security and Privacy*, May 7–9, 1990.

"Hybrid Concurrency Control for Abstract Data Types", Maurice P. Herlihy, William E. Weihl, 7th ACM SIGACT–SIGMOD–SIGART Symposium on *Principles of Database Systems*, Mar. 21–23, 1988.

Data Communications Networks Directory (vol. VIII, Fascicle VIII.8) Recommendations X.500–X.521;, The Int'l Telegraph & Telephone Consultative Committee, IX Plenary Assembly, Melbourne, Nov. 14–25, 1988.

Security For Computer Networks (*An Introduction to Data Security in Teleprocessing and Electronic Funds Transfer*) (1984) D.W. Davies and W.L. Price, Ch. 6 (p. 145–146), Ch. 10, Glossary.

*MiraiCard Report* (*Future Card*), Dec. 1988, IC Card Reduction–to–Practice Study Group; with English language translation.

*Financial Information System, Extra No. 3*, May 26, 1986, Financial Information System Center (FISC); with partial English language translation.

*Study Aids for Bills and Checks,* Makoto Tairo, Jun. 10, 1990, Japan Business Publisher: with English language translation.

1984 International Zurich Seminar On Digital Communications, *Electronic Wallet,* S. Even. O. Goldreich, Y. Yacobi, 1984.

Privacy Protected Payments Unconditional Payer and/or Payee Untraceability, D. Chaum, *Smart Card 2000,* 1989.

Security Without Identification: Card Computers To Make Big Brother Obsolete, D. Chaum, 1987.

Untraceable Electronic Cash, D. Chaum, et al.

*New Banking Practice Overall Course—6: Foreign Exchange,* Yuzo Wajima et al., Jul. 7, 1987, Finance Study Group Co.; partial translation.

*Nikkei Datapro/Financial System,* Oct. 1989, Nikkei Business Publication, Inc.,KS3–210–101 to 217; partial translation.

*Total Banking System,* Sumio Isizaki et al., Sep. 30, 1972, Industry Book; partial translation.

*Dictionary of Financial and Economic Terminology,* Yoshino et al., Jan. 10, 1990, Economic Acts Study Group (translation of p. 165).

*New Saitama Bank's Strategies on International ATMs,* Oct. 17, 1985, Economic Acts Study Group; English language translation.

*Facom OS IV/F4 MSP, APFS/X Manual SBAL/X External Net Version,* Fujitsu, Oct. 1988; translation of Figure 1.7.

*Dictionary of Financial Terminology,* Toshio Ono et al., Mar. 10, 1987; Economic Acts Study Group (translation of p. 125).

*New Era's Money/IC Card,* IC Card Study Group, Mar. 8, 1986; Finance Study Group Co. (Japanese language).

*Computer Banking Re: Third ON Overview and Information Strategies,* Sumio Isizaki, Jan. 20, 1987; Finance Study Group Co. (Japanese language).

"*Electronic Money" System Proposal—To Realize Cashless Society*—, Fujitsu System Comprehensive Laboratory, Apr. 1991; English translation.

*Proposal of an Electronic Funds Transfer Method Considering User's Privacy,* Hirotsugu Kinoshita and Shigeo Tsujii, The Transactions of the Institute of Electronics, Information and Communication Engineers, vol. J70–D No. 12, Dec. 1987; with English translation.

*Cashing Service Transaction Rules for Banks In Tokyo,* Jan. 1984 (Japanese language).

*Financial Network Manual,* Tomoi Fujii, Aug. 10, 1988; Financial Information System Center Co; partial translation.

*Computer Banking No. 13,* Sumio Ishizaki, 1987; Modern Sales Co.; translation of Fig. 4.1.

*An Introduction to the Chekcs Act,* Tsuneo Ko, Jul. 30, 1967, Yuhikaku Sosho; partial translation.

*Latest Checking Practice,* Hitoshi Horiuchi, Jul. 10, 1982; Consultant Co.; English translation.

Thomas M. Attwood, *The case for object–oriented databases,* IEEE Spectrum, Feb. 1991.

David Chaum, *Online Cash Checks,* Centre for Mathematics and Computer Science, Amsterdam.

*Common Sense in Bills and Checks,* Toshio Inoue, Jan. 20, 1987, Nikkei Bunko; partial English translation p. 150.

*Foreign Exchange Basic,* Masanori Sikiba et al, Sep. 20, 1991, Economic Acts Study Group; partial translation p. 92.

*Smart Cards—The Ultimate Personal Computer,* Jerome Svigals, 1985, Macmillan Publishing Co., NY, NY, pp. 1–20, 71–92.

*Zero Knowledge Interactive Proof and Electronic Cash,* Kazuo Ohta et al., Mar. 28, 1990, The Institute of Electronics, Information and Communication Engineers: English translation.

*Application Modes and Operation Controls of EPS 1100 Integrated Communication System Series,* Jun. 1987, Nihon Univac (Japanese language).
*Basic Plant for Third System of Personal Credit Information (Draft) (Addition and Change of Register Information),* May 1991, Nihon NCR Inc. (Japanese language).
*CAFIS Customer–Basis Agency Sales Business Services Specification (Bank POS Business Version):* First Edition, Aug. 1989, NTT Data Communications Co., Ltd. (Japanese language).
*Series 1100, Real Time System TMS 1100 Manual,* Mar. 1990, UNISYS; translated Fig. 13–2.
*Series 2200/1100, Real Time System, BOS 11 Manual,* Jun. 1989, UNISYS: English translation.
*Bank–of–Japan Financial Network System Application Details (Foreign Exchange Yen Payment Related Business),* Oct. 1987, Bank of Japan; partial translation.
*The Bills and Checks Acts,* Takeo Suzuki, Aug. 10, 1974, Yuhikaku (Japanese language) with partial translation of p. 361–362.
*A Distributed Electronic Bill System,* Takashima Youichi et al, Denshi Joho Tsushin Gakkai Gijutsu Kenkyu Hokoku, vol 87, No. 120, 1987; English Translation.
*Study Aid for IC Cards,* Yasuo Hosogai et al., May 30, 1986, Japan Business Publisher; partial translation.
*Banking Business Overall Course,* Teruo Miyaji, May 21, 1980, Finance Study Group (Japanese language).
*Guidelines For Card Society,* Sep. 1990, Printing Bureau of Ministry of Finance; partial translation.
*Operating System Basic,* NEC Information Processing Education Dept., Apr. 20, 1993, Japan Efficiency Assoc. Management Center; partial translation.
*Prospects For IC Card Applications,* May 28, 1991, Yano Economy Laboratory (Japanese language).
*Series 2200/1100, Total On–Line Banking System Fast 1100 Manual/Applicable Business Version,* Apr. 1989, UNISYS (Japanese language).
*Applicable Business and Record Formats,* Jan. 1984, National Banking Association (Japanese language).
*Notification No. 826 Re: On–Line Fund Transfer Transactions Through Communication Line Between Financial Institutions Computers and Customer's Terminals,* Apr. 7, 1989, Banking Bureau of Ministry of Finance (Japanese language).
*Basic Design of Bank POS System (Draft No. O),* Jan. 1985, NTT (Japanese language).
ANSER—Function Adding Services Specification ver. VIII, Jun. 1989, NTT Data Communication Co., Ltd. (Japanese language).
*CAFIS—Design of Connection Conditions (Bank POS Business Version)* Ver. 2, Feb. 1989, NTT Data Communication Co., Ltd. (Japanese language).
*CAFIS—Design of Connection Conditions (Bank POS Business Version)* Ver. 1, Dec. 1989, NTT Data Communication Co., Ltd. (Japanese language).
*CAFIS—Specification of Customer–Basis Agency Sales Business Service (Bank POS Business Version)* Ver. 1, Aug. 1989, NTT Data Communication Co., Ltd. (Japanese language).
Smart Cards, Jerome Svigals, 1985 (Japanese; not translated) (corresponding to Smart Cards: The Ultimate Personal Computer).
"Le paiement electronique", P. Remery, J.C. Pailles, and F. Lay, *L'Echo des Recerches,* No. 134, 4° trimester 1988—original French version and English Translation.
Bruce Schneier, "Applied Cryptography" 1994, pp. 417–429.
Stephen M. Bellovin and Michael Merritt, "Limitations of the Kerberso System", Winter, 1991, pp. 1–16.
David Chaum, *Achieving Electronic Privacy,* Scientific American, Aug. 1992.
Dancoin Ltd., *The Company,* Danmont A/S 1991.
O'Reilly, Ireland's Pocket Revolution: The Micro That Replaces Cash, Cheques, And Cards, *Retail Banker International,* Feb. 20, 1984, at 4.
Nakamoto, Japanese Take To The Top The Prepaid Plastic Card Business, *Financial Times,* Nov. 17, 1988, at 7.
Rowe, Au Revoir Le Cash?, *Banking Technology,* Jul.–Aug. 1991, at 46.
Okamoto and Ohta, Universal Electronic Cash, *Cryptography Symposium* (1991).
Article 4A, Uniform Commercial Code, Callaghan & Company, dated Apr. 1990.
"Security Without Identification: Transaction Systems To Make Big Brother Obsolete" Chaum, D., *Communications of the ACM,* 28:10, Oct. 1985.
"Disposable–Zero–Knowledge Authentications and Their Applications To Untraceable Electronic Cash", Okamoto, T. et al., 481–496, undated.
D. W. Davies, "Use of the Signature Token To Create A Negotiable Document", Advances in Cryptology Proceedings of the Crypto 83, Plenum Press, New York 1983, pp. 377–382.
"Welcome To The Electronic Purse".

\* cited by examiner

| DATE/TIME | MG 1 | TELLER 2 | 3 | TRANSACTION 4 | 5 | 6 |
|---|---|---|---|---|---|---|
| 1:00:00 | CREATE $50 → | | | | | |
| 1:00:01 | | WITHDRAW $50 → | | | | |
| 1:00:05 | | | PAY $10 → | | | |
| 1:01:00 | | | PAY $10 → | | | |
| 2:00:01 | | | | PAY $5 → | | |
| 2:00:06 | | | ← PAY $10 | | | |
| 2:01:07 | | | | PAY $5 → | | |
| 3:07:05 | | | ← PAY $5 | | | |
| 3:08:01 | | | PAY $25 → | | | |
| 3:09:12 | | | | | PAY $20 → | |
| 4:10:00 | | | | | ← PAY $10 | |
| 4:11:08 | | | PAY $5 → | | | |
| 4:12:05 | | | ← DEPOSIT $5 | | | |
| 5:00:06 | | | | ← PAY $10 | | |
| 5:00:10 | | ← DEPOSIT $10 | | | | |

*Figure 16*

SECURITY SYSTEMS AND METHODS APPLICABLE TO AN ELECTRONIC MONETARY SYSTEM

This application is a continuation of application Ser. No. 08/994,256, filed Dec. 19, 1997, which is a divisional of application Ser. No. 08/427,287, filed Apr. 21, 1995, now U.S. Pat. No. 5,799,087, which is a continuation-in-part of U.S. application Ser. No. 08/234,461, filed Apr. 28, 1994, now U.S. Pat. No. 5,557,518.

FIELD OF THE INVENTION

The present invention relates to network security systems and methods, and more particularly to security in an electronic monetary system for implementing electronic money transactions as an alternative medium of economic exchange to cash, checks, credit and debit cards, and electronic funds transfer.

BACKGROUND OF THE INVENTION

Today, approximately 350 billion coin and currency transactions occur between individuals and institutions every year. The extensive use of coin and currency transactions has limited the automation of individual transactions such as purchases, fares, and bank account deposits and withdrawals. Individual cash transactions are burdened by the need of having the correct amount or providing change therefor. Furthermore, the handling, and managing (including guarding) of paper cash and coins is inconvenient, costly and time consuming for both individuals and financial institution alike. It is estimated that in the United States alone, $60 billion dollars a year is spent by money handlers simply to move money. In addition, the security of paper money is seriously threatened by the relative ease of counterfeiting using, for example, widely accessible, high quality color copiers.

Although checks may be written for any specific amount up to the amount available in the account, checks have very limited transferability and must be supplied from a physical inventory. Paper-based checking systems do not offer sufficient relief from the limitations of cash transactions, sharing many of the inconvenience of handling currency while adding the inherent delays associated with processing checks. To this end, economic exchange has striven for greater convenience at a lower cost, while also seeking improved security.

Automation has achieved some of these qualities for large transactions through computerized electronic funds transfer ("EFT") systems. Electronic funds transfer is essentially a process of value exchange achieved through the banking system's centralized computer transactions. EFT services are a transfer of payments utilizing electronic "checks," which are used primarily by large commercial organizations.

The Automated Clearing House (ACH) and point of sale (POS) systems are examples of electronic funds transfer systems that have become used by retail and commercial organizations on a substantial basis in recent years. However, the payments made through these types of EFT systems are limited in that they cannot be performed without the banking system. Moreover, ACH transactions usually cannot be performed during off business hours.

Home Banking bill payment services are examples of an electronic funds transfer system used by individuals to make payments. Currently, home banking initiatives have found few customers. Of the banks that have offered services for payments, account transfers and information over the telephone lines using personal computers, less than one percent of the bank's customers are using the service. One reason that Home Banking has not been a successful product is because the customer cannot deposit and withdraw money as needed in this type of system.

Current EFT systems, credit cards, or debit cards, which are used with an on-line system to transfer money between accounts, such as between the account of a merchant and that of a customer, cannot satisfy the need for an automated transaction system that provides for the transfer of universally accepted economic value outside of the banking system. Moreover, credit and debit card systems are generally insecure against fraud and do not provide for adequate privacy.

To implement an automated, yet more convenient transaction system that does not require the banking system to intermediate the transfer, and that can dispense some form of economic value, there has been a trend towards off-line electronic funds transfer. For example, numerous ideas have been proposed for some form of "electronic money" that can be used in cashless payment transaction as alternatives to the traditional currency and check types of payment systems. See U.S. Pat. No. 4,977,595, entitled "METHOD AND APPARATUS FOR IMPLEMENTING ELECTRONIC CASH," and U.S. Pat. No. 4,305,059, entitled "MODULAR FUNDS TRANSFER SYSTEM."

The more well known techniques include magnetic stripe cards purchased for a given amount and from which a prepaid value can be deducted for specific purposes. Upon exhaustion of the economic value, the cards are thrown away. Other examples include memory cards or so called smart cards which are capable of repetitively storing information representing value that is likewise deducted for specific purposes.

However, these proposed systems suffer from a failure to recognize fully the significance of bank deposits as money, and their necessity to back any form of universally accepted monetary representations that may be issued. In these systems representations of economic value, whether electronic or paper, are issued without the backing of equal valued liabilities as the counterpart to their assets.

None of these proposed paperless payment systems are comprehensive enough so as to implement a multipurpose electronic monetary system that includes not only the automated devices that allow subscribers to transfer electronic funds or money between them without any intermediating system, but that also encompasses and includes an entire banking system for generating the value represented by the electronic money and for clearing and settling the electronic money accounts of the banks and financial institutions involved to maintain a monetary balance within the system.

Thus, there is a need for a system that allows common payor to payee economic exchanges without the intermediation of the banking system, and that gives control of the payment process to the individual. Furthermore, a need exists for providing a system of economic exchange that can be used by large organizations for commercial payments of any size, that does not have the limitations of the current EFT systems.

In commonly assigned, U.S. patent application Ser. No. 07/794,112, filed Nov. 15, 1991, which is herein incorporated by reference, an electronic monetary system (EMS) is described which overcomes the above described, and other prior art limitations and provides a complete electronic money system which utilizes electronic money that is interchangeable with traditional cash and is universally accepted.

The invented EMS provides a method and system for of securely and reliably transferring economic value including currency and credit among subscribers, among financial institutions, and between subscribers and financial institutions. The EMS also provides for electronic money in the form of multiple currencies. Nevertheless, the paramount importance of security and reliability creates a need for further enhancements to the EMS.

Accordingly, it is an object of the present invention to provide an enhanced EMS system and related methods for economic exchange that is secure from reuse, duplication and counterfeiting.

It is another object of the present invention to provide a system and process to claim lost money.

It is yet another object of the present invention to provide a user friendly electronic payment system and method that may be used reliably and securely for real time transfers of money from a buyer to a merchant for goods.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art. Accordingly, the present invention resides in the novel methods, arrangements, combinations and improvements herein shown and described.

SUMMARY OF THE INVENTION

To achieve the foregoing, and other objects, the method and apparatus of the present invention employ a preferred embodiment in the form of an electronic-monetary system having (1) banks or financial institutions that are coupled to a money generator device for generating and issuing to subscribing customers electronic money including electronic currency backed by demand deposits and electronic credit authorizations; (2) correspondent banks that accept and distribute the electronic money; (3) a plurality of transaction devices that are used by subscribers for storing electronic money, for performing money transactions with the on-line systems of the participating banks or for exchanging electronic money with other like transaction devices in off-line transactions; (4) teller devices, associated with the issuing and correspondent banks, for process handling and interfacing the transaction devices to the issuing and correspondent banks, and for interfacing between the issuing and correspondent banks themselves; (5) a clearing bank for balancing the electronic money accounts of the different issuing banks; (6) a data communications network for providing communications services to all components of the system; and (7) a security arrangement for maintaining the integrity of the system, and for detecting counterfeiting and tampering within the system.

In the preferred embodiment, the functions of the money generating devices, the transaction devices, and the teller devices will be performed by a combination of tamper-proof computer hardware and application software modules that may be networked together. Information is transmitted in an encrypted form to provide security from unauthorized inspection. The electronic money is transmitted with digital signatures to provide authentication, and security from modification or counterfeiting.

The electronic money exchanged by these devices may be an electronic representation of currency or credit. An important aspect of the electronic currency is that it is the equivalent of bank notes and is interchangeable with conventional paper money through claims on deposits in an issuing bank, but can be withdrawn or deposited both at an issuing bank and at a correspondent bank. However, only the issuing banks can generate the electronic currency, and will be liable for its redemption.

The issuing banks later utilize inter-bank clearing and settling processes to maintain the monetary balance in the banking system, as is currently practiced by today's banking industry.

The electronic money representations are fungible, universally accepted, and undeniably redeemable from the issuing banks, i.e., they have the characteristics of money transactions. To preserve the integrity of the electronic monetary system, each exchange of electronic money includes, along with other information, data identifying the monetary unit of the credit or currency, (i.e., dollars, yen, etc.) the amount by unit of credit or currency, the bank issuing the electronic credit or currency, and several digital signatures.

According to a broad aspect of the invention, an electronic monetary system provides for transactions utilizing electronic money including electronic currency backed by demand deposits in a bank in lieu of cash transactions, and electronic credit authorizations. In an embodiment of the present invention, the EMS comprises a money module for generating the electronic money; a money module for issuing, distributing, and accepting the electronic money; and a money module for accepting, storing, and transferring the electronic money between other accepting money modules and between the accepting money module and the issuing money module.

According to a further aspect of the invention, an electronic monetary system is provided for implementing and maintaining electronic money which includes electronic currency that is interchangeable with conventional money through claims on deposits in a bank and electronic credit authorizations.

In an embodiment of the present invention, the system includes a plurality of issuing banks; a generator module for creating electronic money; teller modules coupled to the generator modules, for performing teller transactions and for interacting with other teller modules, such transactions including the accepting and the distributing of the electronic money; a security system for providing the overall integrity of the electronic monetary system; a clearing and settling process for balancing the electronic money accounts of the separate issuing banks and for clearing the electronic money issued by the issuing banks; and a plurality of transaction modules owned by authorized users, for transferring the electronic money between the transaction modules and between the transaction modules and the teller modules; and a customer service module handling lost money claims and for linking accounts to money modules to provide bank access.

In accordance with another aspect of the invention, the functions of the generator modules, the transaction modules, the teller modules, and the customer service modules will be performed by a combination of tamper-proof computer hardware and application software that may be networked together.

The electronic money exchanged by these modules, which may be an electronic representation of currency backed by demand deposit accounts at the issuing bank or credit authorizations, may be transmitted with digital signatures to provide security from unauthorized modification or counterfeiting. In a preferred embodiment, security from counterfeiting and tampering is also provided by requiring the modules and the individual units of electronic money to be renewed periodically. Preferably, transfer of a note between modules includes a sequence identification number to facilitate note transfer history reconciliation. Offending modules or counterfeit electronic money can be removed from circulation as soon as they are discovered.

Also, in accordance with a further aspect of the invention, a process to claim lost money is provided whereby a transaction module owner/holder may submit claims to the banking system via a customer service module, and subsequent to note transfer history reconciliation by the banking system, the owner/holder may recover any lost notes that were claimed.

A further aspect of the invention provides a process for a transaction module to update credit such that there is only one credit note for each credit account in a money module.

Also, in accordance with a preferred embodiment of the present invention, a process is provided for an owner/holder of a transaction module to securely and reliably purchase goods from a merchant.

BRIEF DESCRIPTION OF THE DRAWINGS

Additional aspects, features, and advantages of the invention will be understood and will become more readily apparent when the invention is considered in the light of the following description made in conjunction with the accompanying drawings, wherein:

FIG. 16 shows an example of a Note Transfer History.

DETAILED DESCRIPTION OF THE INVENTION

The present invention provides an improved monetary system using electronic media to securely and reliably exchange economic value. The system can be implemented by integrating novel data processing systems with other procedures which can be implemented with the current worldwide banking systems. In accordance with the present invention, several types of enhancements are presented to the Electronic Monetary System, disclosed in commonly assigned, U.S. patent application Ser. No. 07/794,112, filed Nov. 15, 1991, which is herein incorporated by reference. These enhancements include: a set of security improvements including improved foreign exchange (F/X) and Transfer Notes transaction processes, a process to claim lost money, a process for linking money modules for bank access, a process for a point of sale payment, and a process for updating credit.

Security

Effective security for a monetary system has three characteristics: inhibit counterfeiters, detect counterfeiters, and contain counterfeiters. The described EMS is designed to have components which exhibit all three characteristics.

In order to inhibit counterfeiters, the money modules communicate using symmetric and asymmetric key cryptography. None of the messages are in the clear. The module's protocols are also physically protected by tamper-proof hardware.

Counterfeiting is detected by note reconciliation processes. System-wide time protocols (e.g., note expiration) force electronic notes to be reconciled regularly. Electronic notes are also refreshed (i.e., replaced with a new note with a new expiration date) when banking transactions are performed.

Money modules are blocked (e.g., placed on the bad ID list) if duplicated or counterfeit notes are tied back to them. Also, notes which have passed through these modules will not be allowed to transfer. The transfer of duplicated or counterfeit notes will be contained since notes expire or eventually are deposited to a bank. Moreover, in case of a serious system security problem, the EMS may call for a global recertification, thereby requiring all modules to recertify, including transaction money modules the next time they sign on the EMS Network.

The following list of improvements are intended to shield all information from eavesdroppers listening to module interactions. All information is cloaked—even the public keys and module identifiers. The list of improved security features include the following.

1) Securing the network sign-on so that no one can spoof the money module or intercept any of its information in the clear, as described below with reference to FIG. 5.

Figure 8A:
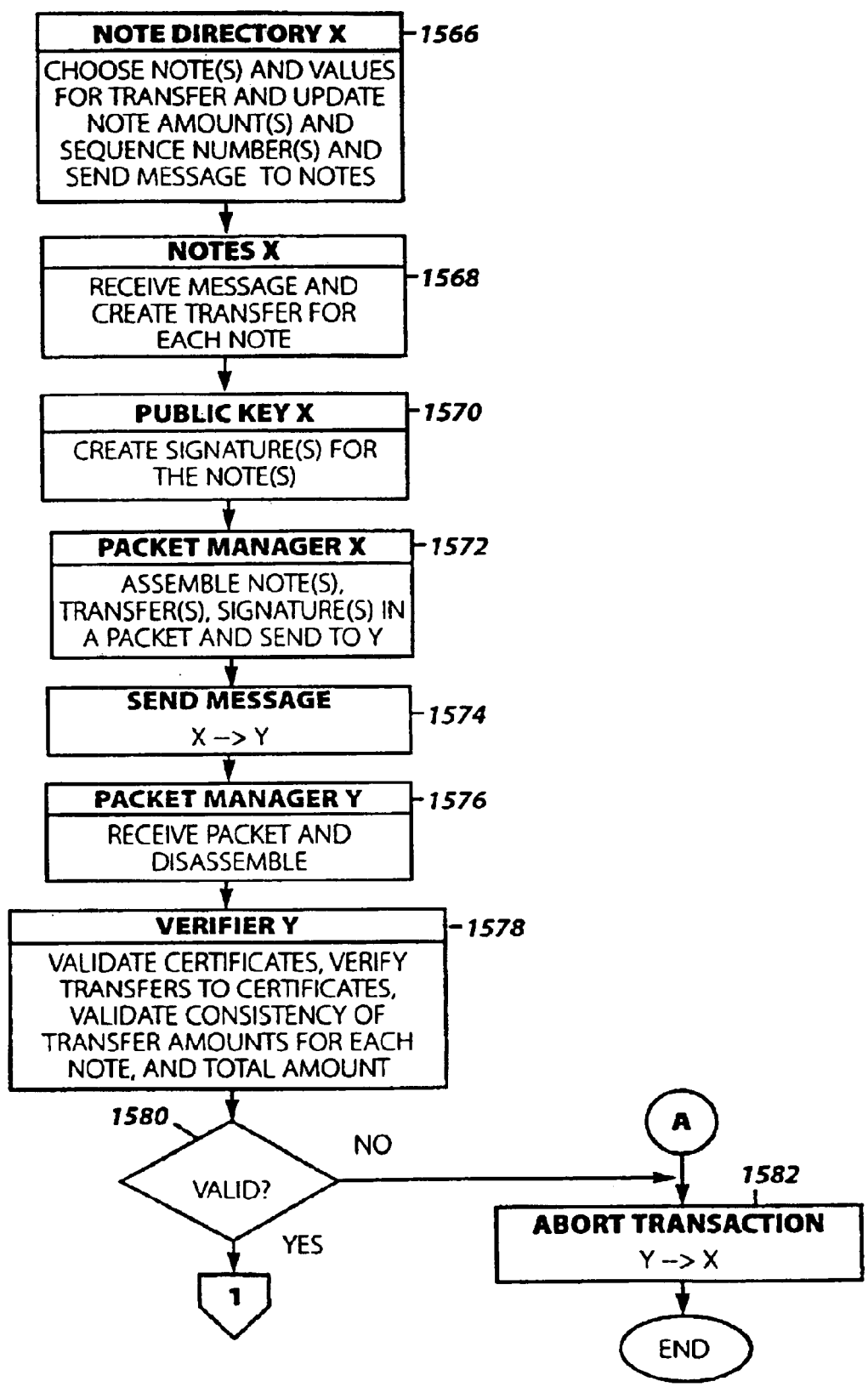
FIGS. 8A–8B illustrate a Transfer Notes protocol.
Figure 8B:
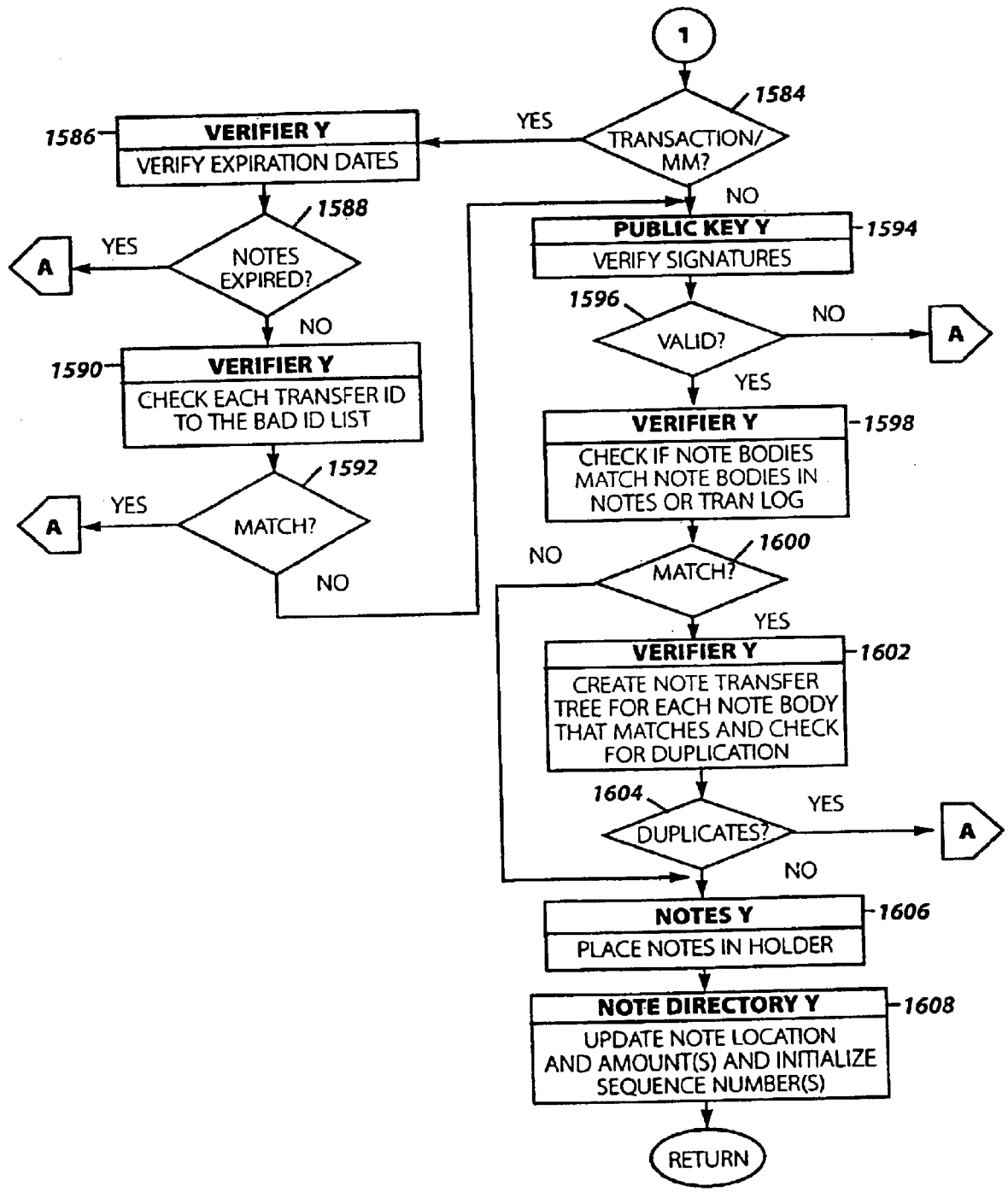
Figure 9A:
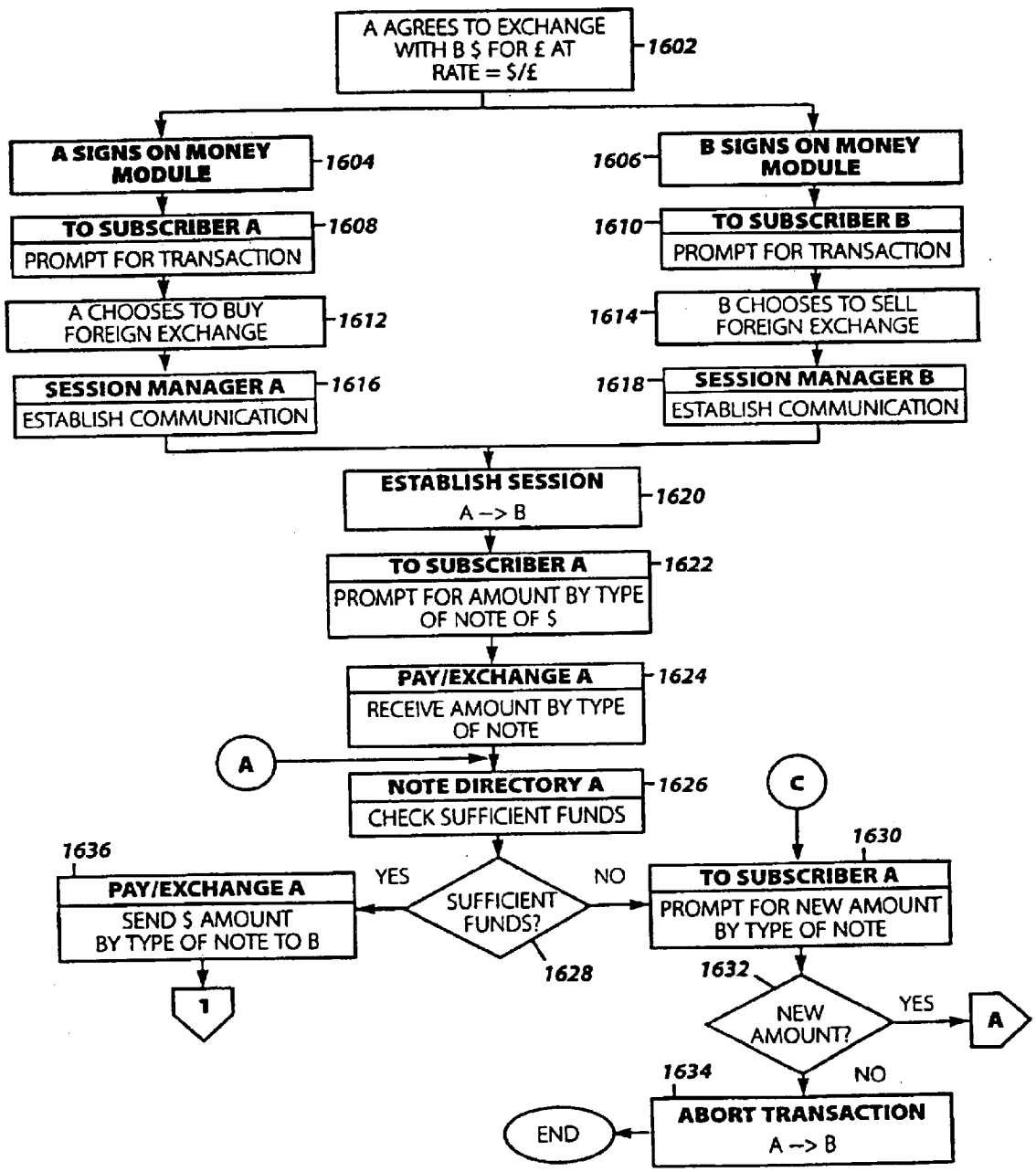
FIGS. 9A–9D illustrate a Foreign Exchange protocol.
Figure 9B:
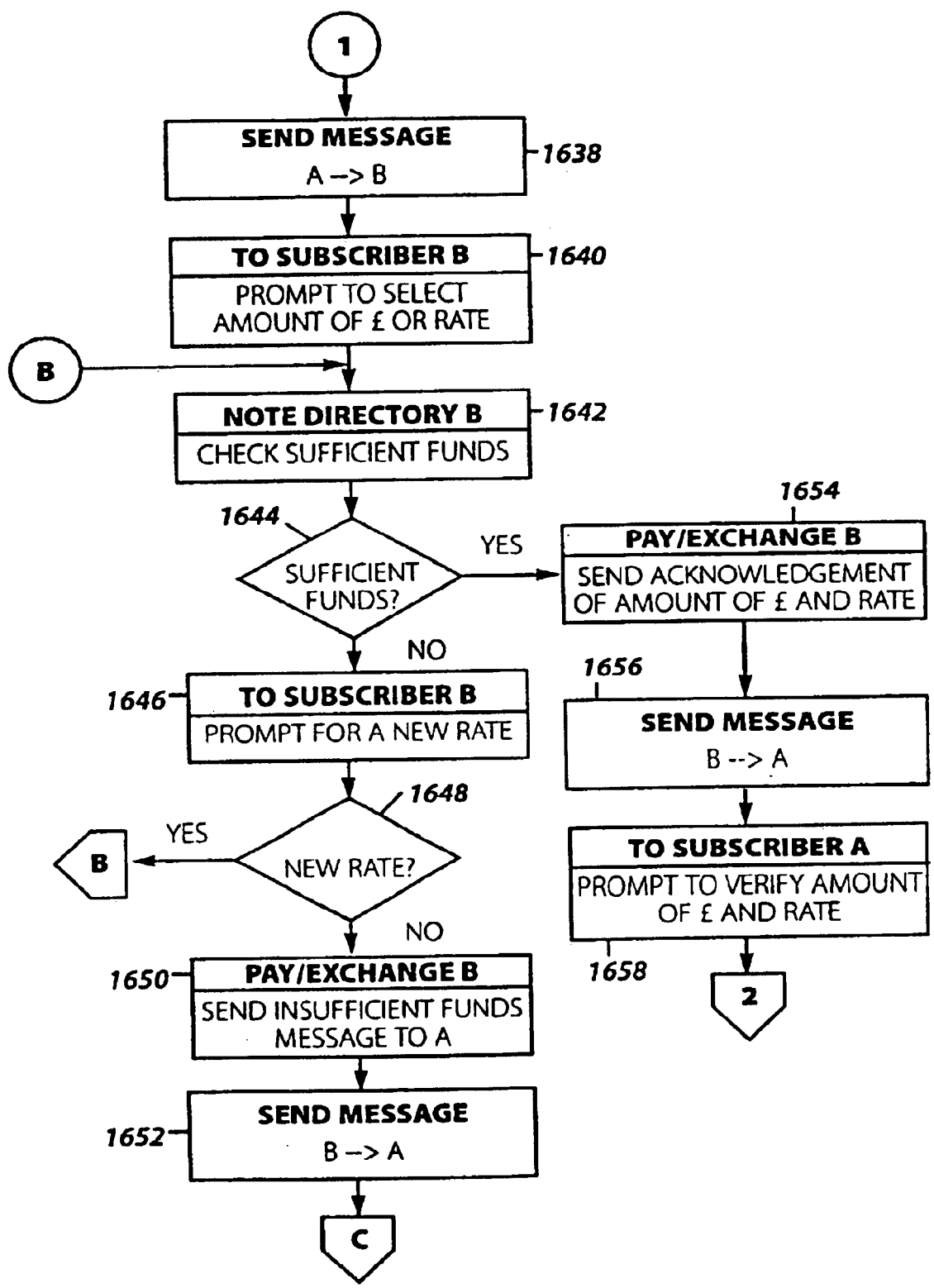
Figure 9C:
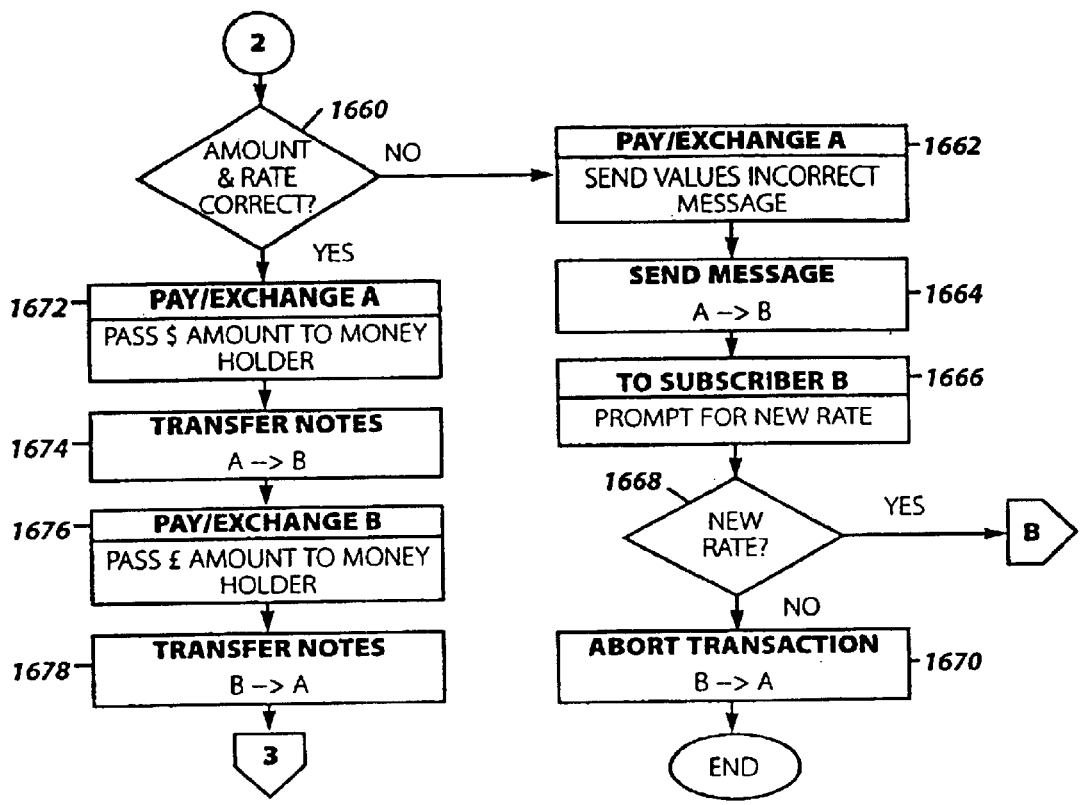
Figure 9D:
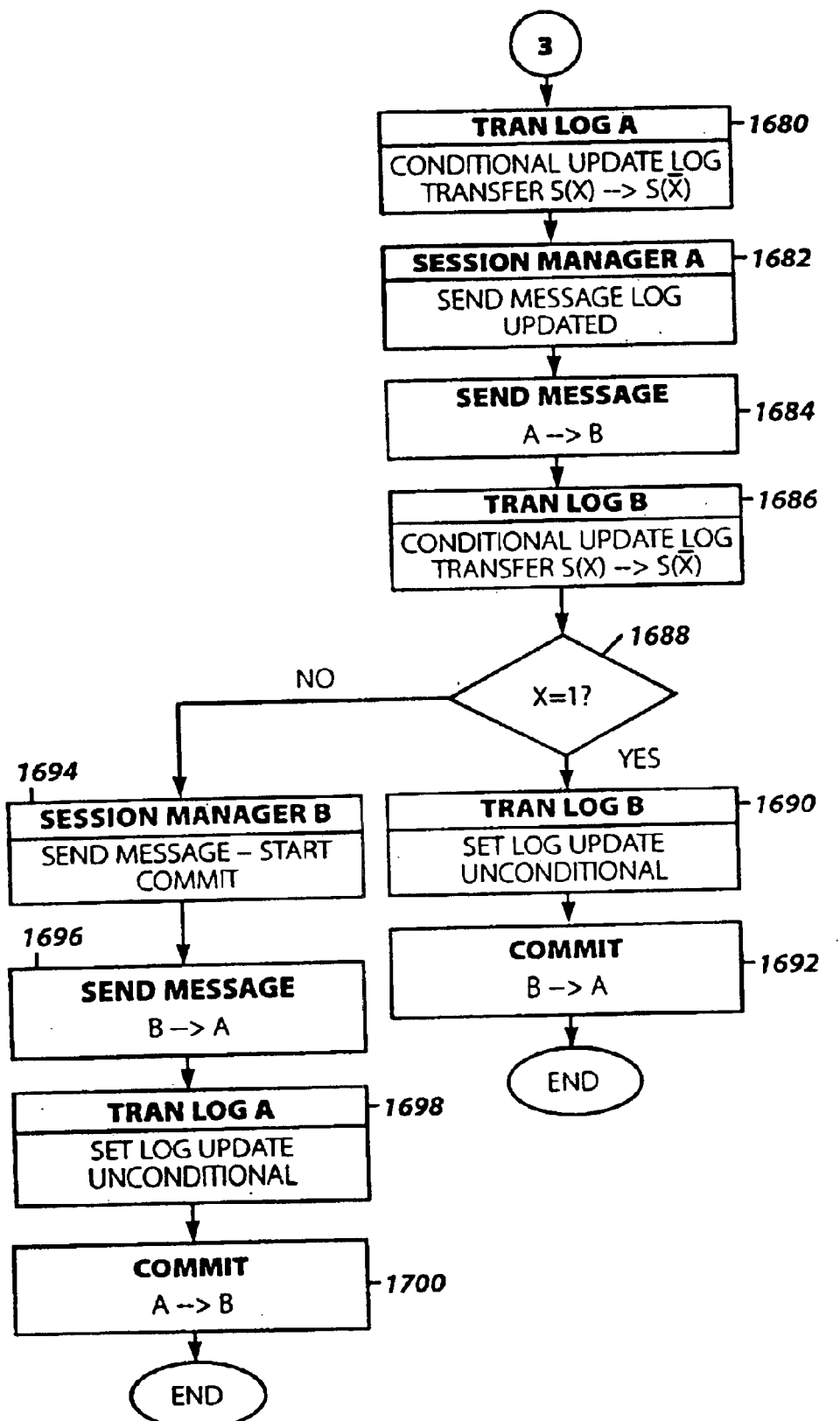

2) Creating a method for assigning security server, money generator and teller identifiers (see Module Numbering Scheme). These identifiers are checked in:

a) Establishing a session (see FIG. 7);

b) Transferring notes—check transfer records (see FIG. 8).

3) Implementing a two-tier security server structure (see Security Hierarchy and Security Network), including a primary security server, wherein all modules carry the public keys of the primary security server, and a security server which certifies all other modules.

4) Improving Transfer Notes to check bad ID list against all transfers before accepting notes in payment or Foreign Exchange (F/X), and to check for duplicated notes (see FIG. 8).

5) Encrypting all certificates using private keys of a security server (see Certificate Structure and Validation).

6) Varying the size of the public keys dynamically (see Security Network and FIG. 6).

Figure 10:
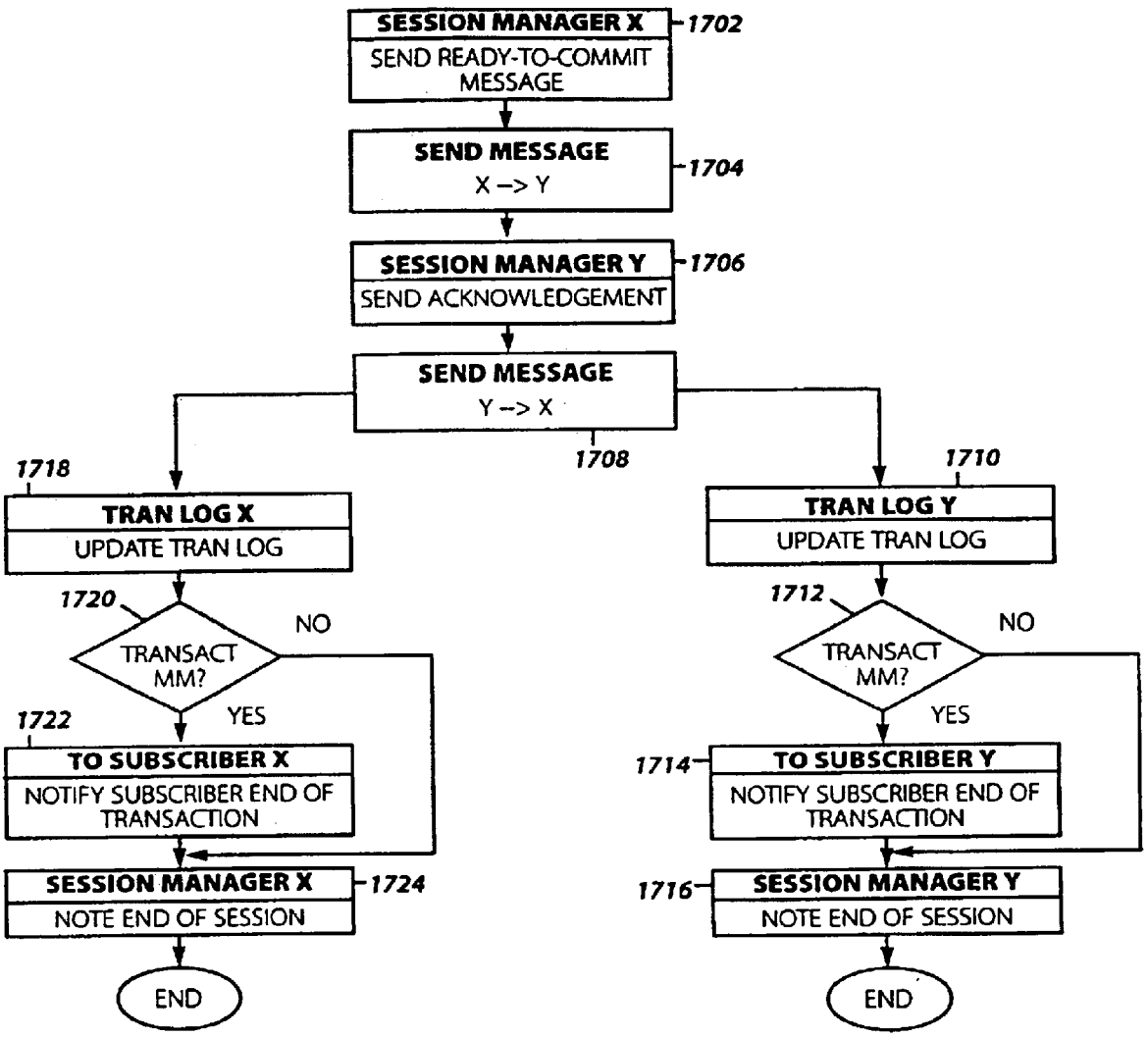
FIG. 10 illustrates a Commit protocol for modules in the EMS.

7) Changing the commit protocol so that failure does not duplicate money (see FIG. 10).

8) Changing F/X so that neither party can interrupt the commit, in order to cheat with certainty, by receiving money and not sending any money (see FIG. 9).

Figure 11A:
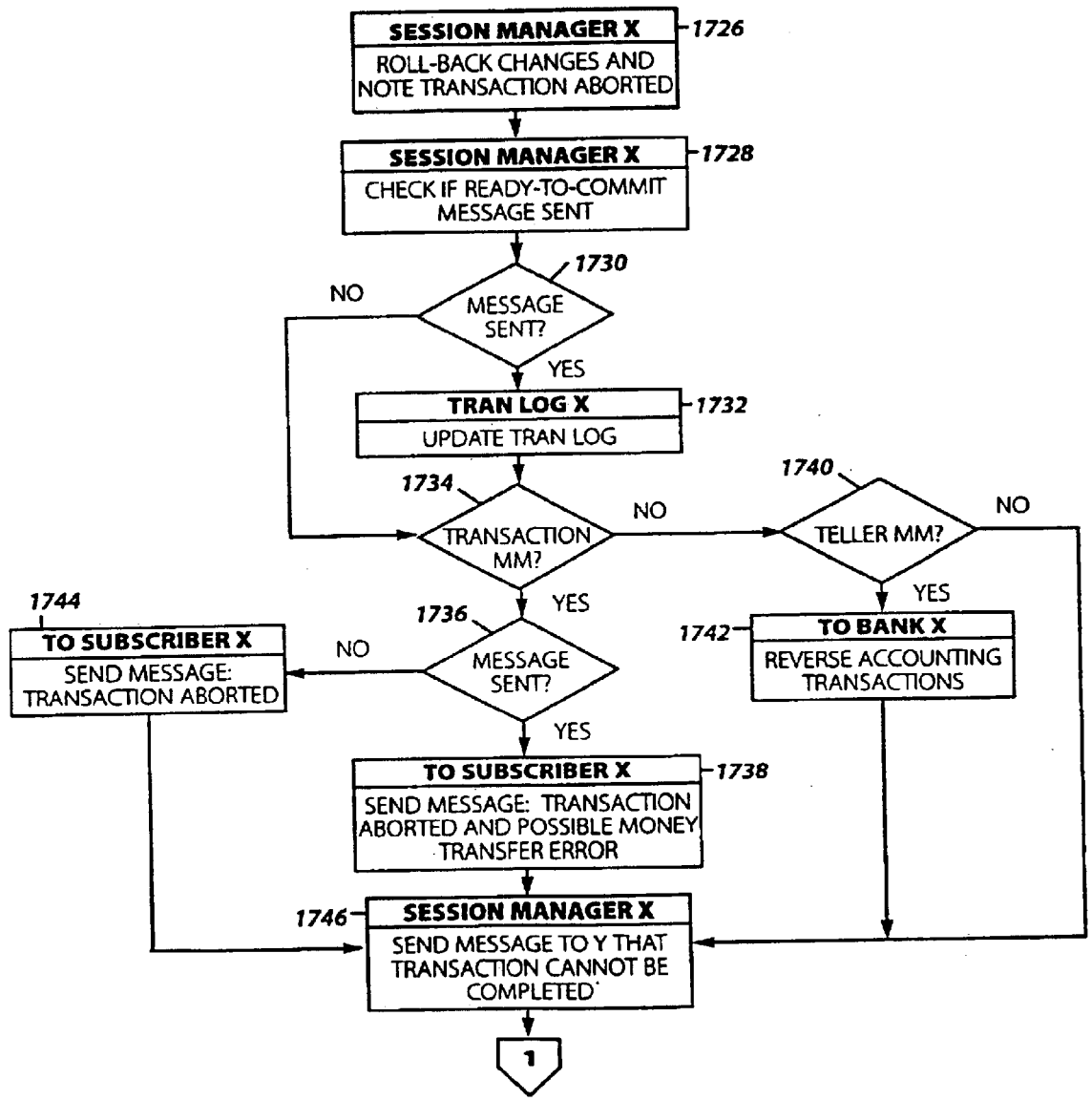
FIGS. 11A–11B illustrate an Abort Transaction protocol for modules in the EMS.
Figure 11B:
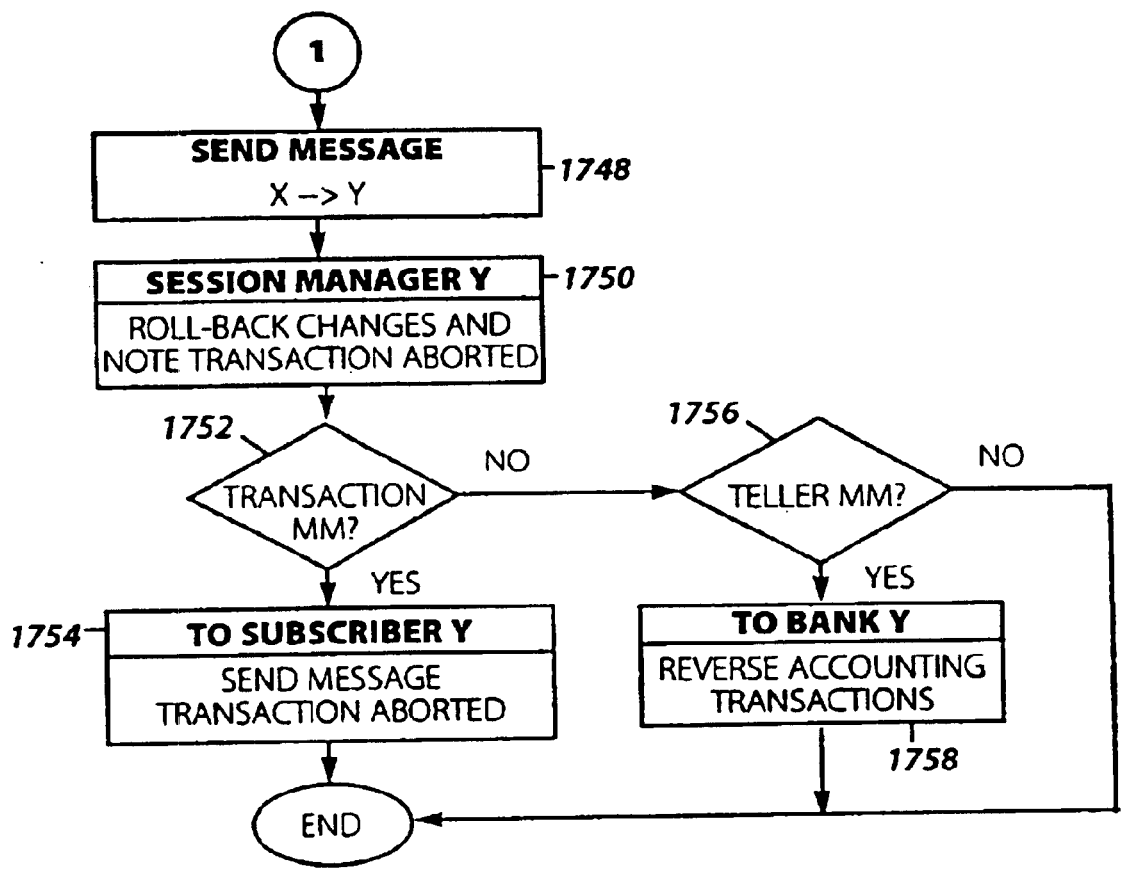

9) Changing Abort to log information on a failed commit if payer commits but receiver aborts (see FIG. 11).

10) Allowing global recertification if needed (see Security Network and FIG. 6).

The foregoing list of security improvements highlights some of the security features provided by the enhanced security system of the present invention. These, and other, improvements may be further understood from the ensuing detailed description of an alternative preferred embodiment of a security system for an EMS.

Security Hierarchy

Figure 1A:
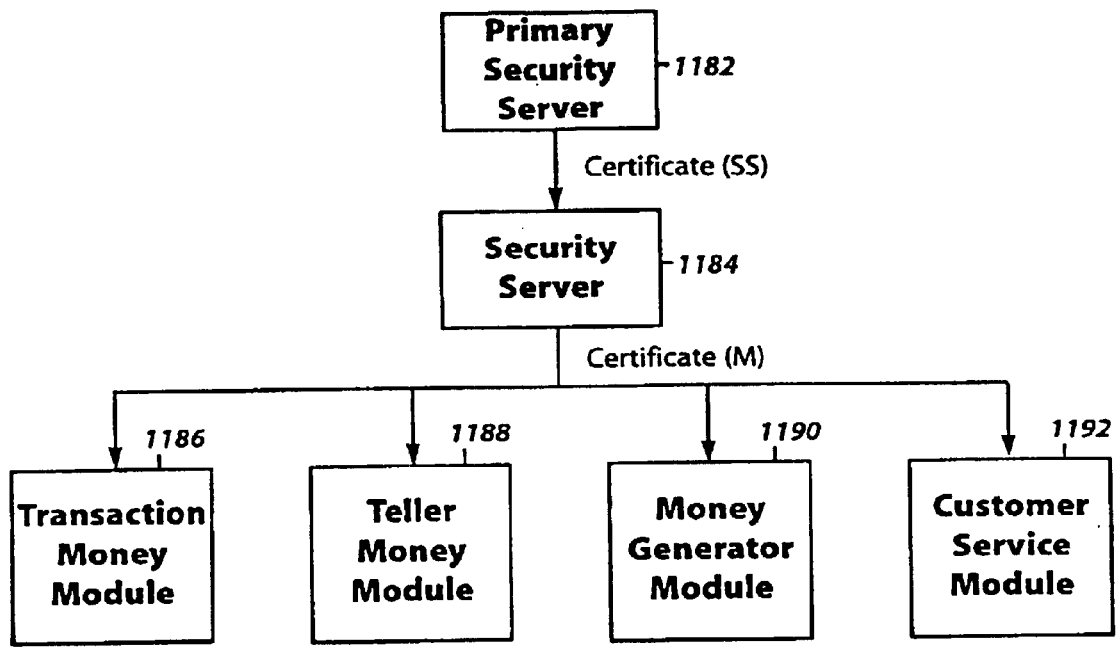
FIG. 1A is a diagram showing the EMS Security Hierarchy.

In accordance with the present invention, another embodiment for EMS system security may be provided as follows. Referring to FIG. 1A, EMS will have two types of security servers, primary 1182 and ordinary 1184. The primary security servers 1182 certify the (ordinary) security servers 1184. The security servers 1184 certify all other modules (transaction MMs 1186, Teller MMs 1188, money generator modules 1190, and customer service modules 1192) in the system.

Figure 2:
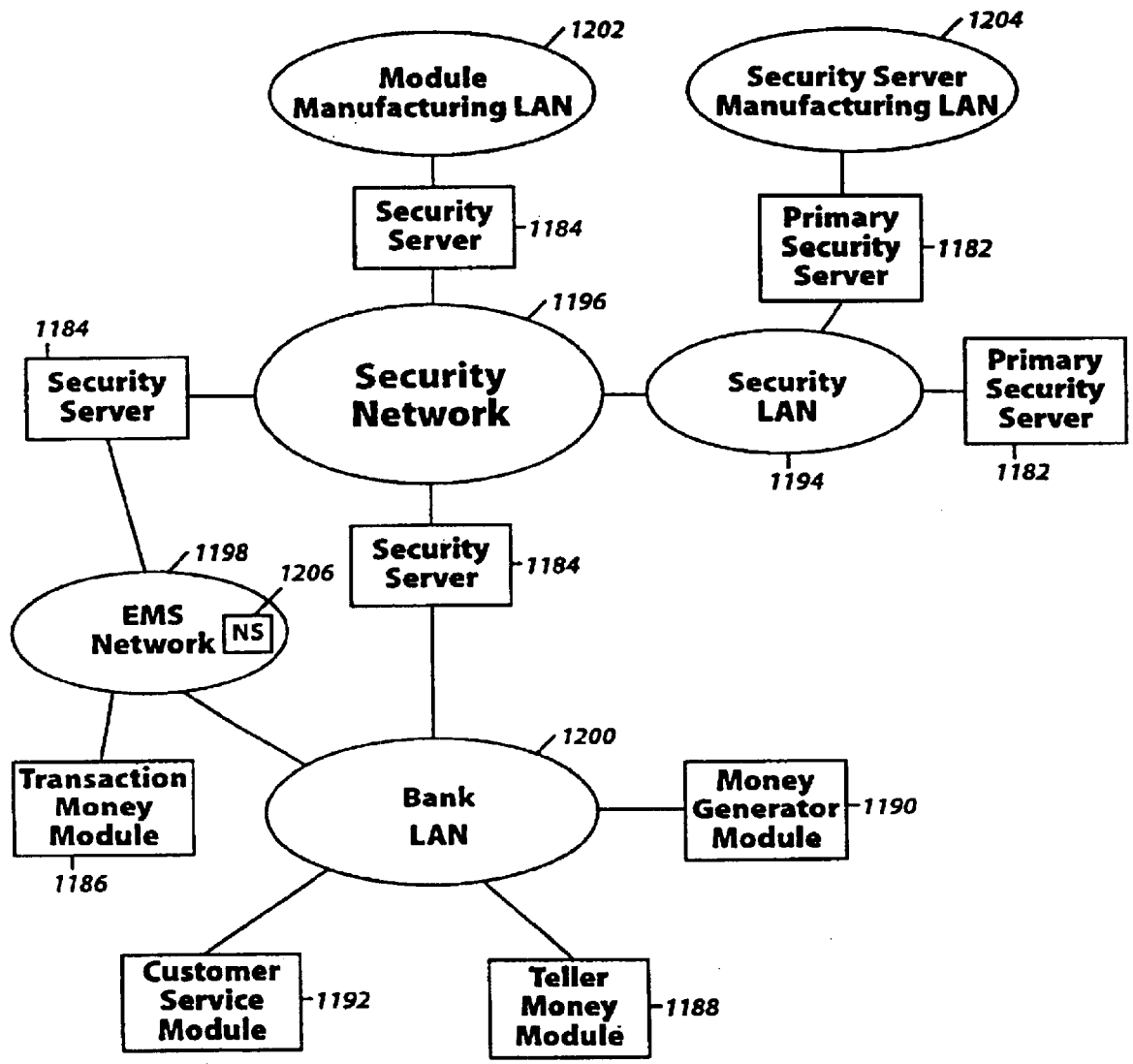
FIG. 2 is a diagram showing the security network structure for the EMS.

The primary servers 1182 only interact with other primary servers 1182 or the security servers 1184. Referring to FIG. 2, the primary security servers 1182 are housed in a secure facility connected to each other by a Security LAN 1194. The LAN 1194 is connected through a secure gateway to the Security Network 1196. Only the security servers communicate over this network. All security servers are physically protected devices.

Security servers 1184 are also attached to the EMS Network 1198 and bank local networks 1200. Security servers are treated as if they could be compromised and are validated upon all interactions with other modules.

Only the security servers 1184 and modules have certificates. The primary security server's public keys are carried by these devices. There are two types of certificate: security server and module.

Certificate Structure and Validation

The structure of a certificate is as follows:

Cert (SS) =

$E_{PSS}$ [SS(id)|| SS(PK) || expire date || $\sigma_{PSS}$ (X)] || [PSS(id) XOR C]
———— X ————
Cert (M) = $E_{SS}$ [M(id) || M(PK) || expire date || $\sigma_{SS}$ (Y)] || Cert (SS)
———— Y ————

The certificate validation protocols are:
1) Validate Cert(SS)
   a) PSS(id)=[PSS(id) XOR C] XOR C
   b) $D_{PSS}(E_{PSS}(X||\sigma_{PSS}(X)))=X||\sigma_{PSS}(X)$
   c) Check if SS(id) is authentic (see module numbering scheme)
   d) Check if date is valid
   e) Check if $D_{PSS}(\sigma_{PSS}(X))=h(X)$
2) Validate Cert(M)
   a) Validate Cert(SS)
   b) $D_{SS}(E_{SS}(Y||\sigma_{SS}(Y)))=Y||\sigma_{SS}(Y)$
   c) Check if M(id) is authentic (see module numbering scheme)
   d) Check if date is valid
   e) Check if $D_{SS}(\sigma_{SS}(Y))=h(Y)$ where

| | |
|---|---|
| PSS = Primary Security Server | PK = Public Key (includes length of key) |
| SS = Security Server | |
| M = Module | $\sigma$ = Digital Signature = E · h |
| || = Concatenate | Cert = Certificate |
| id = identification number | E = Algorithm with private key used for encrypting and for creating digital signature |
| h = Hash function | |
| C = Constant random number shared by all modules | |
| | D = Algorithm with public key used for decryption and for checking digital signature |

Note E and D may also be used for decrypting and encrypting, respectively, when applied in other applications.

Module Numbering Scheme

The primary security servers 1182, security servers 1184, teller money modules 1188, money generator modules 1190, customer service modules 1192, and transaction money modules 1186 are assigned identification numbers (id's) so that the numbers can be checked for authenticity. A 48-bit prime number "p" is generated and a primitive root "a" modulo p (where $a^n \neq 1(p)$ for all $1 \leq n < p-1$) is found via a secure process. Both a and p are loaded to all modules in the system securely by the primary security servers when they are manufactured.

The scheme works as follows:
If a' m(p) and
(1) $1 \leq m \leq 99,999$ then n is assigned as the id of a primary security server,
(2) $100,000 \leq m \leq 999,999$ then n is assigned as the id of a security server,
(3) $1,000,000 \leq m \leq 6,999,999$ then n is assigned as the id of a teller money module,
(4) $7,000,000 \leq m \leq 9,999,999$ then n is assigned as the id of a money generator module, (5) $10,000,000 \leq m \leq 11,999,999$ then n is assigned as the id of a customer service module, (6) $m \geq 12,000,000$ then n is assigned as the id of a transaction money module.

If a module or server is validating a certificate, it checks the authenticity of the identification number (e.g., M(id), SS(id), or PSS(id)) n by computing $a''=m(p)$ and then checks if m is in the correct range.

Security Network

As shown in FIG. 2, the Security Network 1196 and the Security LAN 1194 connect the security servers 1184 to the primary security servers 1182. Security servers 1184 initially certify the money modules and customer service modules 1192 at manufacturing. Such security servers may be connected by a Module Manufacturing LAN 1202. They pass security information such as the bad id list and the list of primary security servers and their public keys to the modules. The bad id list contains the identities of the money modules, customer service modules, and security servers which are blocked from transacting. Recertification of these modules is described subsequently in the network sign-on flow diagram.

Figure 1B:
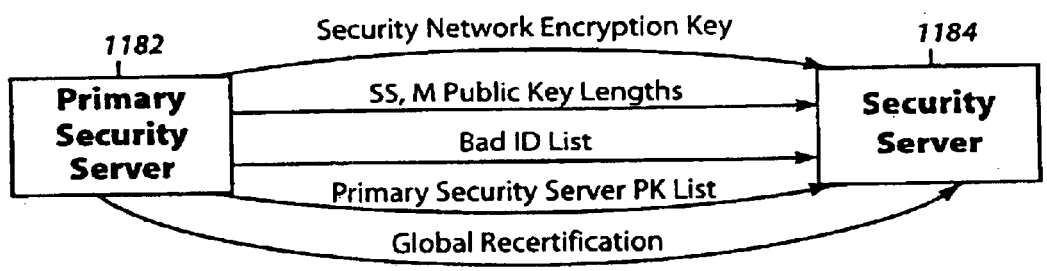
FIG. 1B is a diagram showing the security network messaging between a primary security server and an ordinary security server.

The security servers 1184 are initially certified by the primary security servers 1182 at manufacturing. Such primary security servers may be connected by a Security Server Manufacturing LAN 1204. Referring to FIG. 1B, the security servers 1184 receive various security information which they pass to the other modules. The security servers provide security services for the EMS Network 1198 and the bank LANs 1200, such as network sign-on where they pass updated security information. The security servers 1184 receive this information from the primary security servers 1182 over the Security Network 1196. Transaction money modules 1186 communicate with the EMS Network 1198 via network servers 1206 (NS). Participating banks have teller money module(s) 1188 and perhaps money generator (s) 1190 connected to their LANs 1200.

The Security Network 1196 is link encrypted. In addition, the primary security servers and security servers share a common symmetric key (a Security Network encryption key). This key is changed periodically by a designated primary server 1182 by public key, key exchange.

The list of bad id's is maintained by a designated primary server 1182. The list is accumulated from interactions with participating banks, law enforcement authorities, and subscribers to the system.

Periodically the length of the public keys for the security servers and the modules will be changed. The key length will be normally lengthened to maintain a high security level. The new designated key lengths will be communicated to the primary security servers by a designated primary server. The new lengths will be communicated to the security servers by the primary servers when new bad id lists are sent or upon recertification. In case of a dangerous breach of security, a primary security server can call for global recertification.

The length of the public key for each primary server will not change. A timetable will be created which will schedule the implementation and decommission of primary security servers. The new servers will most likely have longer keys unless they are implemented because of increased transaction volume. The list of active PSS public keys is created by a primary security server and signed by the server with its private key. The list is then broadcast to other security servers.

Figure 3A:
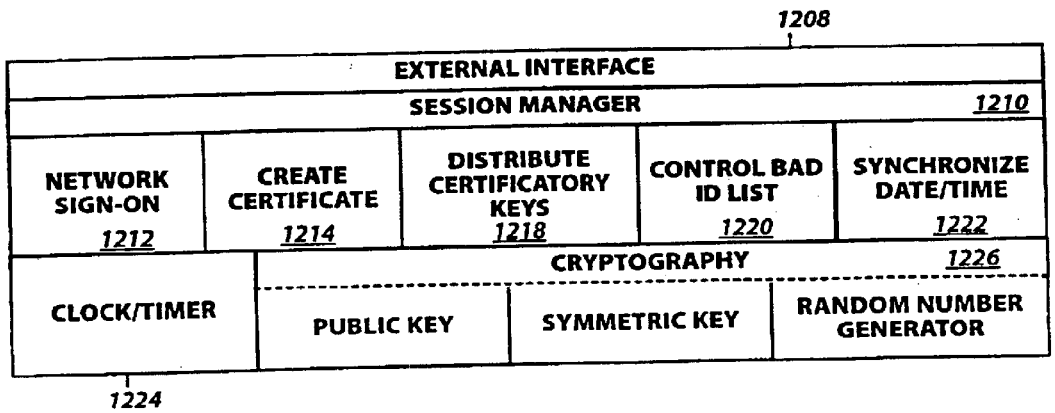
FIG. 3A illustrates the functional components of a security server.

FIG. 3A shows the functional components of a security server 1184. An External Interface function 1208 provides a communications layer for network interfacing. A Session Manager function 1210 controls the security aspects of a transaction session. A Network Sign-On function 1212 manages the security functions for network sign-on. A Create Certificate function 1214 certifies a certificate for any of the money modules (in a primary security server, this function certifies security servers). A Distribute Certificatory Keys function 1218 distributes the Certification Agency's list of valid primary security server public keys to the money modules (primary security server also distributes global recertification message). A Control Bad ID List function 1220 controls and distributes the list of bad identifiers. A Synchronize Date/Time function 1222 keeps money module Clock/Timer services synchronized to a system time. Clock/Timer 1224 and Cryptography functions 1226 are identical to those functions in the money modules.

Figure 3B:
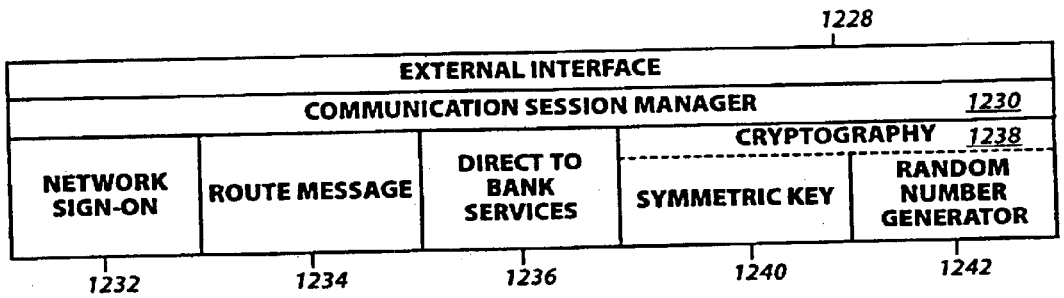
FIG. 3B illustrates the functional components of a network server.

FIG. 3B shows the functional components of a network server 1206. An External Interface function 1228 provides a communications layer for network interfacing. A Communication Session manager function 1230 manages a communication session between money modules, and between a money module and a security server. A Network Sign-On function 1232 controls the money module network sign-on process. A Route Message function 1234 provides directory services for routing messages, controlling message routing during sign-on and during a money module session. A Direct to Bank Services function 1236 provides information on services provided by participating banks. A Cryptography function 1238 provides a Symmetric Key function 1240 and a Random Number Generator function 1242. The Symmetric Key function 1240 encrypts messages between the network server 1206 and the modules accessing the network and between the network server 1206 and the security servers 1184. The Random Number Generator function 1242 generates random numbers for encryption keys and verification messages.

In accordance with the present invention, another secure processing component, a customer service module (CSM) 1192, is preferably employed. A CSM is a tamper-proof device used for creating and updating account profiles. CSMs contain a unique certificate like those found in money modules and security servers. CSMs can establish secure sessions with other modules (e.g., security servers). The CSM requires a host to interface to a customer service representative and the on-line banking systems.

The CSM has two primary functions. First, the CSM creates account profiles so that a money module can access bank accounts, revalidate the money module link to bank accounts, and validate account numbers. These transactions are more fully described hereinbelow with reference to FIGS. 18–20. Second, the CSM functions to claim lost notes in response to a request from a host customer services representative, which is described in further detail in FIG. 21 and FIG. 22. A CSM has the same security functions as a money module and a special range of numbers for its identifier (see "Module Numbering Scheme"). The performance of these functions by the CSM simplifies the validate account number process for the Teller Module.

In accordance with an embodiment of an EMS which employs a CSM, the account profile structure for each bank changes to:

Expire Date || M(id) || B(id) || LA || σ_csm (X) || Cert (CSM)
——————— X ———————

Where
M(id)=module identifier
B(id)=bank identifier
LA=list of account numbers and type of account (deposit or loan)
σhd csm=signature of CSM
Cert(CSM)=certificate of (CSM) ||=concatenate A validation procedure for such a profile is described hereinbelow with reference to FIG. 20.

Figure 4A:
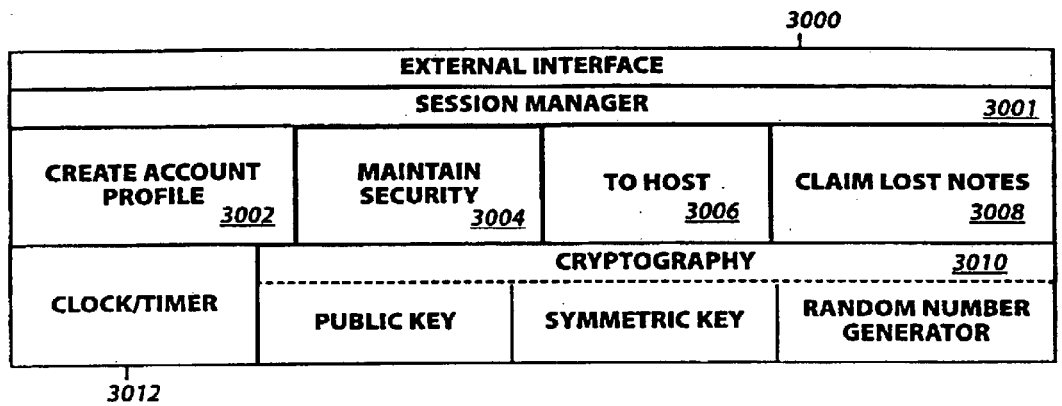
FIG. 4A illustrates the functional components of a customer service module.

FIG. 4A shows the functional components of a Customer Service Module (CSM) 1192. The External Interface 3000 interfaces the CSM to other processing and communications means within the Customer Service Module Host (CSMH) processor; the Session Manager 3001 acts to control and commit (i.e., finalize) or abort a transaction session between the CSM and a transaction money module or customer service representative. A Create Account Profile function 3002 constructs from customer account information an account profile that allows a money module to access the subscriber's different bank accounts. A Public Key function certifies and signs a bank account profile. Since the CSM requires a host to interface to a customer service representative and the on-line banking systems, a To Host function 3006 mediates the separation of duties between the CSM applications and the host applications. A Claim Lost Notes function 3008 is responsive to subscriber lost note claims, which the CSM validates and distributes to the issuing banks. The Maintain Security function 3004 manages the list of compromised money modules, applies for certificates, synchronizes the clocks, and manages the creation of new digital keys. Clock/Timer 3012 and Cryptography functions 3010 are identical to those functions in the money modules.

Figure 4B:
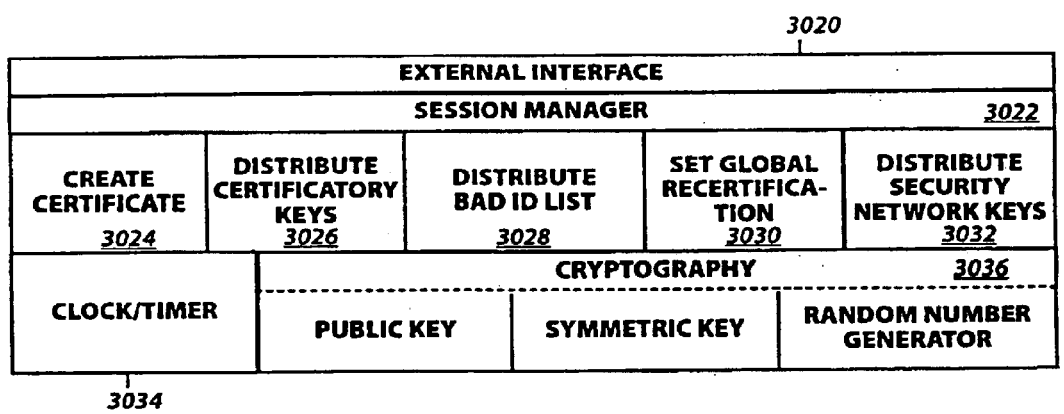
FIG. 4B illustrates the functional components of a primary security server.

FIG. 4B shows the functional components of a primary security server 1182. An External Interface function 3020 provides a communications layer for network interfacing. A Session Manager function 3002 controls the security aspects of a session with security servers, which are treated as if they may be compromised, and with other primary security servers. A Create Certificate function 3024 creates a certificate for any of the security servers. A Distribute Certificatory Keys function 3026 distributes the Certification Agency's list of valid primary security server public keys to the security servers. A Distribute Security Network Keys function 3032 manages and distributes security network keys among primary security servers, and to security servers. A Set Global Recertification function 3030 determines whether global recertification is required (e.g., because of a dangerous breach of security) and calls for global recertification when deemed necessary. A Distribute Bad ID List function 3028 controls and distributes the list of bad identifiers. Clock/Timer 3034 and Cryptography functions 3036 are identical to those functions in the money modules.

Network Sign-On

Figure 5:
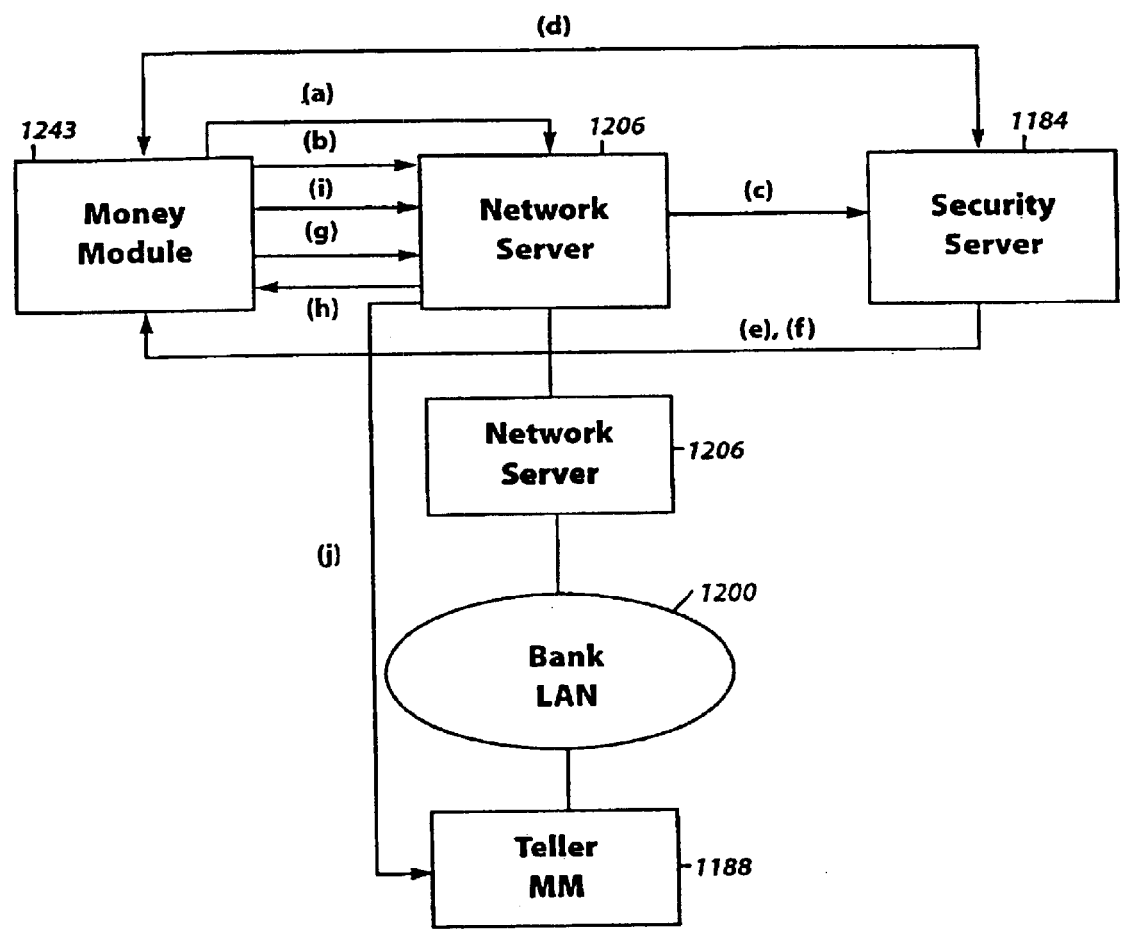
FIG. 5 shows an overview of the network sign-on procedure.
Figure 6A:
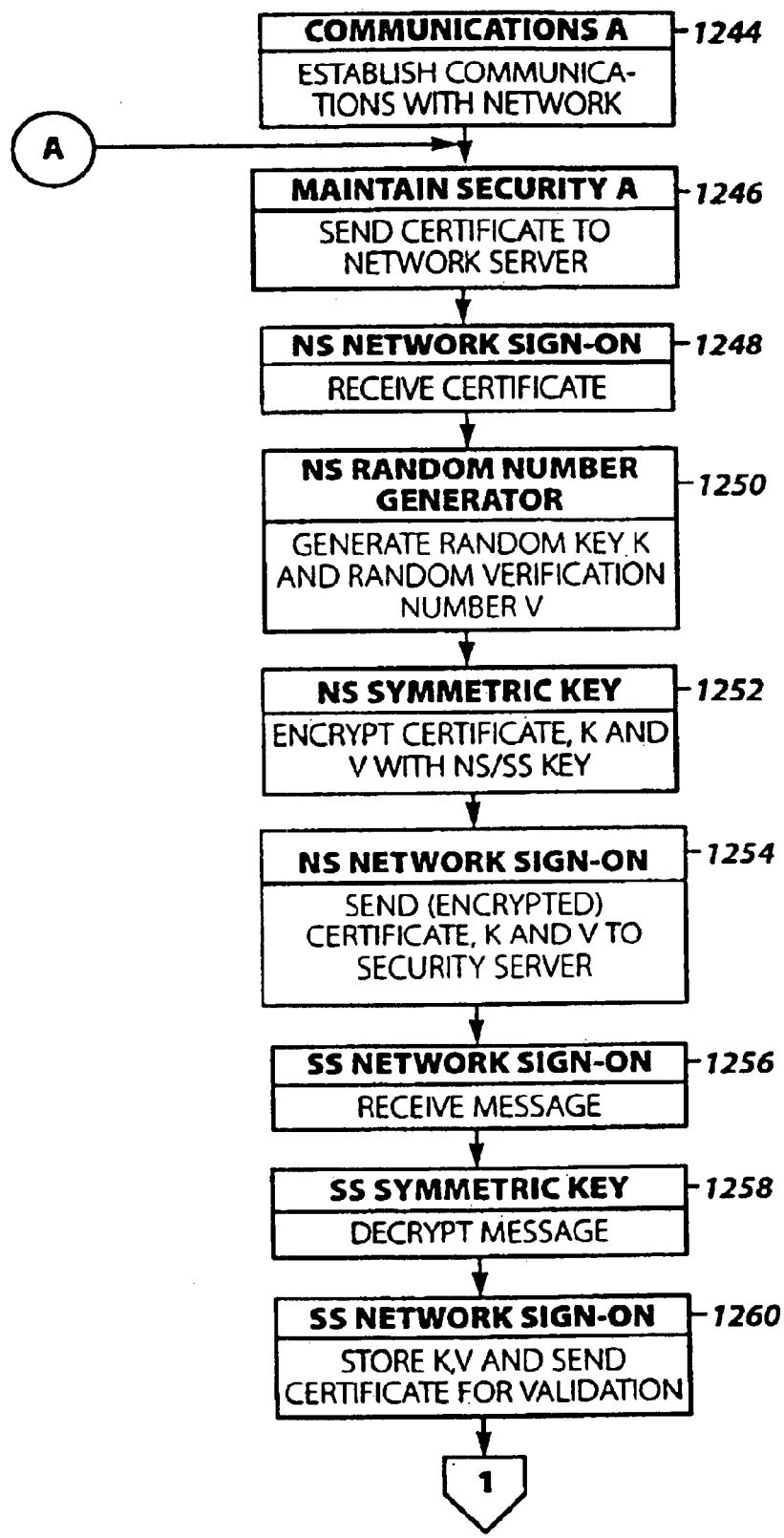
FIGS. 6A–6K illustrate a Network Sign-On protocol.
Figure 6B:
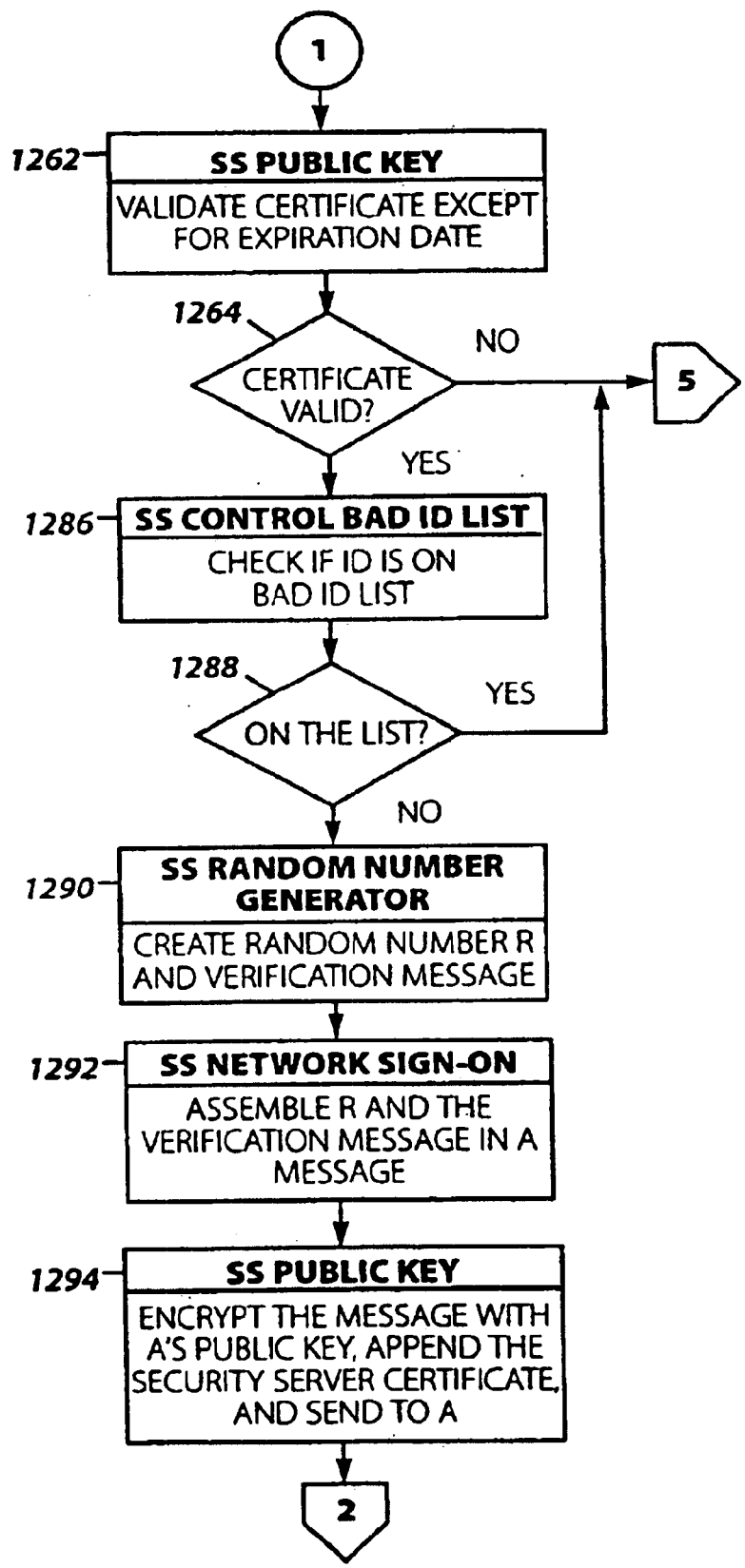
Figure 6C:
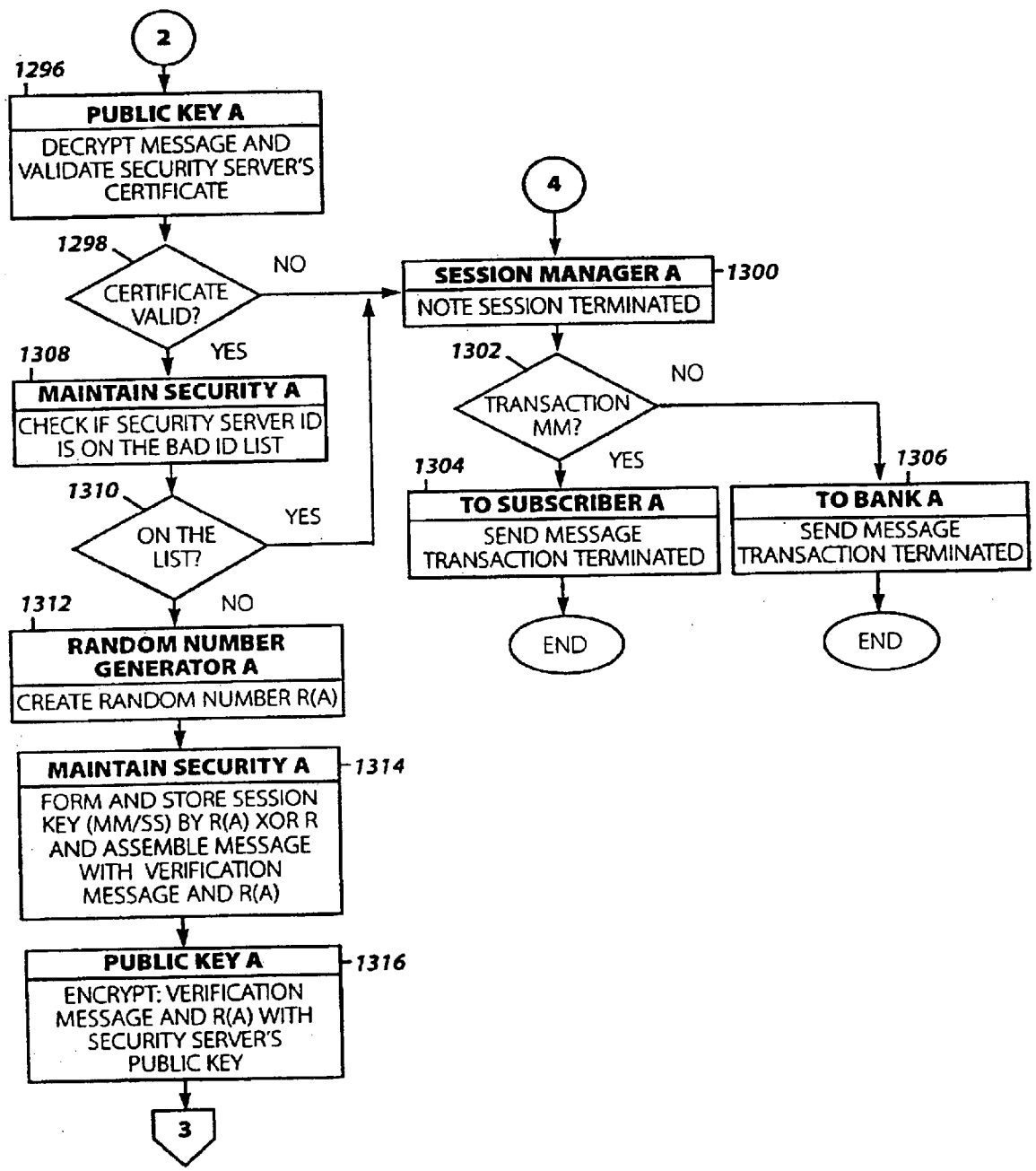
Figure 6D:
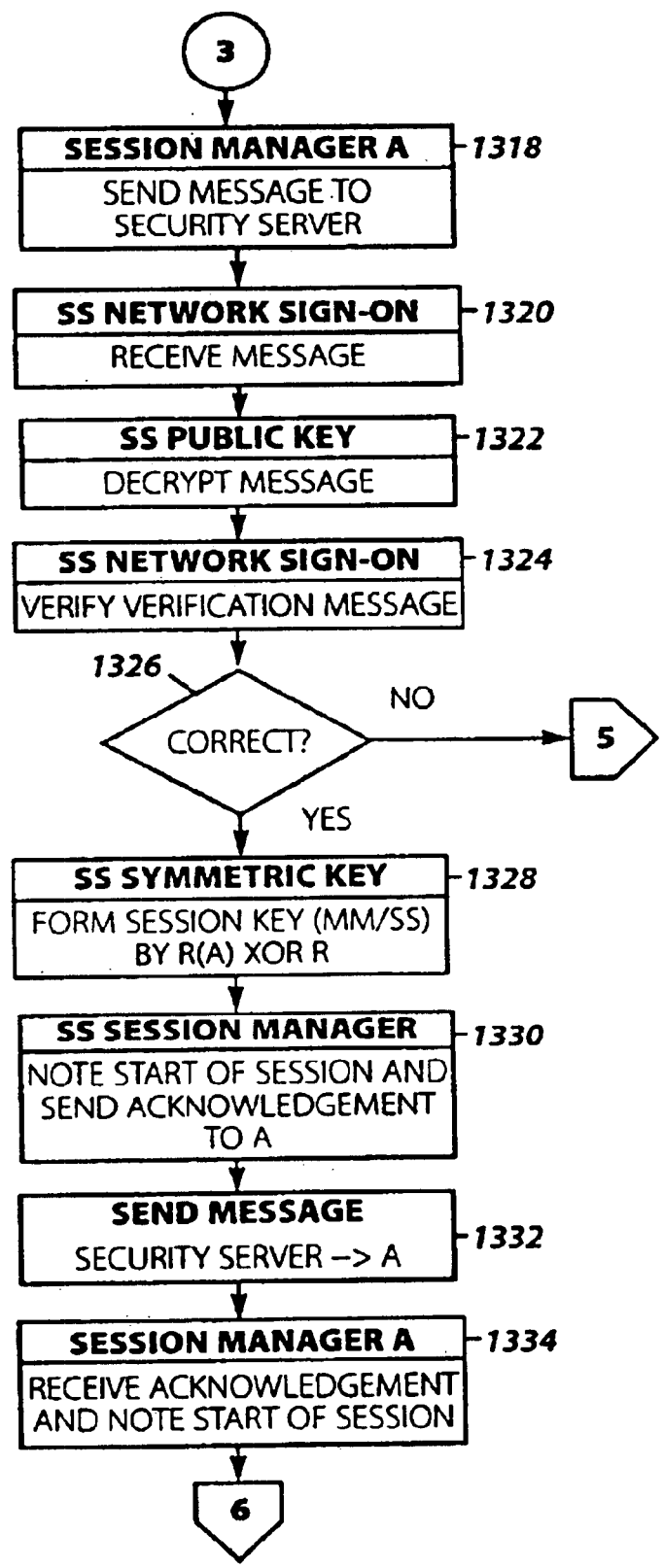
Figure 6E:
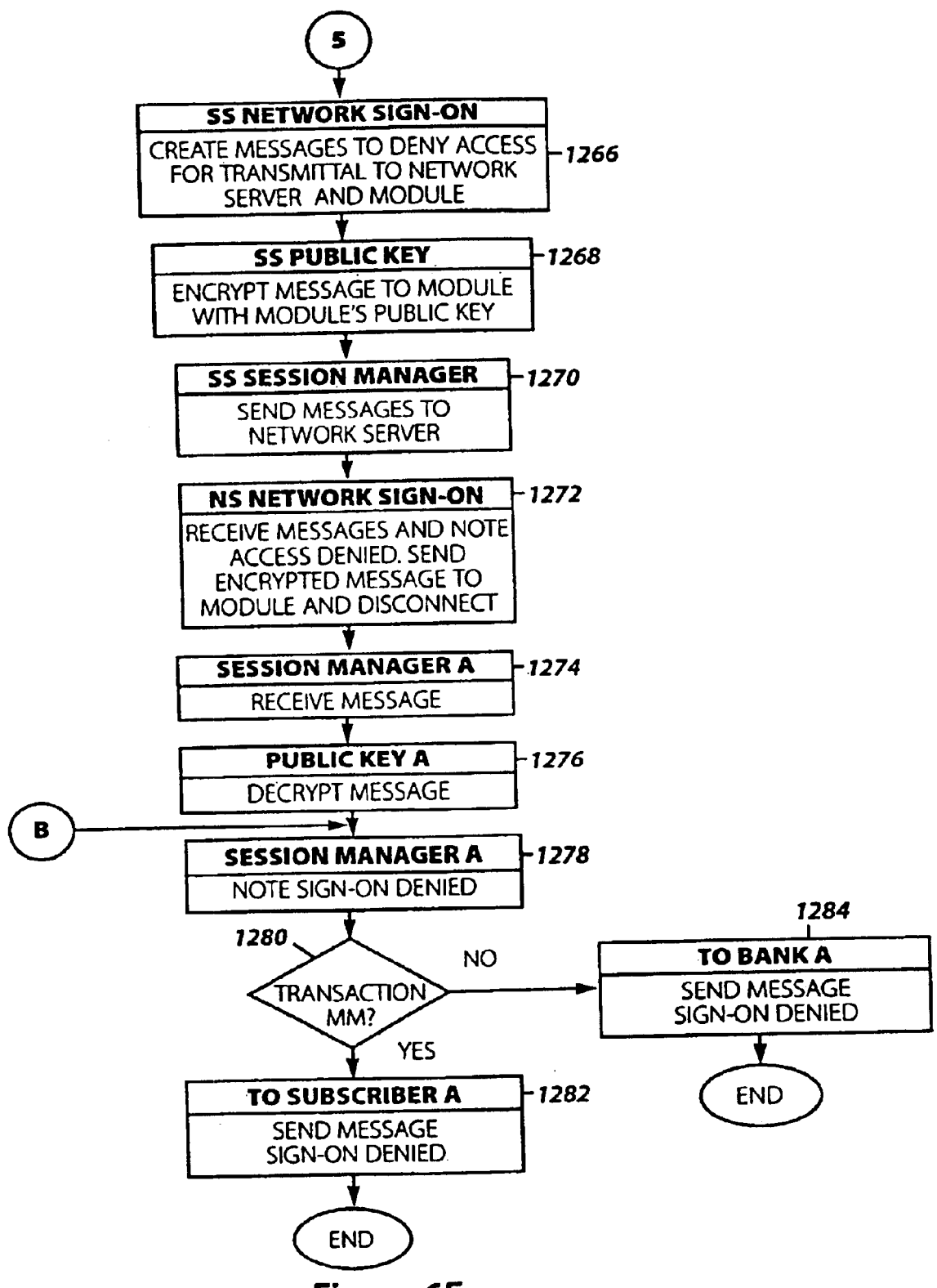
Figure 6F:
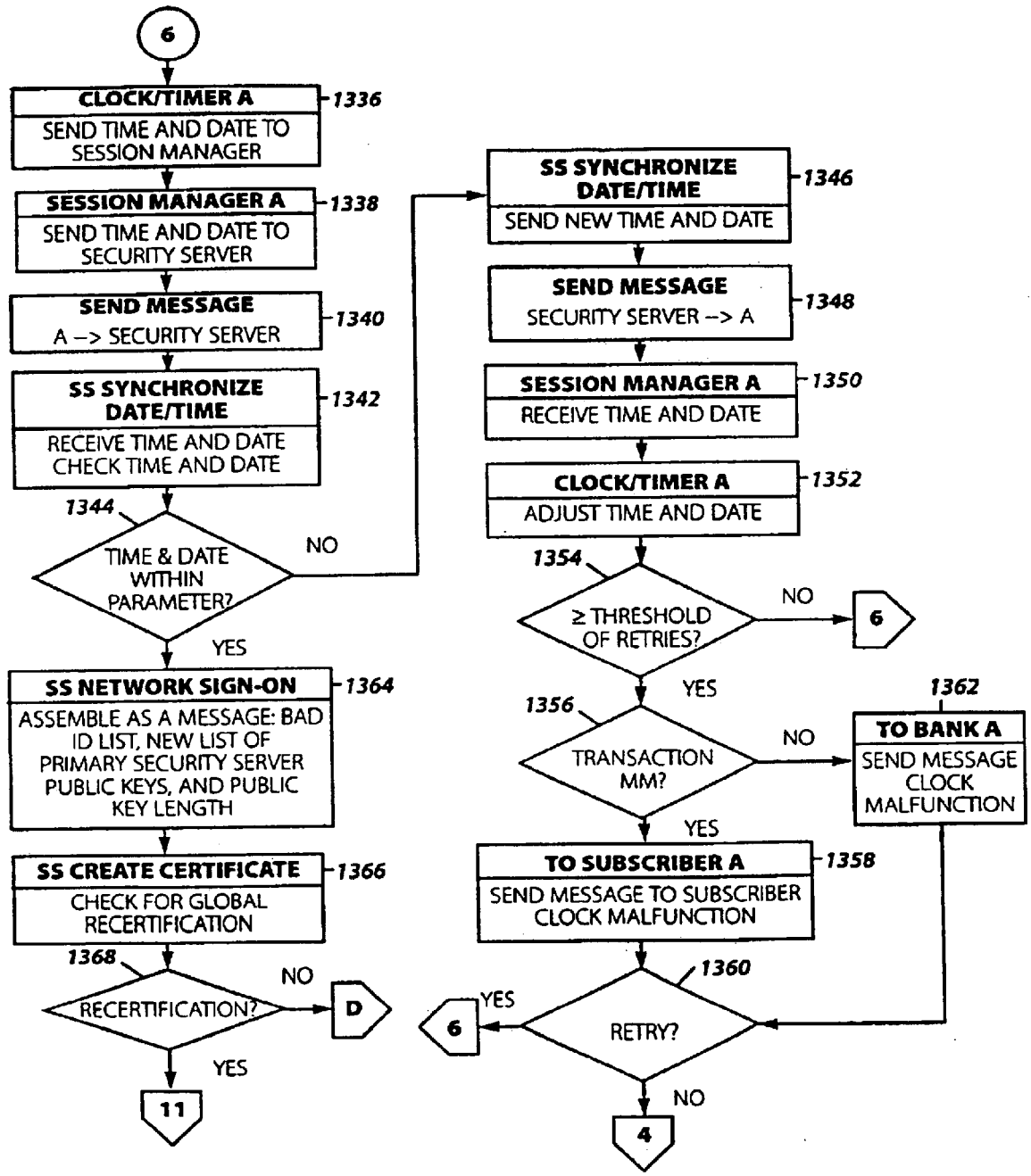
Figure 6G:
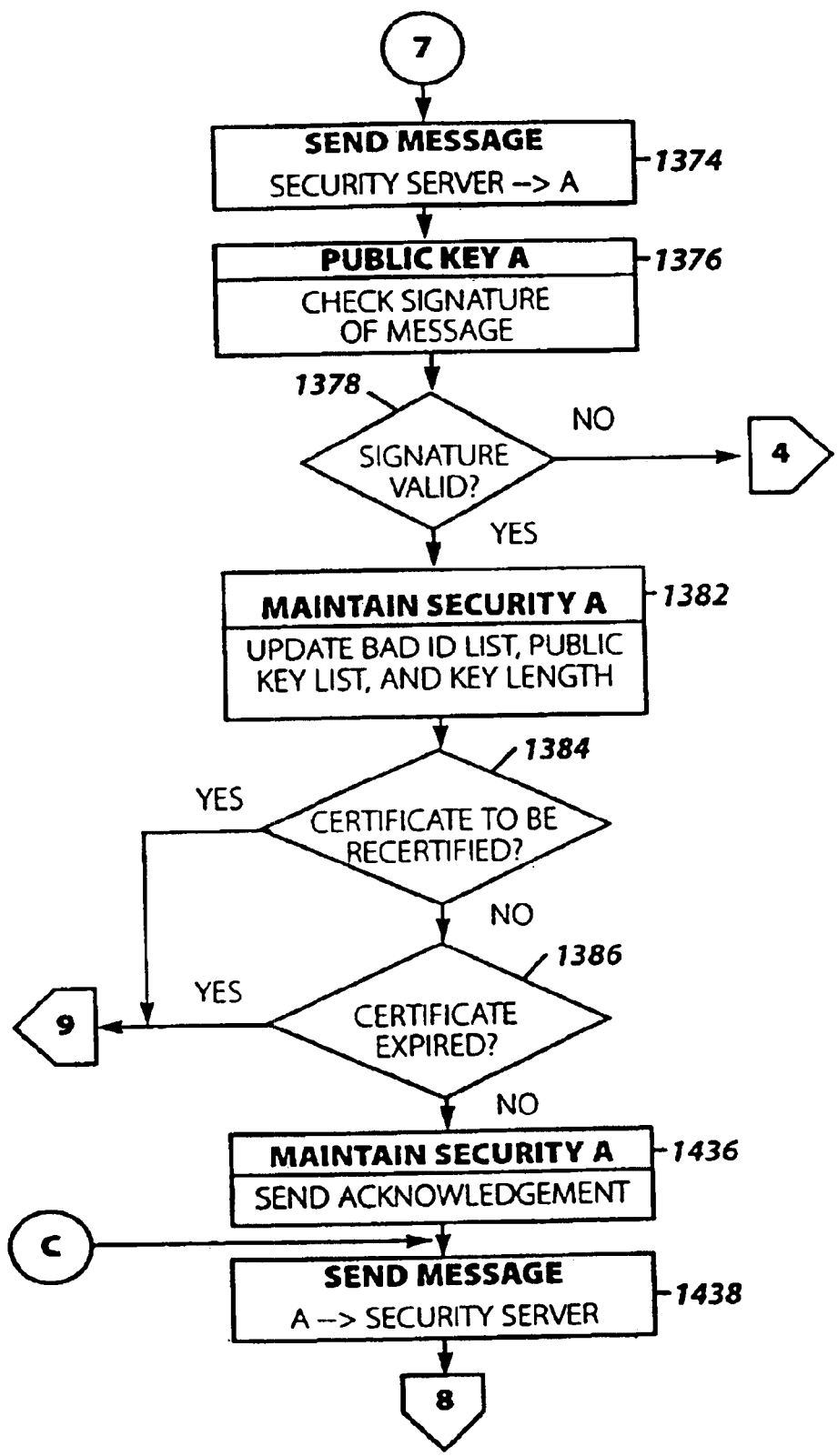
Figure 6H:
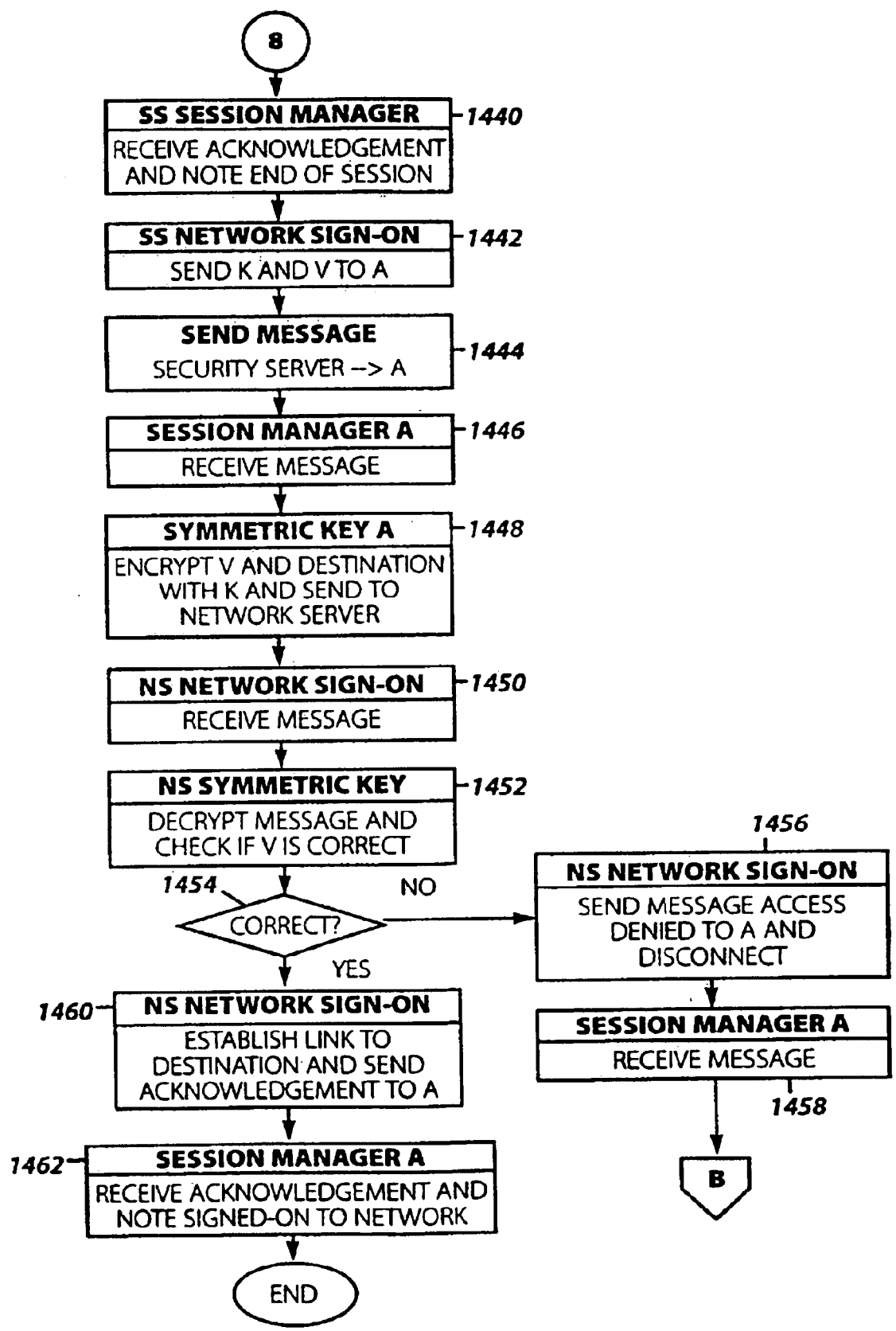
Figure 6I:
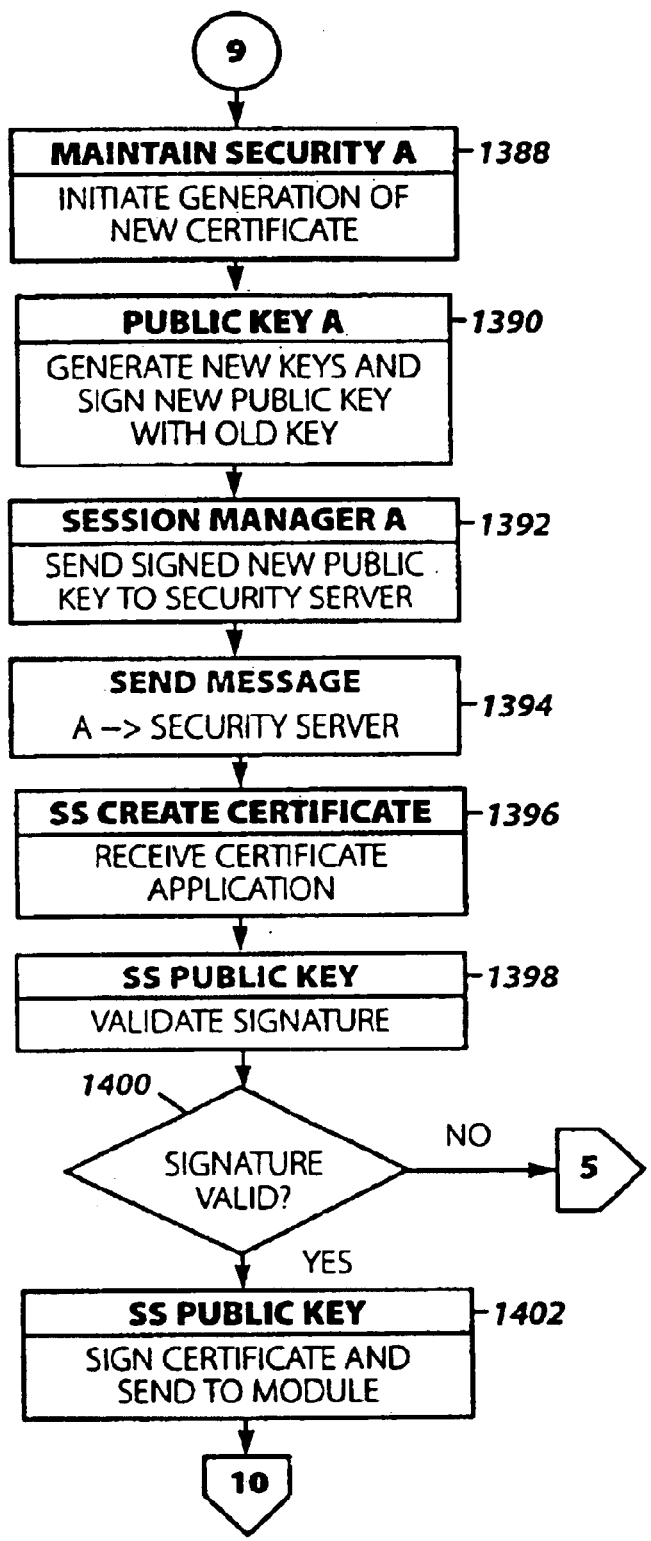
Figure 6J:
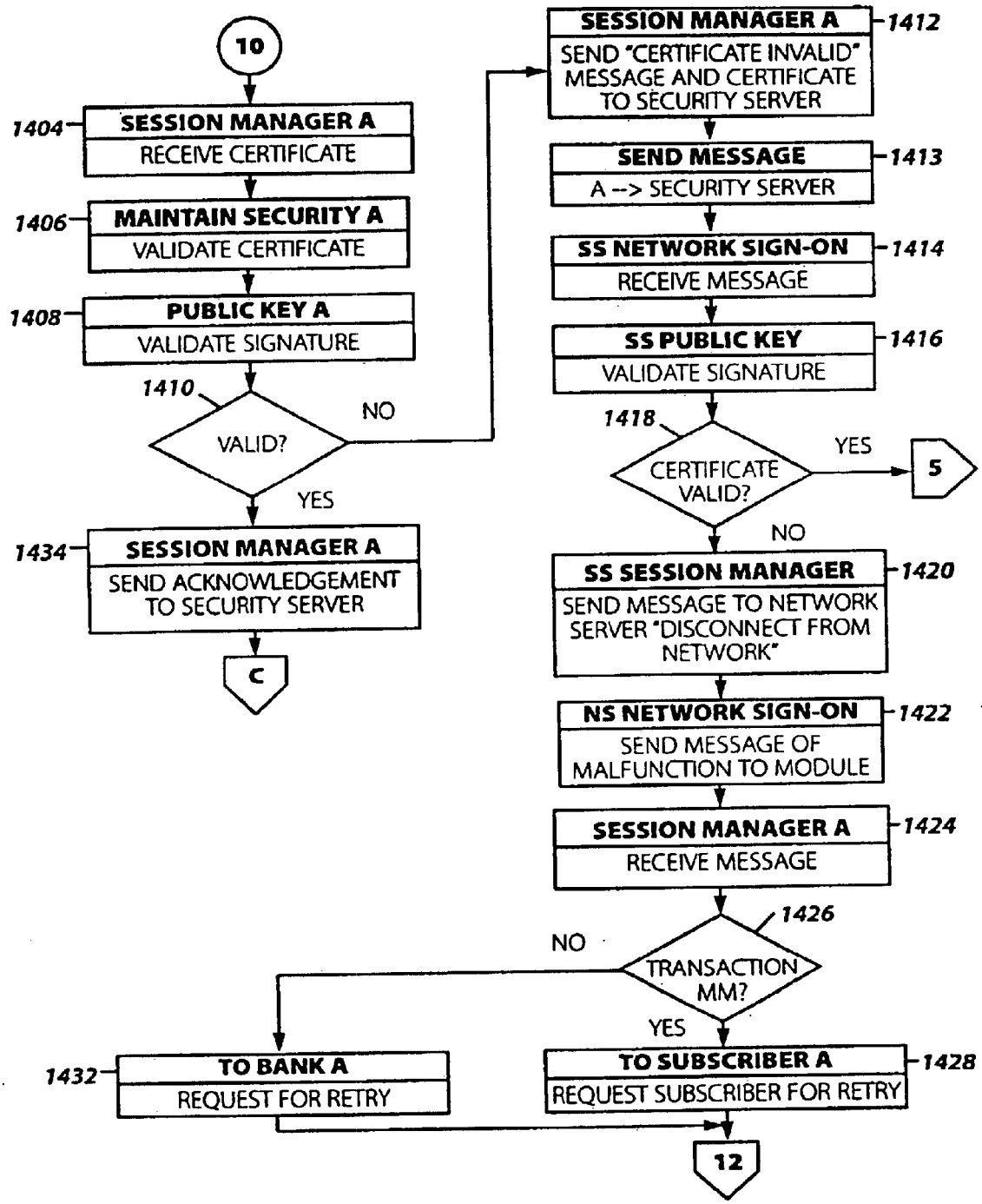
Figure 6K:
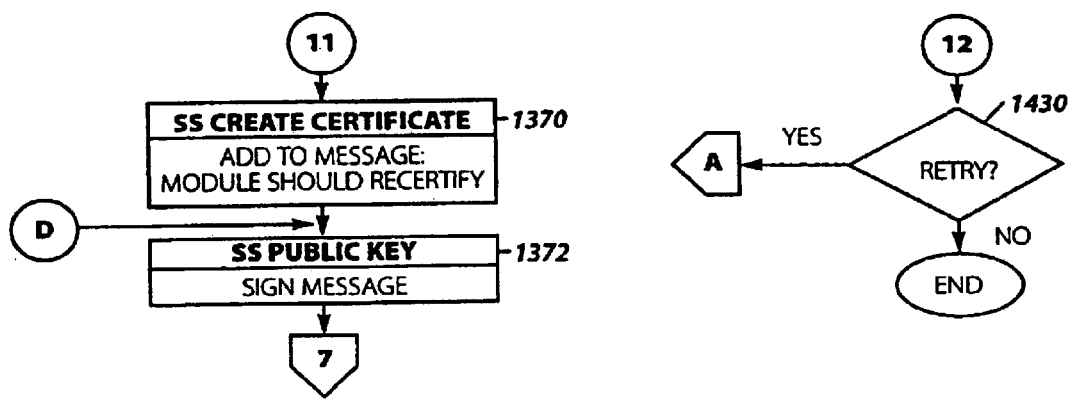
Figure 7A:
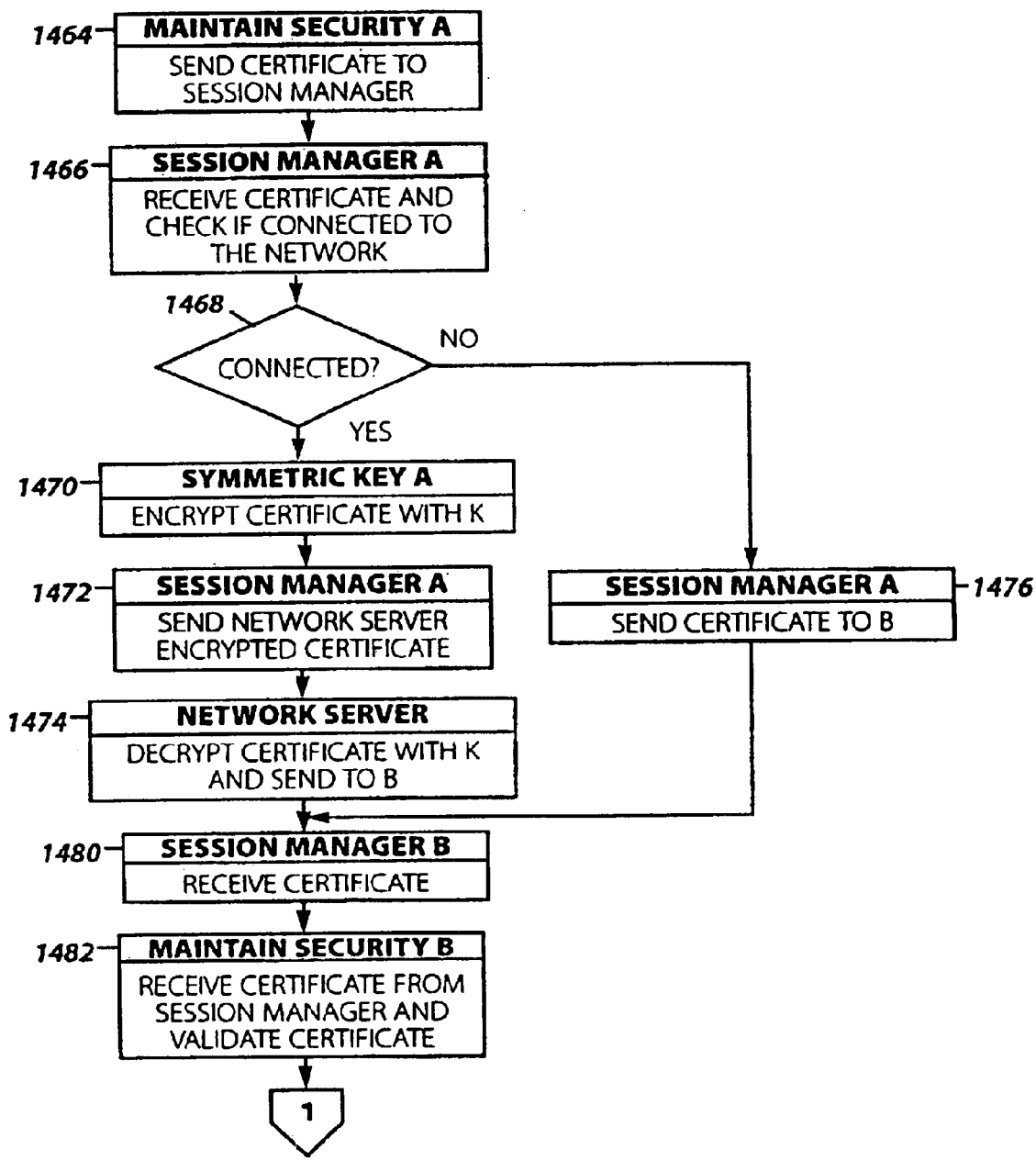
FIGS. 7A–7E illustrate an Establish Session protocol in the EMS.
Figure 7B:
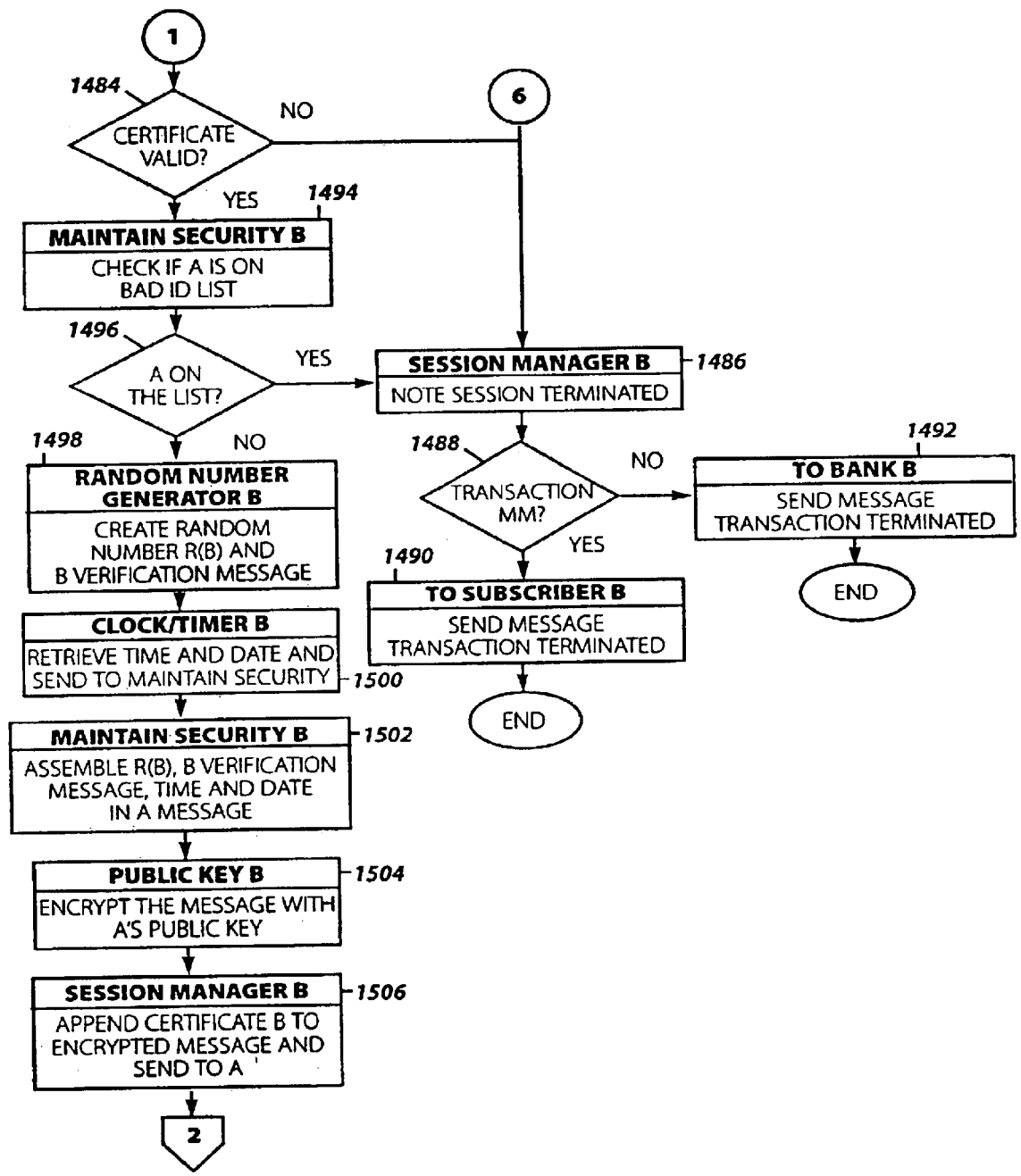
Figure 7C:
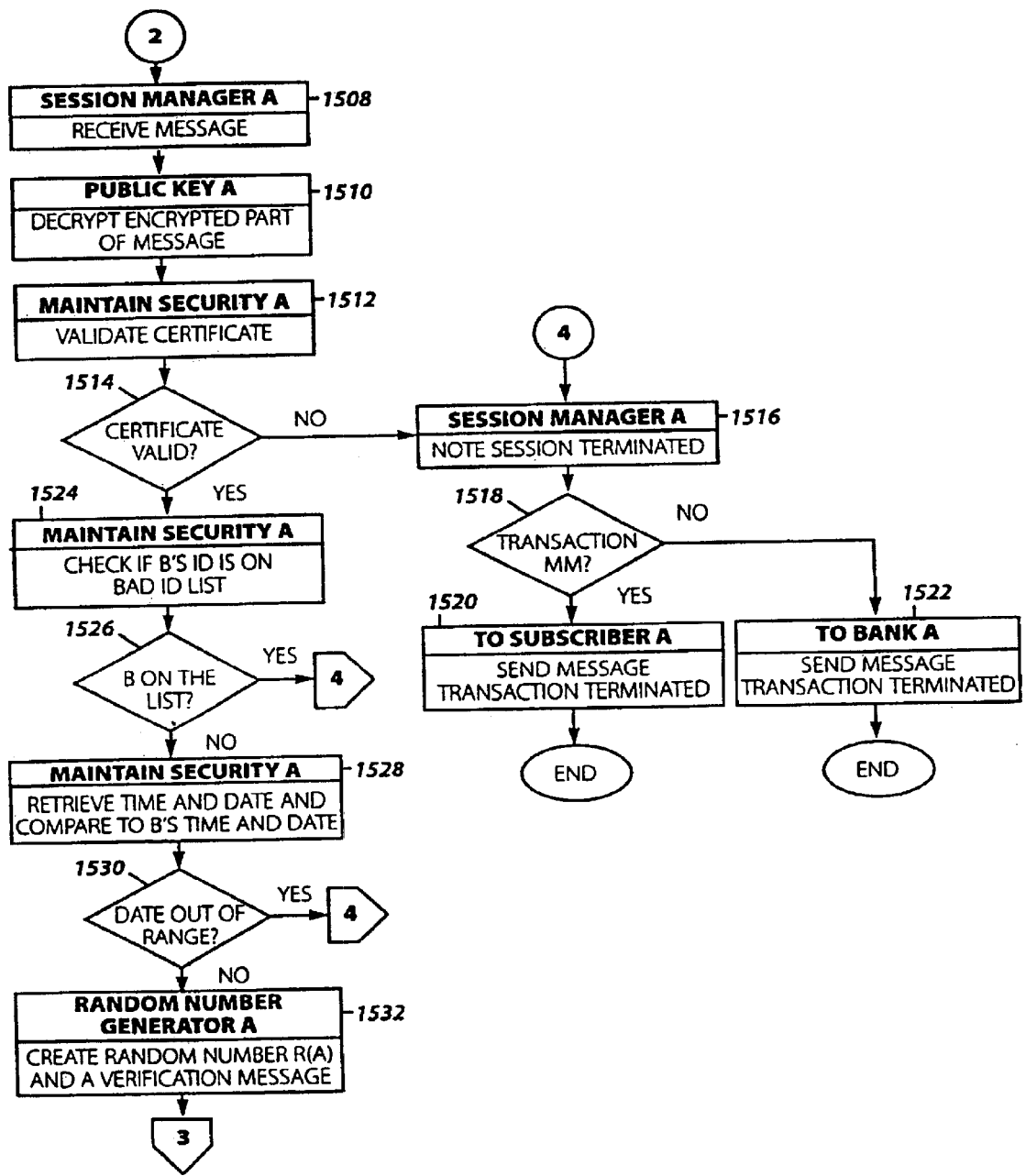
Figure 7D:
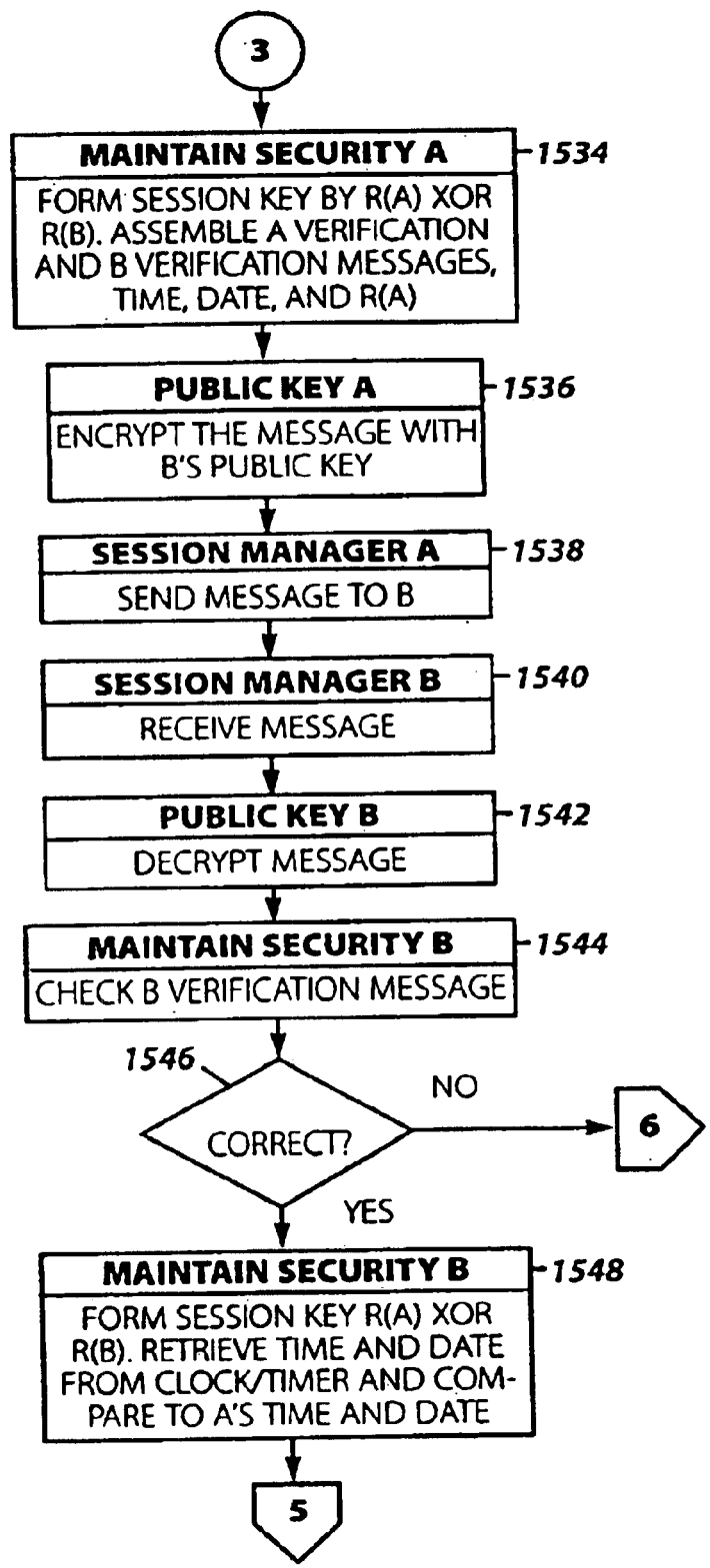
Figure 7E:
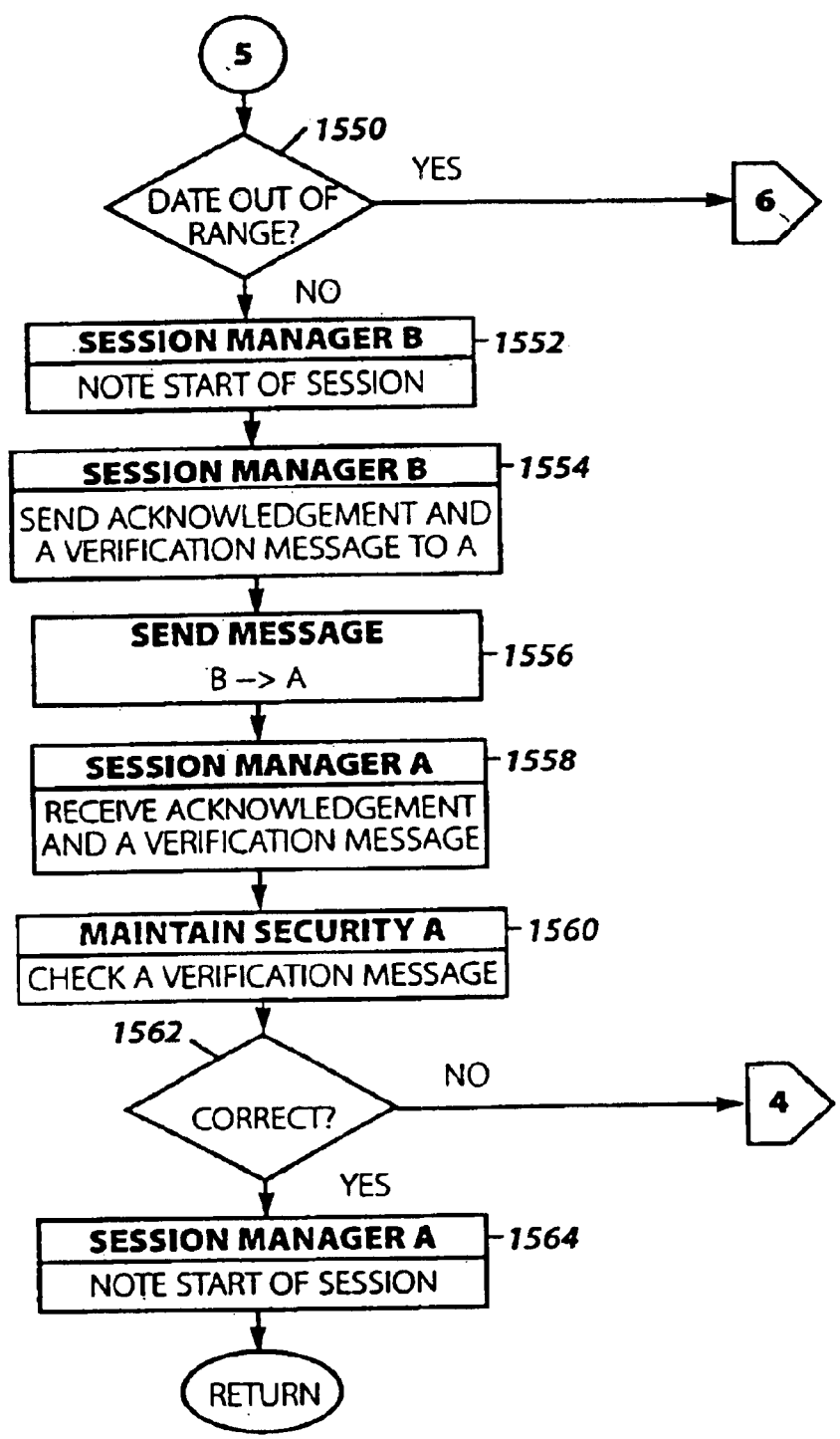

An overview of the network sign-on procedure is provided with reference to FIG. 5. The Sign-On protocol describes the situation where a module 1243 desires access to the EMS Network 1198 for recertification, deposit, withdrawal or other reason. The module 1243 may be a transaction money module 1186, teller money module 1138, money generator module 1188, or customer service module 1192. (a) Establish a communication between module 1243 and network server 1206. (b) Pass the module's certificate to the network server 1206 (c) The network server 1206 generates a random verification number V and a random key K the network server then passes the module's certificate, V, and K to a security server 1184 (encrypted by a NS/SS key). (d) The module 1243 and the security server 1184 establish secure communication session (via session key (MM/SS)). (e) The security server 1184 passes the time/date, update bad ID list, update list of primary security server public keys, public key length, global recertification (if necessary), and recertified module certificate (if necessary). (f) End session with module 1243 and send V and K to the module 1243. (g) Encrypt V with K and send to the network server 1206. (h) The network server 1206 acknowledges network sign-on to the module 1243. (i) The module 1243 then informs the network server 1206 of the destination (if any) to which it wishes to be connected. (j) The network server 1206 establishes a connection to the destination.

The network sign-on is designed so that no one can spoof the module 1243 or intercept any of its information in the clear. FIG. 6 describes the detailed flow of the network sign-on procedure.

Communications A establishes communications with the EMS Network 1198 (step 1244). Maintain Security A sends its certificate to the network server 1206 (step 1246). NS Network Sign-On receives the certificate (step 1248). NS Random Number Generator generates random key K and random verification number V (step 1250). NS Symmetric Key encrypts the module's certificate, K and V with a NS/SS key (step 1252). NS/SS keys are local symmetric keys installed in network servers 1206 and security servers 1184 which communicate for network sign-on. NS Network Sign-On sends the certificate, K and V to the security server 1184, where SS Network Sign-On receives the message and SS Symmetric Key decrypts the message (steps 1254–1258). SS Network Sign-On stores K and V and then sends the module certificate to SS Public Key for validation (steps 1260–1264). In order to allow for the possibility of recertification, SS Public Key does not consider the expiration date in determining the validity of the module certificate.

If the module certificate is not valid, then SS Network Sign-On creates messages to deny access for transmittal to the network server 1206 and module 1243 (step 1266). SS Public Key encrypts the message to the module 1243 with the module's public key and SS Session Manager sends the messages to the network server (step 1268–1270). NS Network Sign-On receives the messages and notes access denied. The encrypted message is then sent to the module, and the network server disconnects. (Step 1272). Session Manager A receives the message, Public Key A decrypts the message, and Session Manager A notes that sign-on was denied (steps 1274–1278). If the device requesting sign-on was a transaction money module, then To Subscriber A informs the subscriber (steps 1280–1282). Otherwise, To Bank A informs the bank (step 1284).

If, on the other hand, the module's certificate is valid, then SS Control Bad 1D List checks if the module's id is on the bad id list (steps 1286–1288). If the id is on the list, then network access is denied. Otherwise, SS Random Number Generator creates random number R and a verification message (step 1290). SS Network Sign-On assembles R and the verification message in a message which is encrypted by SS Public Key using A's public key. Public Key A also augments this encrypted message by appending the security server's certificate. (steps 1292–1294). The message is sent to A where Public Key A decrypts the message and validates the security server's certificate (step 1298).

If the certificate is invalid, then A notes session termination and informs either the subscriber or the bank (steps 1304–1306). If the certificate is valid, then Maintain Security A checks if the security server's id is on the bad id list (steps 1308–1310). If on the list, then the session is terminated (steps 1300–1306). If not on the list, then Random Number Generator A creates random number R(A) (step 1312). Maintain Security A forms session key (MM/SS) by the operation R(A) XOR R and then stores the session key (step 1314).

A message containing the verification message and R(A) is assembled and encrypted with the security server's public key (step 1316). Session Manager A sends the message To SS Network Sign-On and SS Public Key decrypts the message (steps 1318–1322).

SS Network Sign-On verifies that the verification message is the one which it created (steps 1324–1326). If it is not, then the security server denies network access. If the verification message is correct, then SS Symmetric Key forms session key (MM/SS) by R(A) XOR R (step 1328). SS Session Manager notes the start of session and sends an acknowledgement to A by the Send Message subroutine (steps 1330–1332). Session Manager A receives the acknowledgement and notes the start of the session (step 1334).

Clock/Timer A sends the time and date to the Session Manager which sends it to the security server (steps 1336–1340). SS Synchronize Date/Time receives the time and date and checks if it is within parameter (steps 1342–1344). If not within parameter, then SS Synchronize Date/Time sends a new time and date to Session Manager A (steps 1346–1350). Clock/Timer A then adjusts the time and date (step 1352). A then resends its date and time to the security server for rechecking. If clock synchronization is attempted more than a set number of times, then a clock malfunction is reported to the subscriber or bank, which may then retry if desired (steps 1354–1362).

If, however, the time and date are within parameter, then SS Network Sign-On assembles a message containing the bad id list, the new list of primary security server public keys (which comes from the Distribute Certificatory Key function), and the public key length (the size of the public keys are varied periodically) (step 1364). SS Create Certificate checks if a global recertification has been called for, and ensures that the time period for the global recertification has not expired (steps 1366–1368). Such time period should be long enough so that everyone's certificate has been recertified or expired. The function should also check when the module last recertified because if it was certified during the period of the global recertification, then there would be no need to recertify.

If recertification is required, then SS Create Certificate adds to the previous message: module should recertify (step 1370). Then, whether or not a recertification is called for, SS Public Key signs the message (step 1372). The message is sent to A where Public Key A checks the digital signature on the message (steps 1374–1378). If the signature is invalid, then the session is terminated. Maintain Security A then updates its bad id list, public key list, and key length (step 1382).

Module A then checks if its certificate needs to be recertified (either because of a global recertification order or because of an expired certificate) (steps 1384–1386). If a new certificate is required, then Maintain Security A initiates the generation of a new certificate (step 1388). Public Key A generates new keys and signs the new public key with its old private key (step 1390). Session Manager A sends the signed new public key to the security server's SS Create Certificate (steps 1392–1396). SS Public Key then validates the signature on the new public key (steps 1398–1400). If not a valid signature, then the security server denies network access. If the signature is valid, then SS Public Key signs the module's new certificate and sends it to the module (step 1402). Session Manager A receives the certificate, Maintain Security A undertakes to validate the certificate, and Public Key A validates the signature (steps 1404–1410).

If the certificate is not valid, then Session Manager A sends a "Certificate Invalid" message and the certificate to the security server by the Send Message function (steps 1412–1413). SS Network Sign-On receives the message and SS Public Key validates the signature (steps 1414–1418). If the security server determines that the certificate is actually valid, then it denies the module access to the network. If, however, the certificate is invalid, then SS Session Manager informs the network server that it will disconnect from the network (step 1420). NS Network Sign-On informs the module of the malfunction (step 1422). The module then queries the subscriber or the bank for a retry (steps 1424–1432).

If, on the other hand, the module determines that its new certificate is valid, then Session Manager A sends an acknowledgement to the security server (step 1434). Similarly, if no new certificate was required then Maintain Security A sends an acknowledgement message to the security server (steps 1436–1438). In either case, SS Session Manager receives the acknowledgement and notes the end of its session with the module (step 1440). SS Network Sign-On then sends K and V to A (steps 1442–1444). Session Manager A receives the message and Symmetric Key A encrypts V and the destination with K and sends the message to the network server (steps 1446–1448). NS Network Sign-On receives the message and NS Symmetric Key decrypts the message and checks if V is the same V it previously generated (steps 1450–1454).

If V is incorrect, then NS Network Sign-On sends an access denied message to A and then disconnects (steps 1456–1458). If V is correct, then NS Network Sign-On establishes a link to the destination and sends an acknowledgement to A (step 1460). Finally, Session Manager A receives the acknowledgment and notes that A has signed-on to the EMS Network 1198 (step 1462).

Establish Session

FIG. 7 shows the Establish Session protocol. Maintain Security A sends the module certificate to the session manager, and Session Manager A receives the certificate and checks if money module A is connected to the network (steps 1464–1466). If money module A is not connected to the network, then Session Manager A sends the certificate received from Maintain Security A to destination B (step 1476).

Alternatively, if money module A is connected to the network, then Symmetric Key A encrypts the certificate with K and Session Manager A sends the encrypted certificate to the network server (step 1468–1472). The Network Server decrypts the certificate with K and sends the certificate to destination B.

Regardless of whether the certificate was sent by the Network Server or by Session Manager A, Session Manager B receives the certificate and Maintain Security B (if B is a security server, then this function is performed by the Session Manager) validates the certificate (steps 1480–1482). If the certificate is not valid, then Session Manager B notes the session is terminated and informs either the subscriber or the bank (steps 1486–1492) (if B is a security server, then B merely notes the transaction is terminated).

If the certificate is valid, then Maintain Security B checks if A is on the bad id list (steps 1494–1496). If A is on the list, then the session is terminated. If A is not on the list, then Random Number Generator B creates random number R(B) and a B verification message (step 1498). Clock/Timer B retrieves the time and date (step 1500). Maintain Security B assembles R(B), B verification message and time and date in a message (step 1502). Public Key B encrypts the message with A's public key and Session Manager B appends B's certificate to the encrypted message and sends the message to A (steps 1504–1506).

Session Manager A receives the message, Public Key A decrypts the encrypted part of the message, and Maintain Security A validates B's certificate (steps 1508–1514). If the certificate is not valid, then Session Manager A notes the termination of the session and informs either the subscriber or the bank (steps 1516–1522). If the certificate is valid, then Maintain Security A checks if B is on the bad id list (steps 1524–1526). If B is on the list, then the session is terminated. If B is not on the list, then Maintain Security A retrieves the date and time and compares it to B's date and time (steps 1528–1530). If the date and time are out of range, then the session is terminated.

If the date and time are in range, then Random Number Generator A creates random number R(A) and an A verification message (step 1532). Maintain Security A then forms a session key by the operation R(A) XOR R(B) (step 1534). The A verification message, the B verification message, the time, date and R(A) are assembled into a message and encrypted with B's public key (step 1536). The message is sent to B by Session Manager A (step 1538). Session Manager B receives the message, Public Key B decrypts the message and Maintain Security B checks the B verification message (steps 1540–1546). If the B verification message is incorrect, the session is terminated. If the B verification message is correct, then Maintain Security B forms the session key by R(A) XOR R(B) (step 1548). The time and date are retrieved and compared to A's time and date to check if they are within a predefined range of each other (step 1550). If the time and date are out of range, then the session is terminated. If the time and date are in range, then Session manager B notes the start of the session (step 1552).

Session Manager B then sends an acknowledgement and the A verification message to A (steps 1554–1556). Session Manager A receives the message and Maintain Security A checks the A verification message (steps 1558–1562). If the verification message is not correct, the session is terminated. If the verification message is correct, then Session Manager A notes the start of the session (step 1564).

Transfer Notes

FIG. 8 shows the transfer notes protocol. Note Directory X chooses the note(s) and values for transfer, updates the note amount(s) and sequence number(s), and then sends the message to Notes (step 1566). Possible objectives in choosing the notes for transfer may, for example, be: (1) minimize the number of digital signatures (which requires processing time); (2) minimize the size of the packet; (3) maximize the usefulness of the electronic notes left to the transferring subscriber (i.e., pass the notes with the shortest time left until expiration). Such objectives may be achieved by the following note transfer algorithm: (1) determine all possible alternatives which contain the least number of notes; (2) determine which of these alternatives have the least number of transfers; (3) if more than one choice is left from step 2, choose the one which has the least number of monetary unit days. Monetary-unit days=residual value of note to be transferred times the number of days left until the note expires, summed for all the notes in the packet.

Notes X, upon receiving the message from Note Directory X, creates a transfer to be appended to each note being transferred (step 1568). Public Key X creates signatures for the note(s) (step 1570). Packet Manager X then assembles the note(s) with their new transfer(s) and signature(s) in a packet and sends the packet to Y (steps 1572–1574). Packet Manager Y receives the packet and disassembles it (step 1576).

Verify Y validates all certificates in the note(s) (e.g., money generator certificate and all transfer certificates). Then Verify Y verifies that the identification numbers in the transfer group match up with the module identification numbers of the certificates in the signature and certificate group throughout the history of the electronic note. Also, the consistency of the transfer amounts for each note is validated by ensuring that throughout the electronic note history the amount transferred in each successive transfer is less than that of the immediately precedent transfer. In addition, the total amount transferred is checked to ensure it is the amount expected. (Steps 1578–1580). If not valid, then the transaction is aborted (step 1582).

If valid and Y is a transaction money module, then Verifier Y verifies the expiration dates of the note(s) (steps 1584–1588). If any of the note(s) have expired, then the transaction is aborted. If none have expired, then Verifier Y checks each id from the note transfers against the bad id list (steps 1590–1592). If any of the transfer id's are on the bad id list, then the transaction is aborted.

If the transfer id's are not on the bad id list (or Y is not a transaction money module), then Public Key Y verifies the validity of the note(s) signatures (steps 1594–1596). If any of the signatures are not valid, then the transaction is aborted. If the signatures are valid, then Verifier Y checks if the note(s) bodies match note bodies that are stored by the Notes application or located in the Tran Log (steps 1598–1600). For each note body that matches, a note transfer tree is created in order to determine whether there has been any note duplication (steps 1602–1604). If any of the notes have been duplicated, then the transaction is aborted. This check for duplication (i.e., steps 1598–1604) is particularly directed to, and well suited for, thwarting individuals who attempt to create money by transferring notes by "self-dealing" using a compromised transaction money module.

If there are no duplicates, or if no matches of note bodies were identified, then Notes Y places the note(s) in the money holder (step 1606). Finally, Note Directory Y updates the note(s) location(s) and amount(s), and also initializes sequence number(s) (step 1608).

It may be understood that the Transfer Notes process includes steps for updating and initializing a sequence number to facilitate note reconciliation (see "Money Issued Reconciliation"), checking if the transferree of any note is on the bad id list, and checking for note duplication. These additional features and steps make it difficult for adversaries to introduce and circulate duplicated notes, and enhance the ability to detect duplicated notes in circulation.

Foreign Exchange

FIG. 9 shows the protocol for a foreign exchange transaction using dollars and pounds as exemplary monetary units. Initially, A agrees to exchange with B dollars($) for pounds (£) at an exchange rate of $/£(step 1602). A and B then sign on their money modules and the modules prompt their subscribers for the type of transaction (steps 1604–1610). A chooses to buy foreign exchange and B chooses to sell foreign exchange (steps 1612–1614). A and B establish a secure transaction session (steps 1616–1620).

To Subscriber A prompts the owner/holder of A for the amount by type of note of dollars he wishes to exchange (step 1622). Pay/Exchange A receives the amount and Note Directory A checks if A has sufficient funds (steps 1624–1628). If the funds are not sufficient, then To Subscriber A prompts for a new amount which again is checked against existing funds (steps 1630–1632). If no new amount is entered, then the transaction is aborted (step 1634).

If funds are sufficient, then Pay/Exchange A sends the dollar amount to B (steps 1636–1638). To Subscriber B then prompts the owner/holder of B to select either the amount of pounds he wishes to exchange for the dollars or, alternatively, simply the exchange rate for the dollars (step 1640). Note Directory B checks for sufficient funds (steps 1642–1644). If funds are insufficient, then To Subscriber B prompts for a new rate and again existing funds are checked for sufficiency (steps 1646–1648). If, however, no new rate is selected, then Pay/Exchange B informs A of its insufficient funds (steps 1650–1652). A may then select a new amount for exchange or abort the transaction (steps 1630–1634).

If B has sufficient funds for the transaction, then Pay/Exchange B sends A an acknowledgement and the amount of pounds to be exchanged (the equivalent rate is also sent) (steps 1654–1656). To Subscriber A prompts to verify the amount of pounds and the rate (steps 1658–1660). If the amount and rate are incorrect, then Pay/Exchange A informs B that the amount and rate are incorrect (steps 1662–1664). To Subscriber B then prompts for a new rate (steps 1666–1668). If no new rate is chosen, then the transaction is aborted (step 1670).

If, however, A verifies the correct amount and rate of the transaction, then Pay/Exchange A passes the dollar amount to the money holder (step 1672). The dollar notes are then transferred from A to B (step 1674). Pay/Exchange B passes the pound amount to its money holder (step 1676). The pound notes are then transferred from B to A (step 1678).

At this point in the transaction, both A and B provisionally hold foreign exchange notes in the correct amounts. A and B have each participated in two transfers: A transfers: (1) A transferred dollars to B; (2) A received pounds from B. B transfers: (1) B transferred pounds to A; (2) B received dollars from A. To complete the foreign exchange transaction, A must now commit (i.e., finalize and permanently record in its transaction log) both of its two transfers. Similarly, B must commit both of its two transfers. Note that A may commit to the foreign exchange transfer A→B (dollars from A to B) and B A (pounds from B to A) separately. Likewise B may commit to the foreign exchange transfers A→B and B→A separately.

The next portion of the foreign exchange protocol is designed so that neither party knows the order in which the transacting money modules will commit. Such uncertainty will discourage parties from intentionally trying to tamper with a transaction. As background, a function S(X) is defined so that S(O)=A and S(1)=B, where A and B refer to money modules A and B. Thus, if X is randomly chosen as O or 1, then money module A or B is randomly indicated.

The following routine is used to allow A and B to commonly establish a random X. R(A) and R(B) are the random numbers generated by A and B, respectively, during the Establish Session subroutine. The parity of R(A) XOR R(B) is determined (by exclusive —ORing each bit of R(A) XOR R(B). This parity is the random number X. $\overline{X}$ is the complement of X($\overline{X}$=X XOR 1).

Referring again to FIG. 9, Tran Log A conditionally updates its transaction log to record the transfer S(X) to S($\overline{X}$) (step 1680). If X is calculated to be 0, then the transfer A to B (i.e., the dollar transfer) is conditionally recorded. If X is calculated to be 1, then the transfer B to A (i.e., the pound transfer) is conditionally recorded. Because the log is conditionally recorded, it may be rolled-back in the event money module A aborts the transaction. The update log becomes permanent once the log update has been set to unconditional (either as shown explicitly in the flow diagram or implicitly during a commit). Session Manager A then sends a "Log Updated" message to B (steps 1682–1684). In response, Tran Log B also conditionally updates its log to record the transfer S(X) to S($\overline{X}$) (step 1686).

If X=1, then Tran Log B sets the log update to unconditional (steps 1688–1690). Thus, at this point, B has committed to its transfer of pounds to A. Next, B follows the Commit protocol (step 1692) described subsequently with reference to FIG. 10. In this situation, A will commit to both its transfers (i.e., transferring dollars and receiving pounds) and B will commit to its one outstanding (uncommitted) transfer, namely receiving dollars.

If, however, X=O(step 1688), then Session Manager B sends a "Start Commit" message to A (steps 1694–1696). Tran Log A then sets its log update to unconditional (step 1698), thus committing to its transfer of dollars. The Commit protocol of FIG. 10 is then called (step 1700). During this protocol (described subsequently) B commits to both its transfers (i.e., transferring pounds and receiving dollars) and A commits to its one outstanding transfer, receiving pounds.

As can be seen, the F/X transaction commits each transfer of notes, thus keeping notes from being duplicated, which could occur if there were only one commit. The foreign exchange protocol ensures that neither party knows whose transfer (A's of dollars or B's of pounds) will be committed first. This reduces the incentive of a party to tamper with the transaction. Each transfer is committed separately, but the order of commit is chosen randomly by the two modules. A party who tries to interfere with the transaction has a 50—50 chance of losing money. Also, there is no incentive to interfere with the commit since the lost money can be reclaimed (see claim Lost Money).

Commit

FIG. 10 shows the Commit protocol for modules. Session Manager X sends a "Ready-to-Commit" message to Y (steps 1702–1704). This passes the obligation to commit to the module receiving the message. In a conventional money transfer scenario, this technique of passing the burden of committing first is used to ensure that the party transferring money commits first, so as to eliminate the possibility of duplicating money.

Session Manager Y then sends an acknowledgment to X (steps 1706–1708) and commits to any outstanding transactions by updating its transaction log (step 1710). Also, if Y is a transaction money module, then To subscriber Y notifies the subscriber of the successful transaction (steps 1712–1714). Session Manager Y notes the end of the session (step 1716).

Tran Log X receives the acknowledgement from Y and updates its transaction log, thus committing to any outstanding transfers. X completes its commit in the same manner as Y (steps 1718–1724).

Abort Transaction

FIG. 11 shows the Abort transaction protocol for modules. Session Manager X rolls-back changes and notes that the transaction is aborted (step 1726). Session Manager X then checks if the "Ready-to-Commit" message has been sent (steps 1728–1730). If so, then X updates its transaction log (step 1732) by recording that X committed after sending a Ready-to-Commit message and recording the note identifiers and amounts of each note received during the Transfer Notes protocol. Thus, the abort protocol logs information when the Abort subroutine is called during a failed Commit subroutine.

If X is a transaction money module 1186, and the Ready-to-Commit message was sent, then To Subscriber X informs its subscriber that the transaction was aborted and that there may have been a money transfer error (steps 1734–1738).

If X is a teller money module 1188, then To Bank X informs the bank that it should reverse its accounting transactions (by appropriate debits and credits) (steps 1740–1742). If X is a transaction money module 1186 and no Ready-to-Commit message has been sent, then To Subscriber X informs the subscriber that the transaction was aborted (step 1744).

In any event, Session Manager X then sends Y a message that the transaction cannot be completed (steps 1746–1748). Session Manager Y rolls-back its changes and notes the transaction as aborted (step 1750). Y then informs its subscriber that the transaction is aborted (steps 1752–1754) or informs the bank to reverse its accounting transaction (steps 1756–1758).

As described, if a transaction is interrupted during a commit protocol, it is possible that notes will be lost. If this occurs, the transferee will have aborted and the transferor will have committed to the transfer of notes. In this case, the transferee money module records information about the notes it should have received and notifies the subscriber that there is a potential problem (i.e, it did not receive the notes sent by A). It may be noted that in this circumstance, as far as the transferor money module is concerned, it properly transferred the notes.

The transferee money module subscriber can then make a claim for the money to the Certification Agency. The claim information would include the log record of the failed transaction. The Certification Agency could then check with issuing banks to see if the notes have been reconciled. After some period of time, if the notes have not been reconciled, the subscriber could reclaim his money.

POS Payment

Figure 12A:
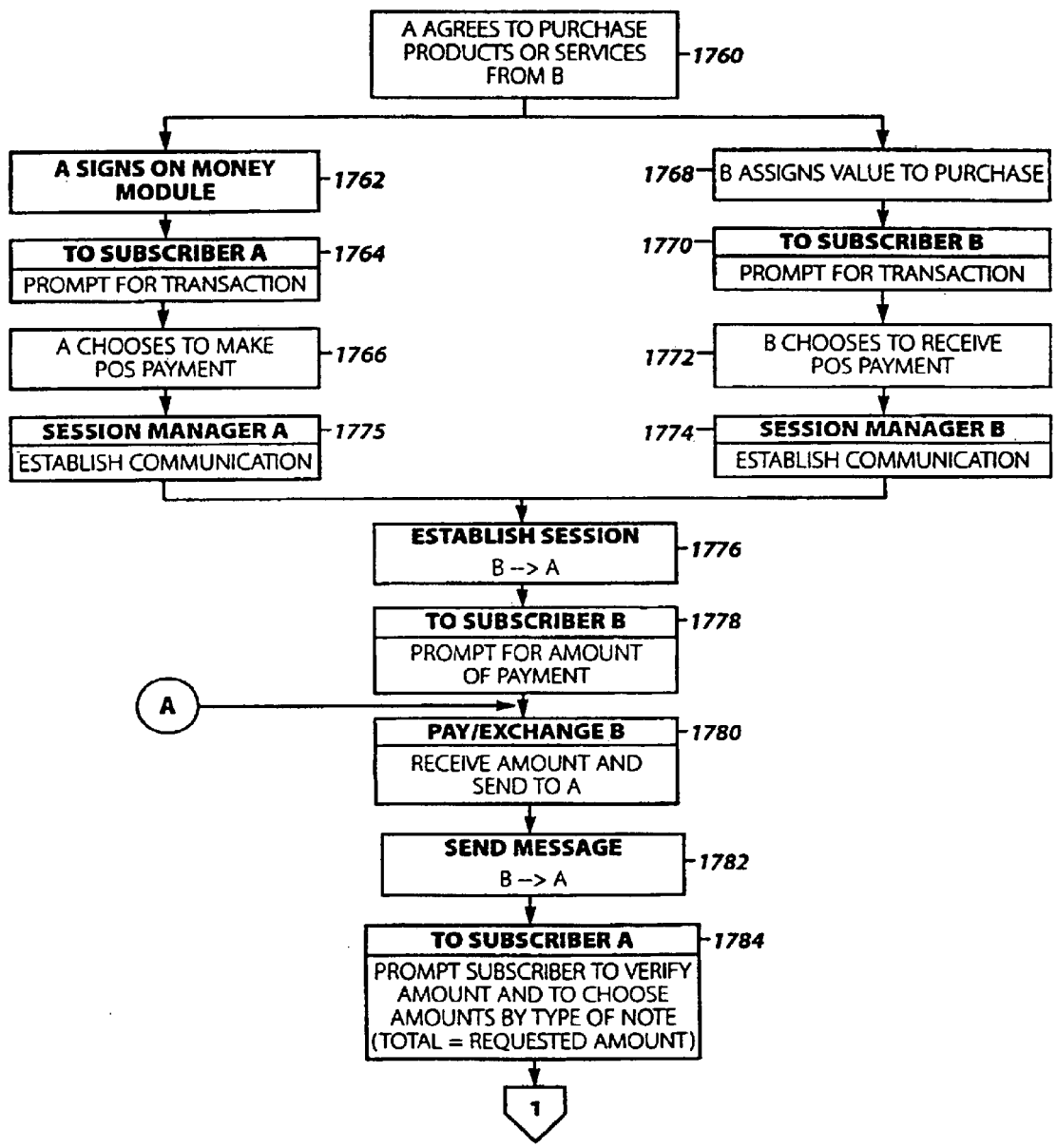
FIGS. 12A–12C illustrate a Point of Sale (POS) Payment protocol.
Figure 12B:
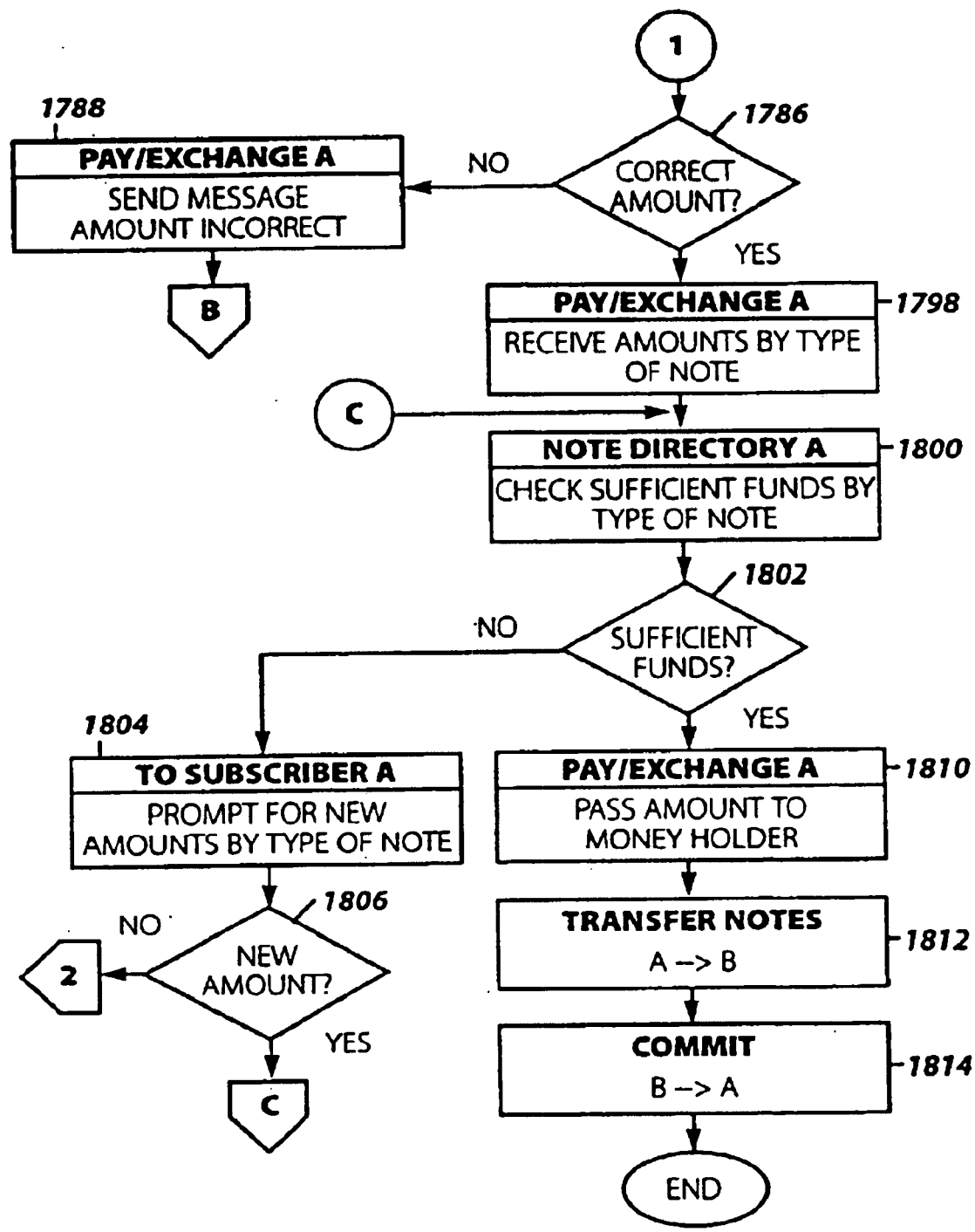
Figure 12C:
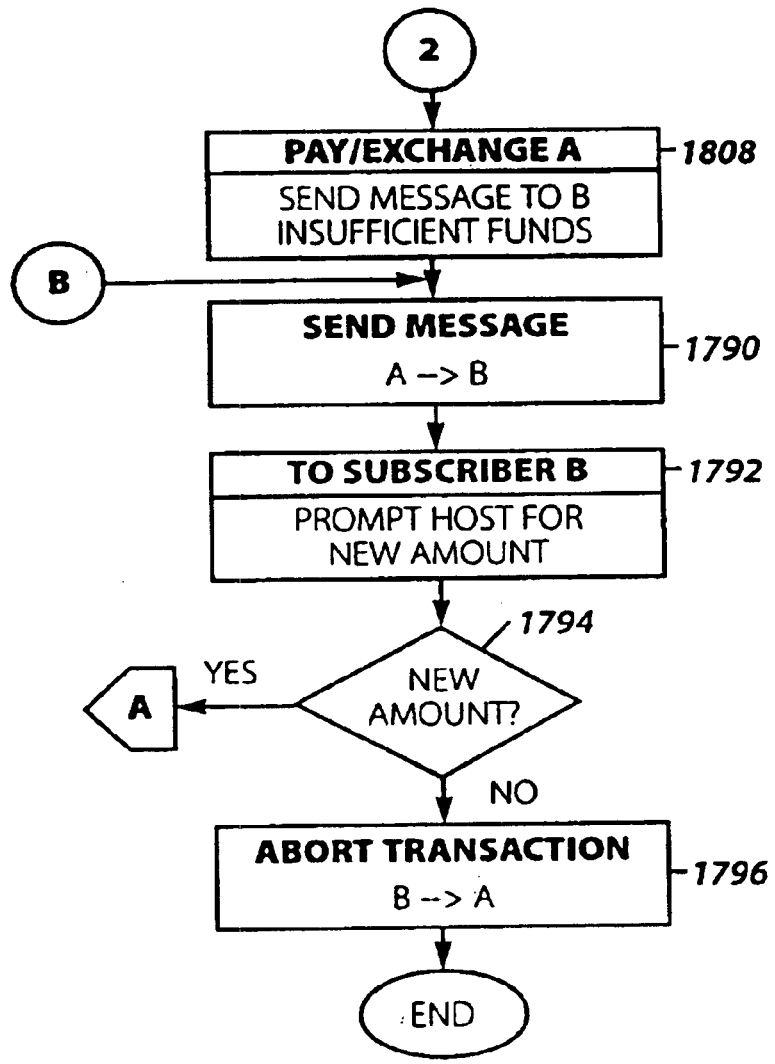

FIG. 12 shows a Point of Sale (POS) payment protocol. The POS Payment protocol is intended to simplify payments made between a buyer's transaction money module 1186 and a merchant's transaction money module 1186. The merchant's transaction money module 1186 may, for example, be located in a cash register at a supermarket.

Initially, A agrees to purchase products or services from B (step 1760). The owner/holder of transaction money module A signs onto his money module (step 1762). To Subscriber A prompts the owner/holder for a transaction and A chooses to make a POS payment (steps 1764–1766). Meanwhile, the merchant determines the total purchase price (step 1768). To Subscriber B prompts for a transaction and B chooses to receive a POS payment (steps 1770–1772). A and B then establish a secure session (steps 1774–1776).

To Subscriber B prompts for amount of payment and Pay/Exchange B receives the amount and sends it to A (steps 1778–1782). To Subscriber A then prompts its subscriber to verify the requested amount (steps 1784–1786). Moreover, the subscriber is requested to choose the notes in which it will pay (e.g., currency or credit) and the amounts so that the total equals the requested amount. If the requested amount is not correct, then Pay/Exchange A sends B a message indicating that the requested amount is incorrect (steps 1788–1790). To Subscriber B then prompts its host for a new amount (steps 1792–1794). If a new amount is not chosen then the transaction is aborted (step 1796).

If the requested amount is correct, then Pay/Exchange A receives amounts by type of note (step 1798). Note Directory A then checks for sufficient funds (steps 1800–1802). If funds are insufficient, then To Subscriber A prompts for new amounts by type of note (steps 1804–1806). If no new amount is entered, then Pay/Exchange A sends B a message that it has insufficient funds (steps 1808, 1790). To Subscriber B prompts host for new amount (steps 1792–1794). If no new amount is selected, then the transaction is aborted (step 1796). If a new amount is selected, then the payment transaction begins again.

If funds are sufficient, then Pay/Exchange A passes the amount to the money holder (step 1810). The notes are then transferred from A to B (step 1812). Finally, the transaction money modules commit (step 1814).

As can be seen, the POS payment is simplified for the buyer because it is a payee initiated payment. Generally, the POS payment would be used for payment to merchants for goods while the subscriber-to-subscriber (STS) payment would be used to pay individuals or to pay bills.

Update Credit from Issuing Bank

Figure 13A:
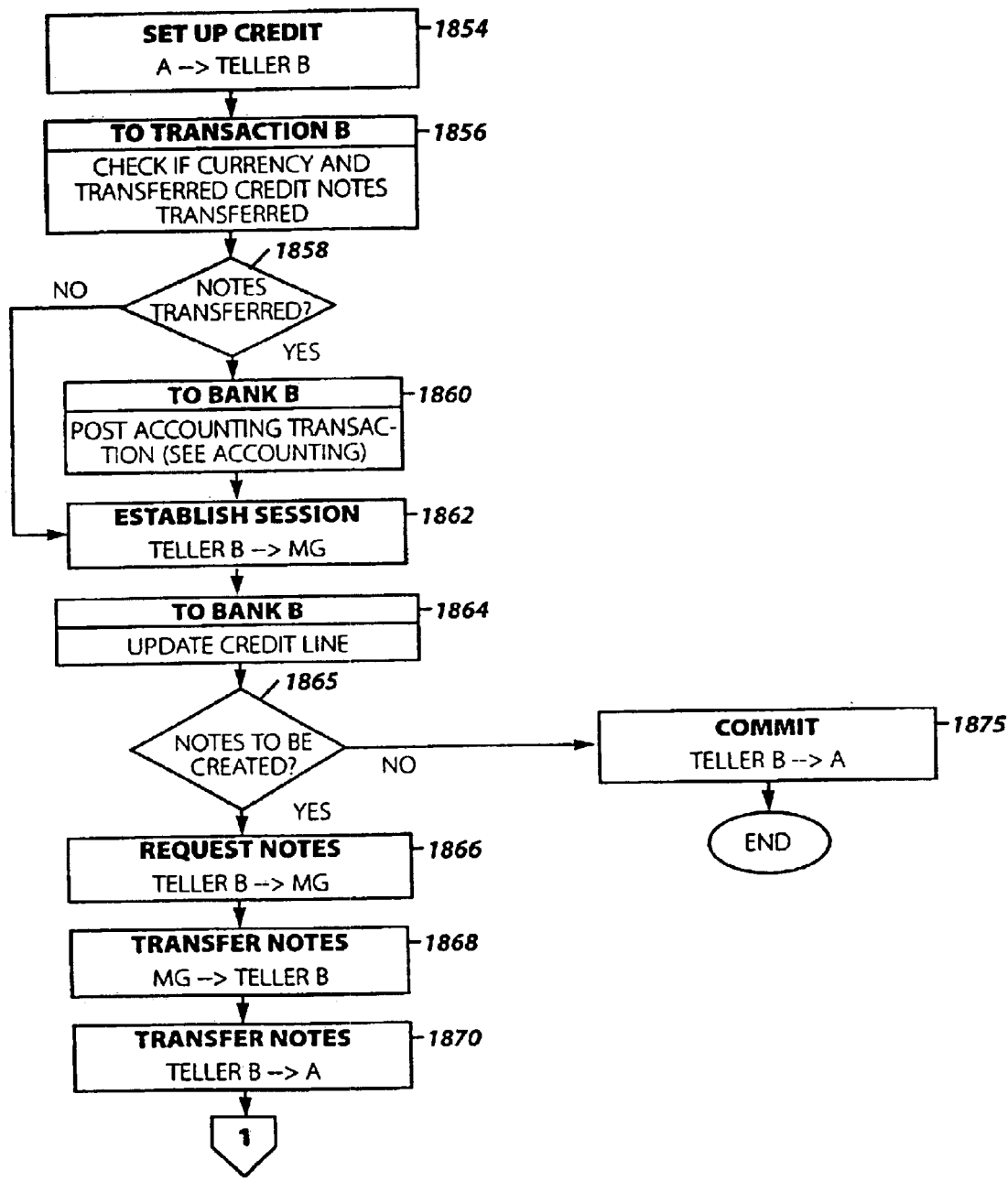
FIGS. 13A–13B illustrate an Update Credit form Issuing Bank protocol.
Figure 13B:
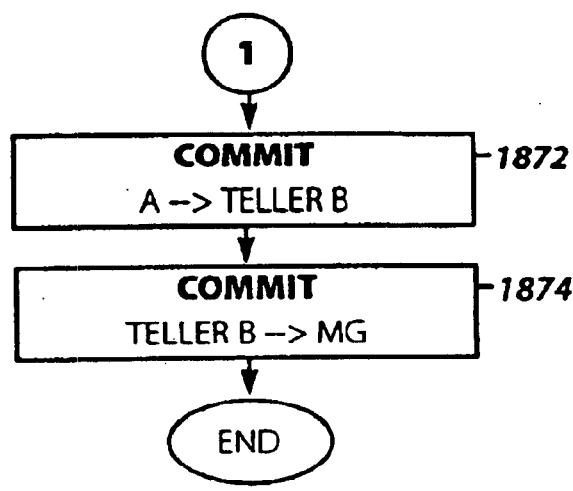

FIG. 13 shows an Update Credit from Issuing Bank transaction protocol, and particularly describes how subscribers acquire a credit note which is a preauthorized credit payment vehicle. A subscriber can carry up to one credit note for each credit account the subscriber owns. Note that every bank which allows a subscriber to receive updated credit notes is an issuing bank for those credit notes.

Figure 14:
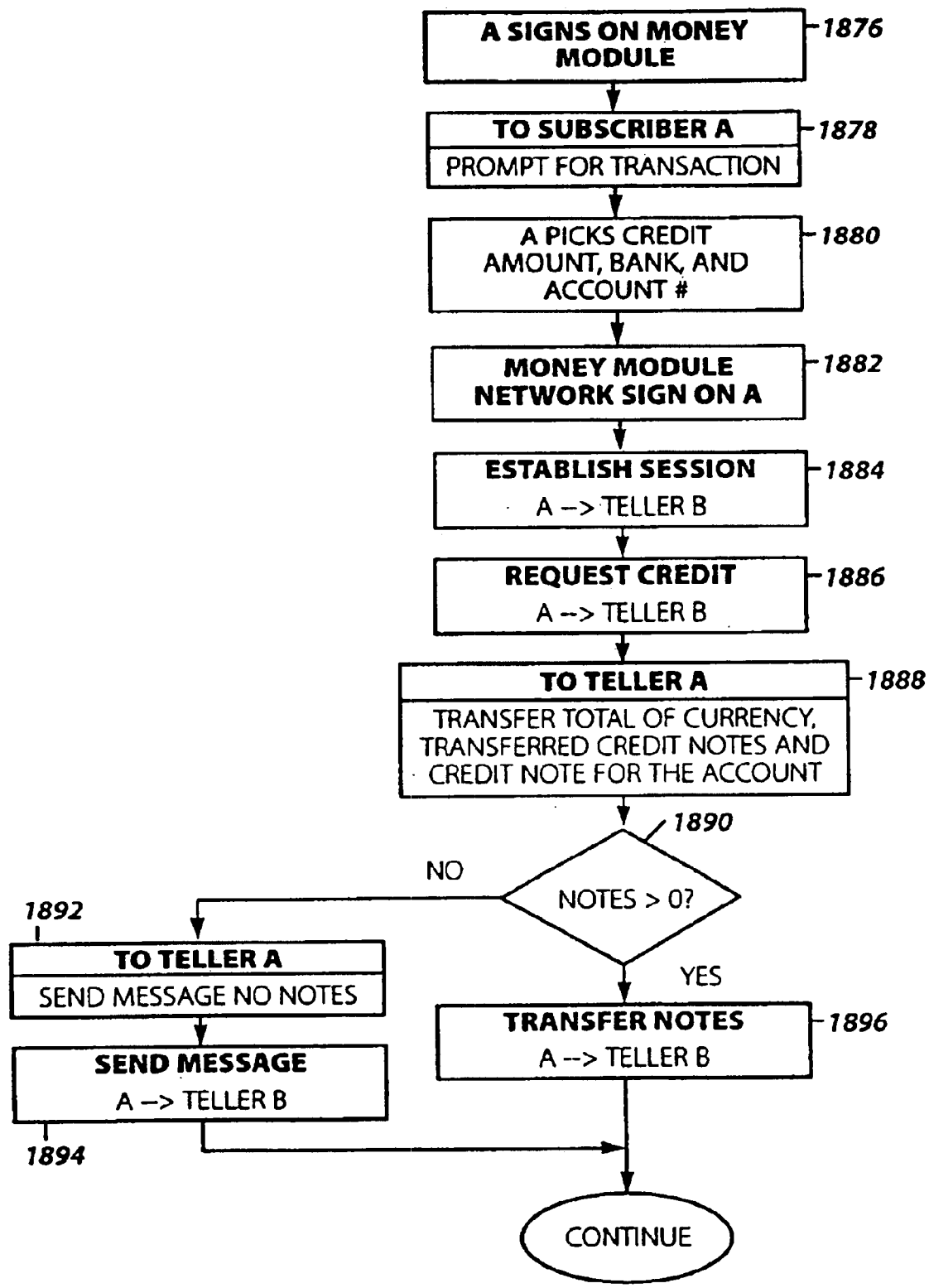
FIG. 14 illustrate a setup Credit protocol.

The process flow to set up an update credit transaction begins with a Setup Credit process between a money module A and a bank's Teller money module B, (step 1854), which is now described further with reference to FIG. 14.

Setup Credit

The Setup Credit Withdrawal process begins when owner/holder of transaction money module A decides to make a credit update and thus signs onto his money module (step 1876). For instance, subscriber A may possess a credit note but wish to change (e.g., increase or decrease) the credit amount including decreasing the amount to zero, or may not currently possess a credit note but wish to acquire one. To Subscriber A prompts the owner/holder for a transaction, and A chooses to make a credit update of a particular amount from a particular bank and account (steps 1878–1880). In this implementation, the credit update amount specified by subscriber A is the total credit amount that subscriber A wishes to carry. Then, the Transaction money module A initiates a procedure for communicating with the bank that was selected by engaging the network via the Network Sign On procedure described hereinabove (step 1882).

Figure 15A:
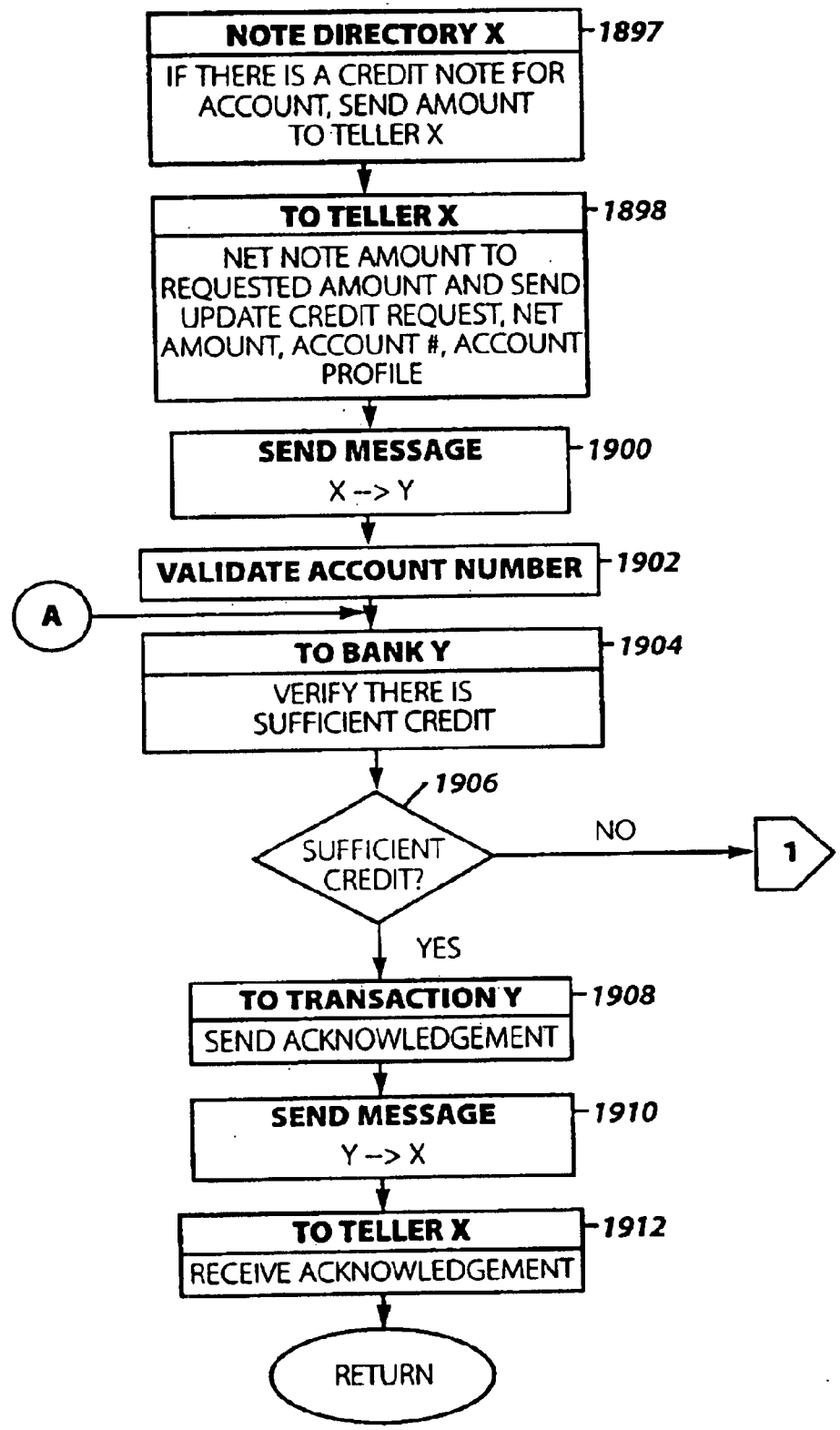
FIGS. 15A–15B illustrates a Request Credit protocol.

After the steps of money module sign-on, transaction selection, and network sign-on are completed, A and B then establish a secure session (step 1884). Then, Transaction money module A makes a credit request from the Teller money module B (step 1886), according to a Request Credit procedure more fully described with reference to FIG. 15.

Request Credit

Referring now to FIG. 15, a process for requesting credit will now be described. It should be noted that although the figure denotes the parties as "X" and "Y," in the process steps described below, they are applicable to any money module transacting with a Teller money module.

To begin, if there is a credit note for the selected account Note Directory X sends the amount of this credit note to To Teller X (step 1897). To Teller X determines the net difference between the total credit amount requested by subscriber A and the credit note amount and sends a credit update request to the Teller money module, requesting a certain net amount of credit to be authorized from a specific account. In it's transmission of the update credit request, the account number and the account profile will be transmitted from the requesting money module to the Teller money module along with the net credit amount (step 1898). This message is sent according to the Send Message protocol (step 1900), in which the message is encrypted using the described cryptographic techniques.

Once the credit withdrawal request and the account number and profile are transmitted to the Teller money module, a procedure to validate the account number is initiated (Step 1902). A flow diagram depicting how an account number is validated is shown in FIG. 20, which is described separately below for clarity of exposition.

With the account information validated, To Bank Y verifies that there is sufficient credit to support the credit update request amount (Step 1904). Sufficient credit will prompt To Transaction Y to send an acknowledgement to X, which receives the acknowledgement via its To Teller application function (steps 1906–1912).

Figure 15B:
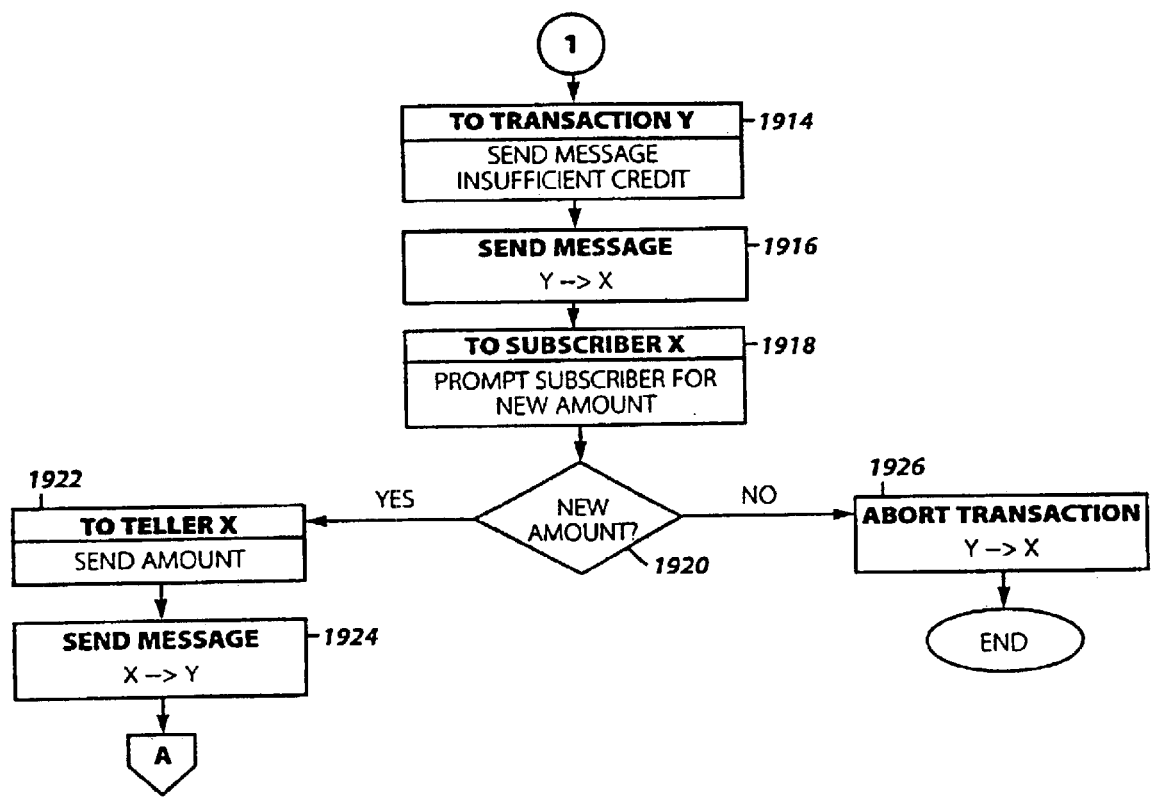

An insufficient amount of credit, however, will cause the subscriber to be prompted to enter a new amount for the credit update (steps 1914–1918, FIG. 15B). Entry of a new amount for credit update by the subscriber results in the To Teller application sending the new credit amount to the To Bank application of the Teller money module to verify if there are sufficient funds to cover the latest requested amount (steps 1922–1924), returning to Step 1904 of FIG. 15A. If no new amount is requested by the subscriber, then the transaction is aborted (step 1926).

Referring back to FIG. 14, upon return from the Request Credit Withdrawal process, To Teller A invokes a transfer of the total currency notes, transferred credit notes (i.e., credit notes received in previous transactions) and credit note for the account to the Teller money module (Step 1888). If there are no notes being held in the Transaction money module at the time the credit withdrawal request is made, the To Teller A application sends a message to the Teller money module that there are no notes present (steps 1892–1894). If there are notes being held in the Transaction money module, however, then the electronic notes are transferred from A to Teller B according to the Transfer Notes procedure described hereinabove with reference to FIG. 8 (step 1896).

Returning to FIG. 13, To Transaction B checks if any currency notes and transferred credit notes have been transferred (steps 1856–1858), and if any of these type of notes have indeed been transferred from Transaction money module A, accounting transactions are posted to reflect this situation by the To Bank application B (step 1860). Both in the case when no notes have been transferred from the money module and after the accounting transactions are posted in step 1860, a session is established between the Teller money module and the Money Generator module (step 1862). To Bank B updates the credit line by adding the amount of the credit note (if any) to the available line of credit to get the total available credit and deducting the requested credit amount from the total available credit. If no notes (including currency notes and credit notes) are to be created because the requested credit amount was zero and no currency notes were transferred, then the money modules will finalize the transaction according to the Commit procedure described hereinabove with reference to FIG. 10 (steps 1865–1875).

If, however, any notes (credit or currency) are to be created, due to a nonzero credit amount request and/or transferred currency notes, then notes are requested by Teller B from Money Generator module according to the Request Notes procedure (steps 1865–1866). The requested notes in the Money Generator module are transferred to the Teller money module B using the Transfer Notes process outlined above (see FIG. 8) for transferring electronic notes (step 1868). The notes are then transferred from the Teller money module B to the Transaction money module using the same Transfer Notes process (step 1870). Finally, to successfully complete the update credit procedure, the money modules will finalize the transaction according to the Commit procedure described hereinabove with reference to FIG. 10. The Commit process is initiated first by the Transaction money module committing its transaction with the Teller money module B (step 1872). Then, the Commit process is executed between Teller money module B and the Money Generator module (step 1874). That completes the processing for one complete credit update from an Issuing Bank.

Money Issued Reconciliation

The process of note reconciliation checks for note counterfeiting and duplication, and is described with reference to FIG. 16 and FIG. 17. The Money Issued Reconciliation system, based on the information stored in the Money Issued Master file, constructs a note transfer tree which models the transfer history of the note.

FIG. 16 schematically illustrates a hypothetical series of transactions among a Money Generator Module having an identifier number "1" (referred to as Money Generator 1), a teller money module having identifier "2" (referred to as teller module 2), and four transaction money modules having integer identifiers 3 through 6 (referred to as transaction modules 3–6), associated with a single note generated by Money Generator 1 at the date/time indicated by 1:00:00.

Figure 17:
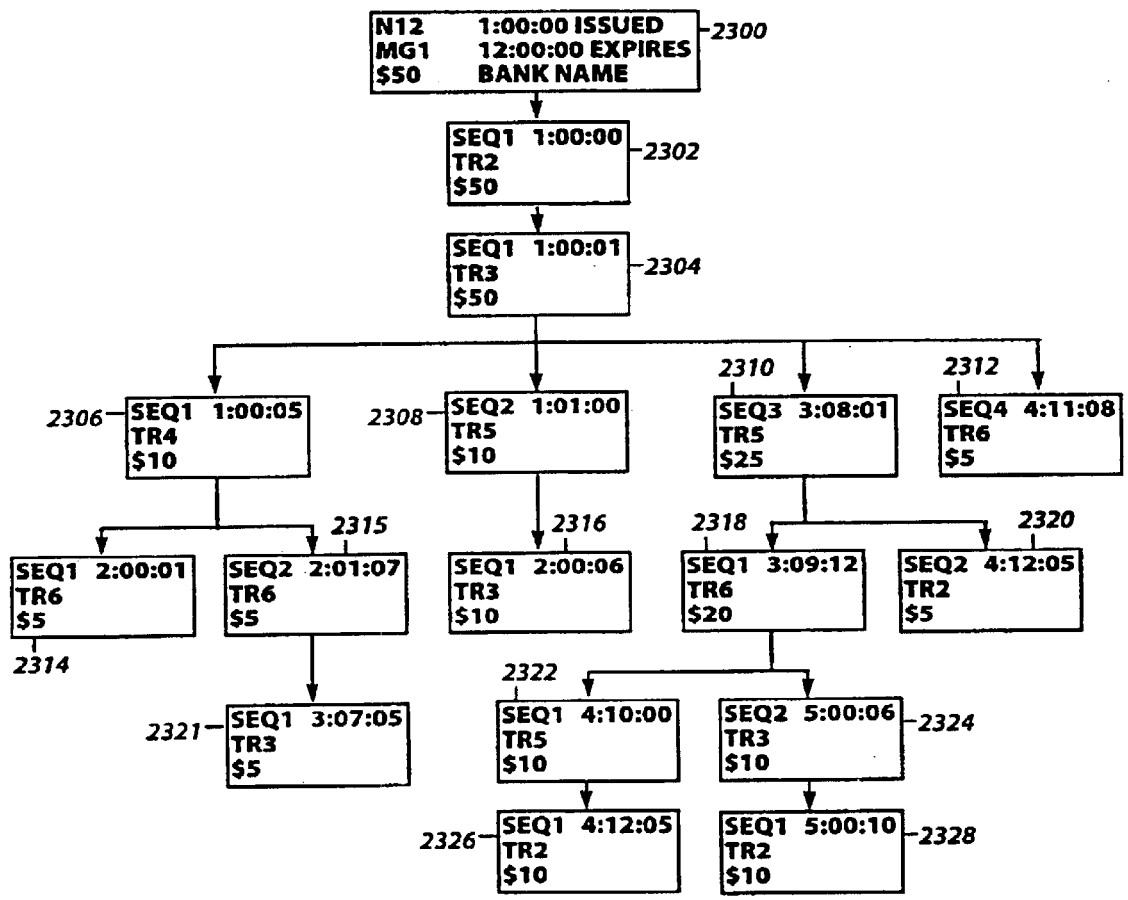
FIG. 17 illustrates a Note Transfer Tree.

In accordance with the example of a transfer history shown in FIG. 16, FIG. 17 illustrates how the transfer of an electronic representation of currency produces a tree-like structure of electronic representations of currency derived from the initial note produced by a money generator module. As individual transfers (part of a tree branch) of the note are deposited or return to the banking system according to note updating, the note transfer tree in FIG. 17 is built by the Money Issued Reconciliation system. In this example, money generator 1 (module identifiers are contained in digitally signed certificates) produces an electronic representation of currency 2300 having a body group of data fields and a transfer group of data fields, which are shown schematically in part for purposes of clarity of exposition. In addition, the signatures and certificates group of data fields is not shown for convenience.

The body group of data fields includes a note identifier (e.g., "N12"), a money generator module identifier (e.g., "MG1"), an issuing bank identifier (e.g.,"Bank Name"), a date-of-issue (e.g., 1:00:00), a date-of-expiration (e.g., 12:00:00), a note amount and a monetary unit identifier (e.g., $50). Other body group data fields such as type of note are not shown for convenience. The various date fields in the electronic notes are shown for illustrative purposes as being in the form day:hr:min. Other time monitoring forms (e.g., including seconds) are, of course, possible.

The transfer group of data fields includes a transfer record having a transferee identification number, a date-of-transfer, and a transfer amount. The transfer group also preferably includes a sequence number which is incremented by the note directory of the transferor after each transfer. Normally, the date/time and transfer id of the transfer should be sufficient to uniquely identify a transfer. However, it might be possible that a transfer, transferee id, date/time, and amount could duplicate if there is a time adjustment between transfers and the same amount is transferred to the same module. Thus, to avert this potential problem, a sequence number (seq) is preferably added to the transfer record and the note directory to uniquely identify the transfer. The sequence number will be incremented by the note directory after every transfer. If a sequence number is reset, then this would be detected as a duplicate.

Thus, when electronic representation of currency 2300 is transferred to teller module 2, transfer record 2302 is appended to the transfer group, and includes the transferee identification number (e.g., "2"), the date-of-transfer (e.g., 1:00:00), the transfer amount (e.g., $50), and the sequence number (e.g., "1"). For illustrative convenience, the note transfers represented in FIG. 17 only show the newly appended transfer record portion of the transferred note. Also for convenience, the transfer group data field indicating total number of transfers is not shown.

The electronic representation of currency 2300 from money generator 1 is stored in a teller module 2. As part of the withdrawal of $50 by transaction module 3, teller module 2 forms an electronic representation of currency by appending transfer record 2304 to a copy of the data fields in the electronic representation of currency 2302 augmented by transfer record 2302. This note is then stored in transaction module 3 upon completion of the withdrawal. It may be understood that each node of the note transfer tree shows the newly appended transfer record portion of the transferred note.

As represented by the note transfer tree, at 1:00:05, transaction module TR3 pays $10 by transfer record 2306 to transaction module 4. At 1:01:00, transaction module 3 pays $10 by transfer record 2308 to transaction module 5. At 3:08:01, transaction module 3 pays $25 by transfer record 2310 to transaction module 5. At 4:11:08, transaction module 3 transfers $5 by transfer record 2312 to transaction module 6.

At 2:00:01, transaction module 4 transfers $5 by transfer record 2314 to transaction module 6. At 2:01:07, transaction module 4 transfers an additional $5 by transfer record 2315 to transaction module 6, which in turn, at 3:07:05 transfers $5 by transfer record 2321 to transaction module 3.

At 2:00:06, transaction module 5 transfers the entire $10 note to transaction module 3 by transfer record 2316. From the $25 note received at 3:08:01 by transaction module 5 from transaction module 3, at 3:09:12 transaction module 5 pays transaction module 6 $20 by transfer record 2318, and deposits the remaining $5 to teller module 2 at 4:12:05 by transaction record 2320.

At 4:10:00, transaction module 6 transfers $10 to transaction module 5 according to transfer record 2322, and at 5:00:06 transfers the remaining $10 to transaction module 3 by transfer record 2324. In accordance with an embodiment of the present invention, it is understood that upon deposit of money from a transaction module to a bank, all notes (including credit notes) in the transaction module are sent to the banking system and are updated. Therefore, substantially simultaneous with the above described deposit from transaction module 5 to teller module 2 represented by transfer record 2320, an additional and concurrent transfer represented by transfer record 2326 occurs automatically. Then, a new note having a value of $5 (assuming transaction module 3 had no credit notes) will be generated by money module 1 and transferred to transaction module 3 via teller module 2, with the appropriate transfer records appended (not shown). Accordingly, it may be appreciated that updating all notes in a transaction money module upon a transaction (e.g., deposit or withdrawal) between the transaction module and a teller module facilitates the note reconciliation process by providing an additional means for returning notes to the banking system.

At 5:00:10 transaction module 3 deposits $10 to teller module 2 by transaction record 2328. As described above for the deposit by transaction module 5, concurrent with the deposit by transaction module 3 represented by transaction record 2328, additional and concurrent transfers (not shown) to the banking system of all notes possessed by transaction module 3, including those represented by transfer record 2316 and transfer record 2321, occurs. Then, the banking system returns to transaction module 3 a note having a value equal to the total notes sent to the banking system for updating (e.g., $15).

Thus, at this point in time, only transaction module 6 possesses transferable vestiges of original note 2300, as represented by transfer notes 2312 and 2314. If transaction module 6 transacts (e.g., deposit or withdrawal) with a teller module before transferring these notes to other transaction money modules, then there will be no transferable notes in circulation that relate to original note 2300; all notes derived from transfers of original note 2300 will have been returned to the banking system, permitting complete construction of the note transfer tree shown in FIG. 17. The date-of-expiration effectively facilitates note reconciliation by limiting the time that a note may be transferred.

From the note transfer tree, it may be understood that if the note were counterfeit then there would be no note body to match the first piece deposited. If a transfer were duplicated then the transfers below would sum to a value greater than the superordinate transfer amount. For example, if transaction module 6 transferred $20 to transaction module 3 at 5:00:06, instead of $10 (i.e., transfer record 2324), then the transfers below transfer record 2318 (i.e., SEQ1, 3:09:12, TR6, $20) would sum to $30 denoting that transaction module 6 had duplicated the transfer.

Link Money Module to Bank Account(s) for Bank Access

Figure 18A:
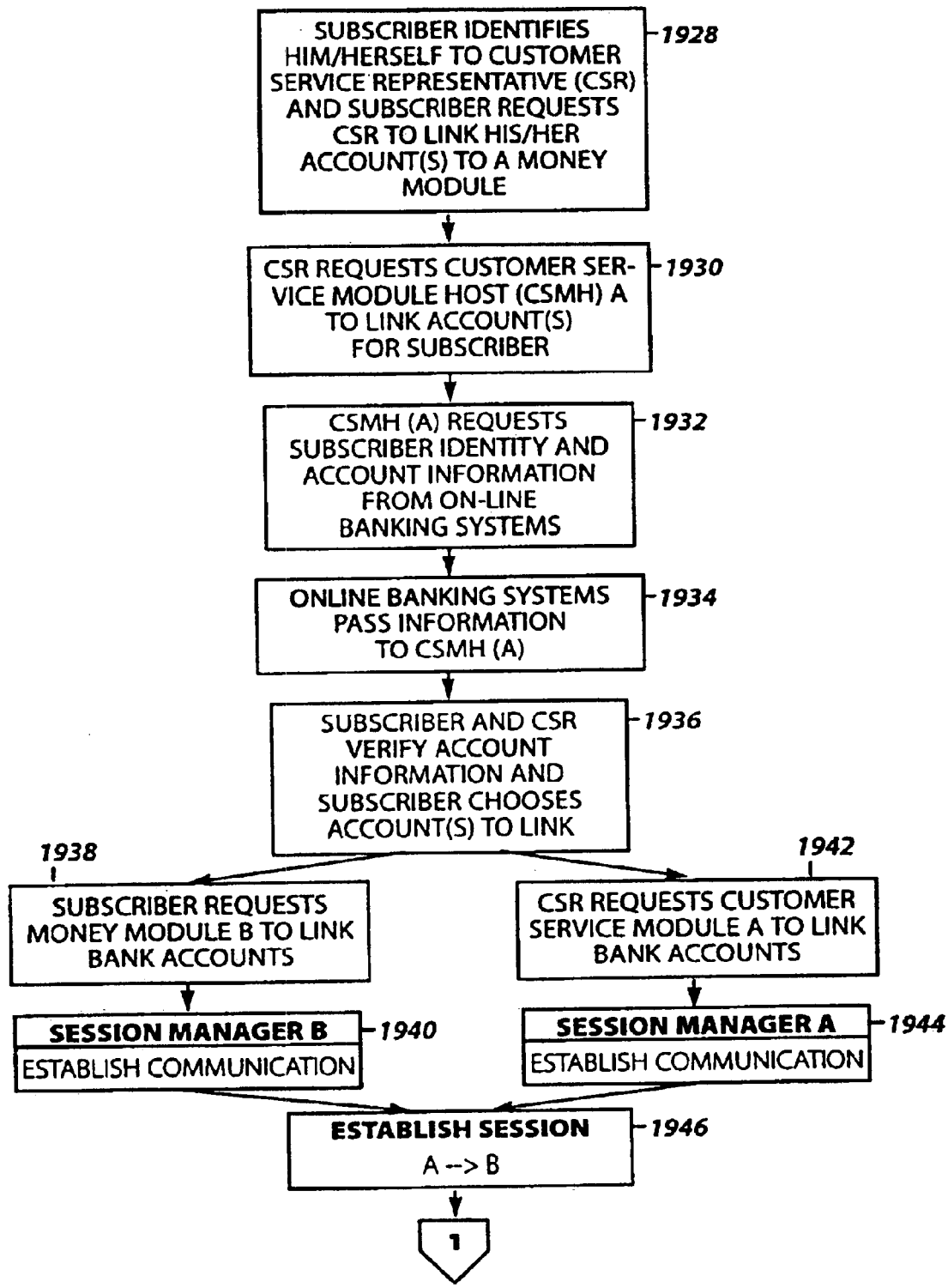
FIGS. 18A–18C illustrates a Link Money Module to Bank Account(s) for Bank Access protocol.
Figure 18B:
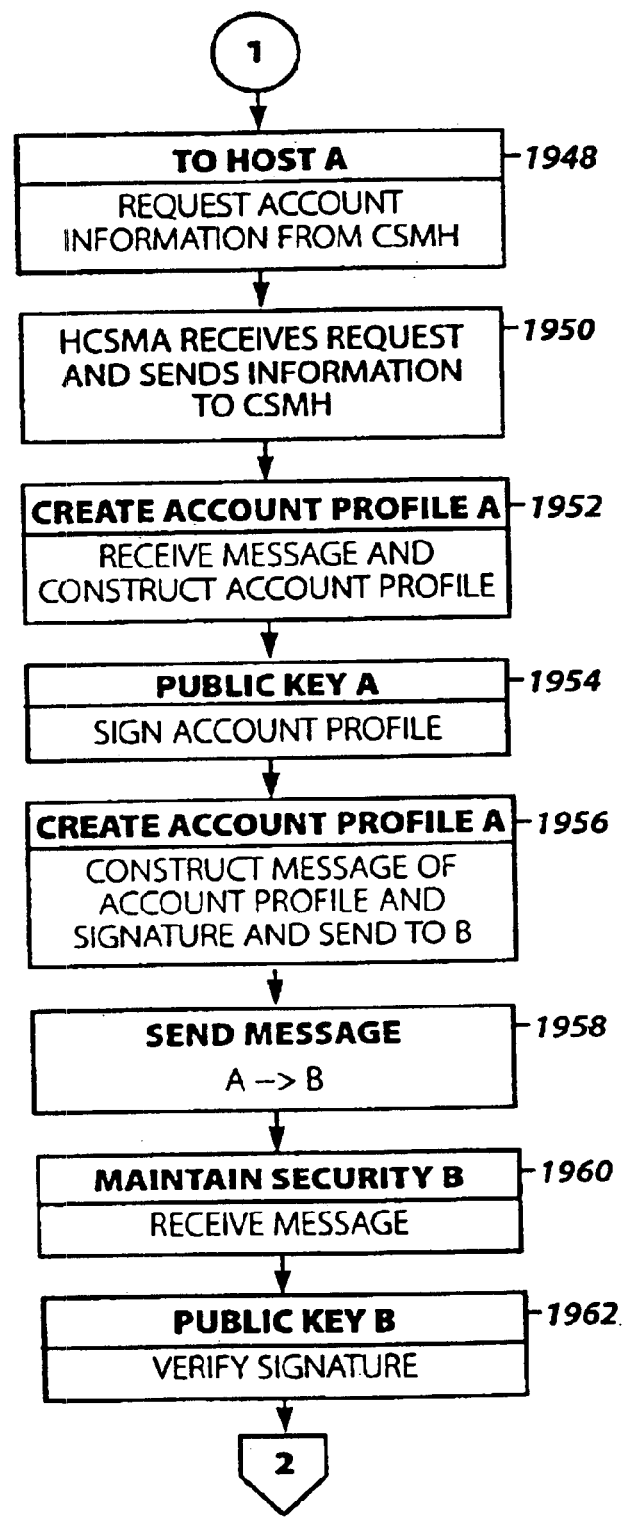
Figure 18C:
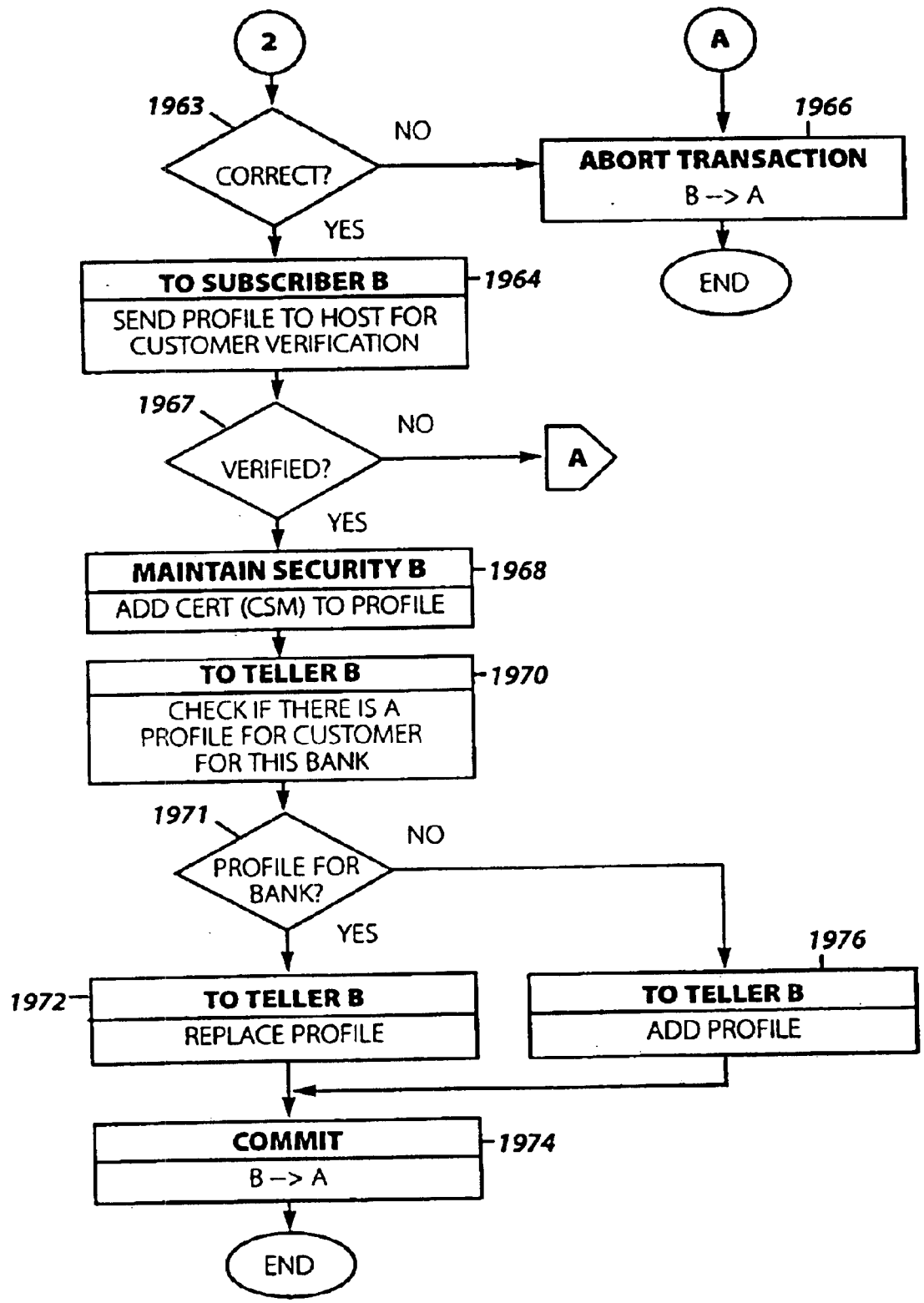

FIG. 18 shows the protocol for linking a money module to bank accounts for bank access. The process begins when a subscriber identifies him/herself to a customer service representative (CSR) and requests that the CSR link the subscriber's accounts to a money module (step 1928). The CSR enters a request into CSM host A (CSMHA) to link accounts for the identified subscriber, and CSMHA accesses the identified subscriber's account information from the bank systems (steps 1930–1934). Then, the subscriber and the CSR verify the account information, and the subscriber selects which accounts to link to the money module (step 1936).

After the subscriber requests that his/her money module B link bank accounts and the CSR requests, via CSMHA, that CSMA link bank accounts, a secure session is established between the subscriber's money module B and the CSMA (steps 1938–1946). Then, in response to a request from To Host A of CSMA, HCSMA sends the account information to CSMA, which receives the account information and constructs an account profile therefrom (steps 1948–1952). Public Key A then signs the account profile, and Create Account Profile constructs a message from the account profile and signature and sends this message to money module B (steps 1954–1958). Maintain Security B receives the message, and Public Key B checks the digital signature on the message (steps 1958–1962). If the signature is invalid, then the session is aborted (step 1966).

If the signature is valid, then To Subscriber B sends the profile to the host in order for the customer to verify the account profile. If the customer does not affirm the account profile, then the transaction is aborted. If the customer affirms the account profile, Maintain Security B adds the CSM certificate to the account profile (step 1968).

To Teller B then checks to determine whether an account profile is already stored for the bank associated with the recently created ("new") account profile. If an account profile for the bank already exists in the To Teller B application, then it is replaced by To Teller B with the new account profile; otherwise, To Teller B adds the new account profile. (Steps 1970–1974).

Revalidate Money Module Link to Bank Accounts

Figure 19A:
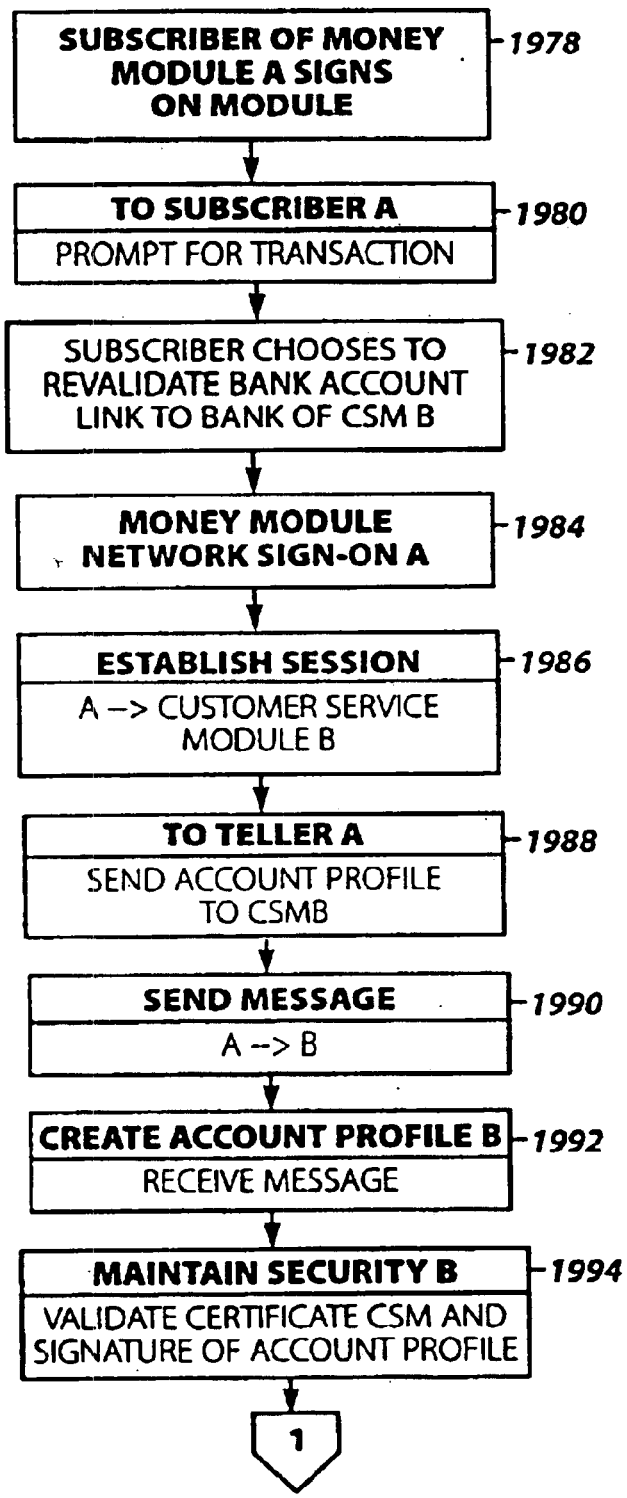
FIGS. 19A–19C illustrate a Revalidate Money Module Link to Bank Account(s) protocol.
Figure 19B:
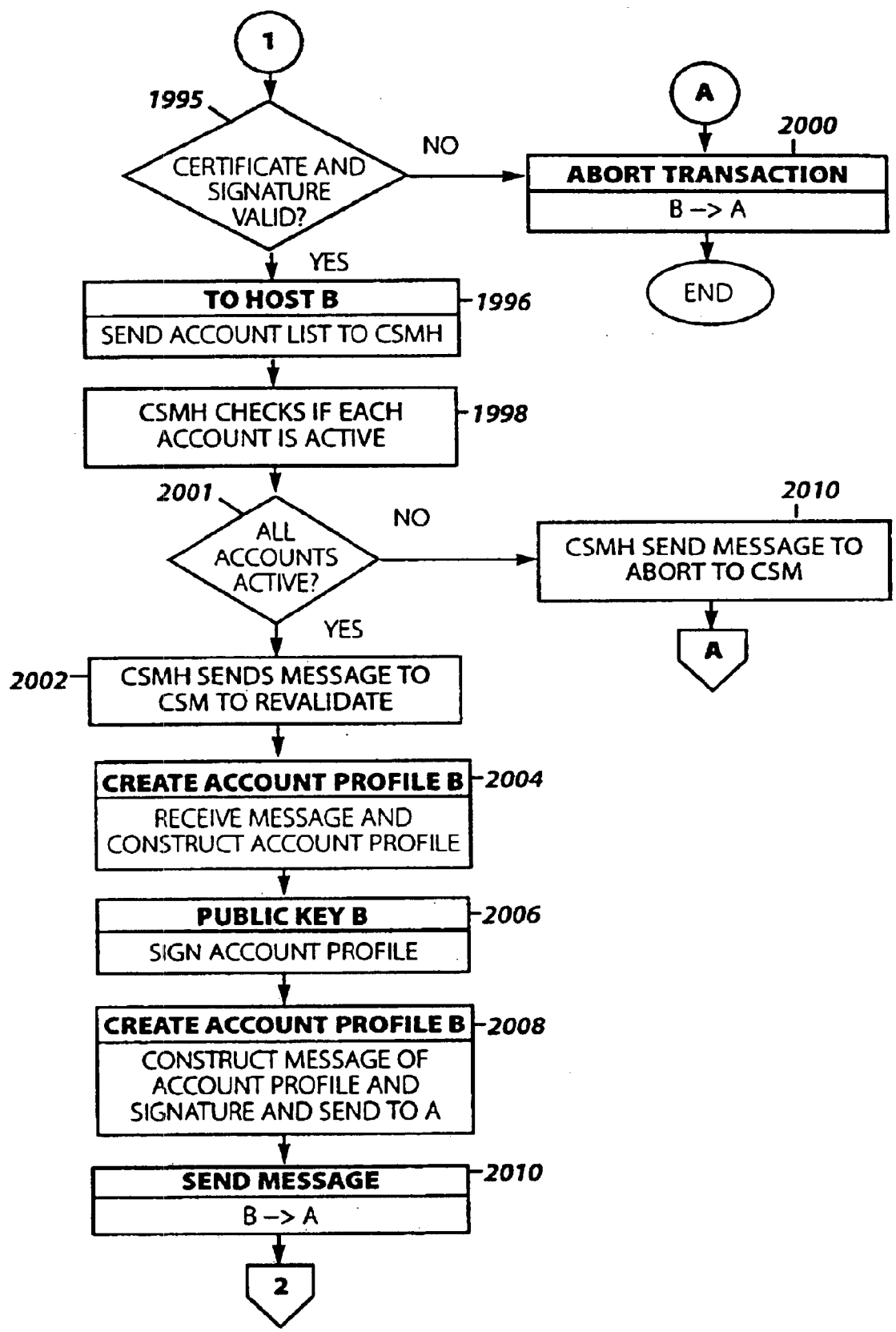
Figure 19C:
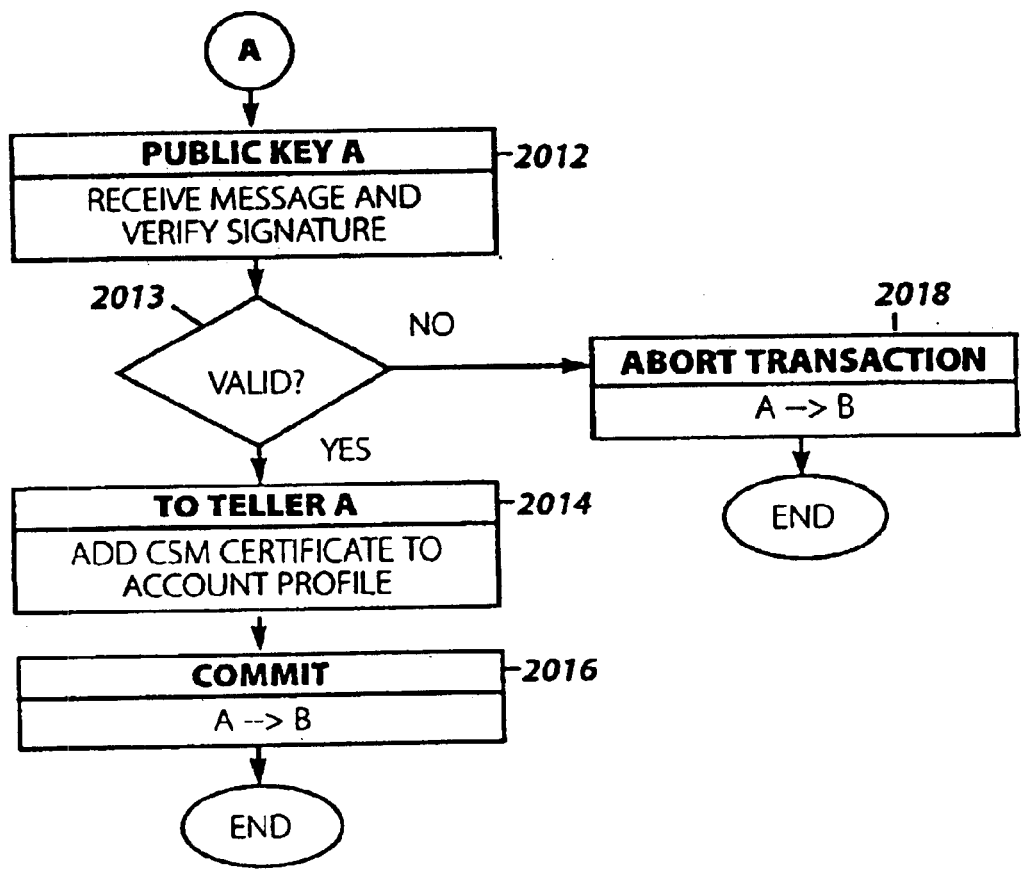

FIG. 19 shows the protocol for a subscriber to revalidate the subscriber's money module link to bank accounts. The process begins when the subscriber signs on to his/her money module, and in response to a prompt for a transaction generated by To Subscriber A, the subscriber chooses to revalidate a bank account link for a bank associated with a customer service module (CSM) B (steps 1978–1982). The money module invokes and executes the network sign-on protocol described with reference to FIG. 6, hereinabove, and a secure session is established between money module A and CSMB (step 1986). To Teller A then sends the account profile for the bank accounts to CSMB (steps 1988–1990). Create Account Profile B receives the message, and Maintain Security B validates the CSM certificate and the signature of the account profile (steps 1992–1995). If the certificate or signature is invalid, then the CSM aborts the transaction (step 2000). If the certificate is valid, To Host B sends the list of accounts from the account profile to the CSM host (CSMH), which checks with the on-line banking system to determine whether each account is currently active (steps 1996–2001). If any of the accounts has expired, CSMH signals an abort message to CSM (step 2010), which then aborts the transaction according to the Abort process (step 2000).

If all the accounts are active, then CSMH signals a revalidate instruction to CSM, and Create Account Profile B receives the message and constructs an account profile from the account information (steps 2002–2004). Public Key B then signs the account profile, and Create Account Profile B constructs a message from the account profile and signature and sends this message to money module A (steps 2006–2010). Public Key A receives the message and verifies the digital signature (step 2012). If the signature is invalid, money module A aborts the transaction (step 2018); if it is valid, the profile signature and the CSM certificate is added to the account profile (step 2014), and money module A commits the transaction (step 2016).

Validate Account Number

Figure 20:
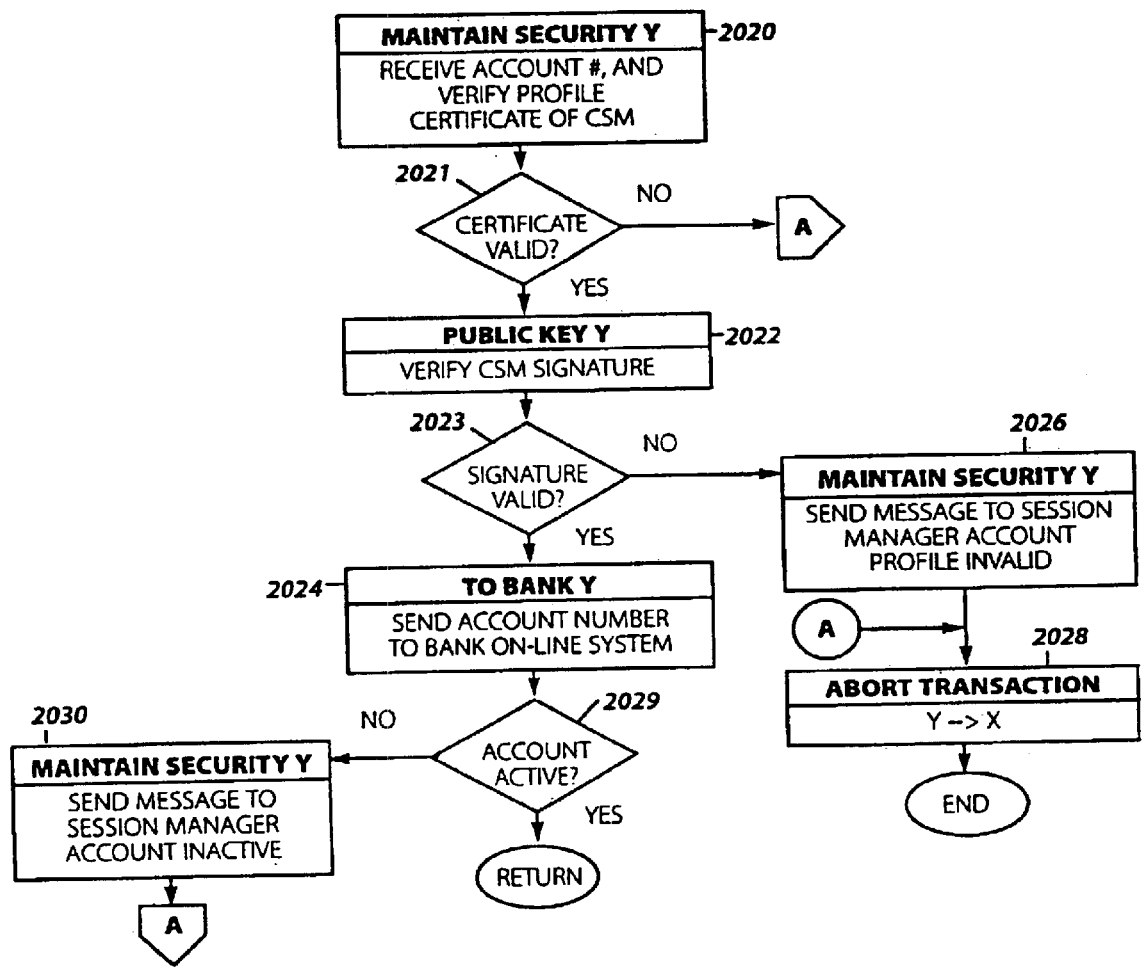
FIG. 20 illustrates a Valid Account Number protocol.

In accordance with an embodiment of the invention employing a customer services module (CSM), which is described hereinabove, a flow diagram depicting how an account number is validated is shown in FIG. 20.

In this process, Maintain Security Y receives the account number and account profile, including the CSM certificate, and verifies the CSM certificate (step 2020). An invalid certificate causes the transaction between the two money modules to be aborted (step 2028).

If the certificate is valid, Maintain Security Y conveys the account profile to Public Key Y to verify the CSM signature (steps 2022). An invalid signature causes Maintain Security Y to inform the Session Manager that the account profile is invalid (Step 2026), and the transaction between the two modules is aborted (step 2028).

If the signature test confirms a valid signature, the procedure advances to To Bank Y which sends the account number it has received to the bank's on-line computer system (step 2024). An inactive account will cause Maintain Security Y to inform the Session Manager of the inactive account (step 2030) and have the transaction aborted (step 2028); an active account will cause the Validate Account Number process to return to the next step in the operational flow that invoked the Validate Account Number process.

As can be seen, the Validate Account Number process is simplified for the Teller money module as compared to an embodiment of the present invention that does not include a CSM.

Claim Lost Money

As has been discussed, electronic money could be lost for any of several reasons, including: (1) the money module is damaged and no longer functions; (2) the money module is lost or stolen; or (3) the commit fails. It is important to the utility of a monetary system that the subscriber to the system feel confident that their money is safe. Thus it is important that the transferee be able to reclaim money lost through system failure. Being able to replace money when the money module is damaged would improve confidence since electronic failure is more likely than the loss of a paper by physical damage. Replacing money because of mishaps due to a lost or stolen money module is more problematic. Allowing such claims could invite widespread claims on the system, since subscribers would not take precautions against loss.

In any case, embodied in the present invention are methods that allow money lost in either of these cases to be replaced. In the first two cases (i.e., cases (1) and (2) above), the subscriber would have to periodically create a lost note(s) claim (see FIG. 21) which could be stored outside the money module. Upon failure, the claim could be submitted with the subscriber's identity to an issuing bank (see FIG. 22). The claim would contain the last known state of the subscriber's money module. A description of the claimed notes could be validated and distributed to the issuing banks.

The issuing banks could replace the money after a period of time if the claimed notes have not been deposited.

In the case wherein the commit fails (i.e., case (3)), the claim is created interactively between the money module and a customer service module, if the money module is still functioning (see FIG. 22). This claim, as in cases (1) and (2), is passed to the Money Issued Investigation System, which monitors the claim against money deposited. The issuing banks can feel confident in replacing lost money because they can monitor the incoming money against fraudulent applications and they have the applicant's identity.

These methods are more fully described with reference to FIG. 21 and FIG. 22.

Create Lost Note(s) Claim

Figure 21A:
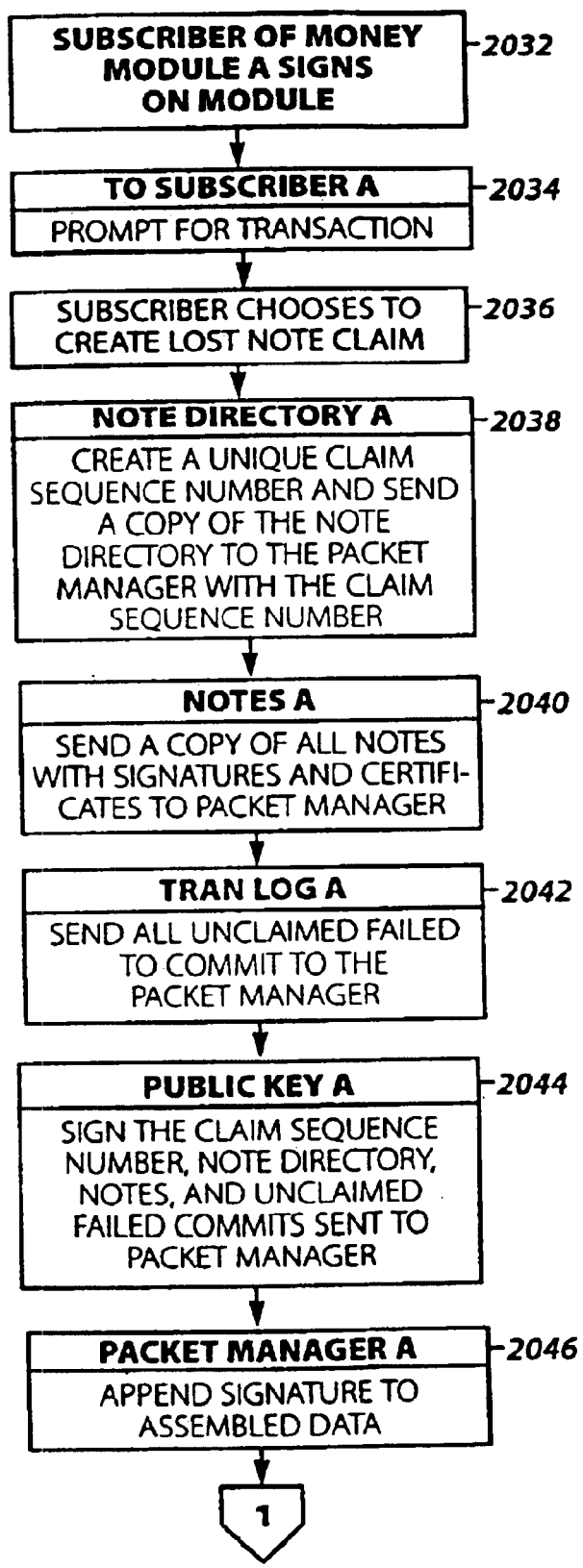
FIGS. 21A–21B illustrate a Create Lost Notes claim protocol.
Figure 21B:
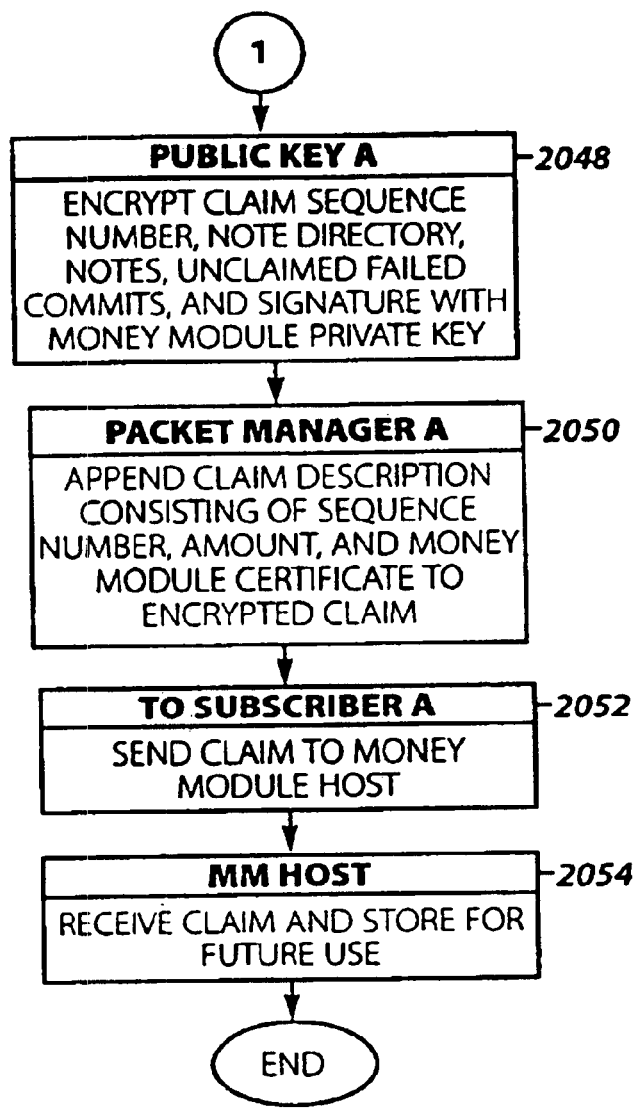
Figure 22A:
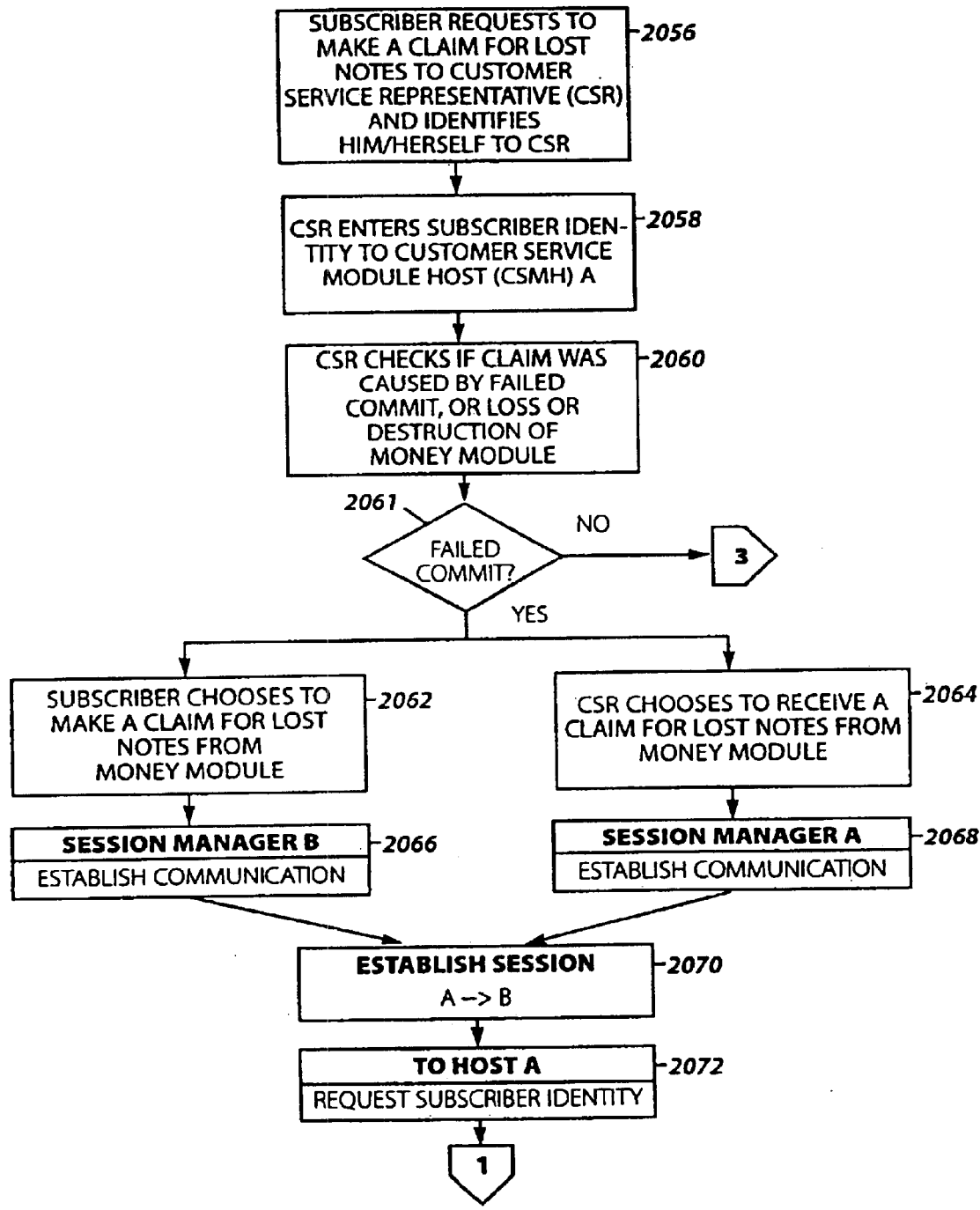
FIGS. 22A–22E illustrate a claim Lost Notes protocol.
Figure 22B:
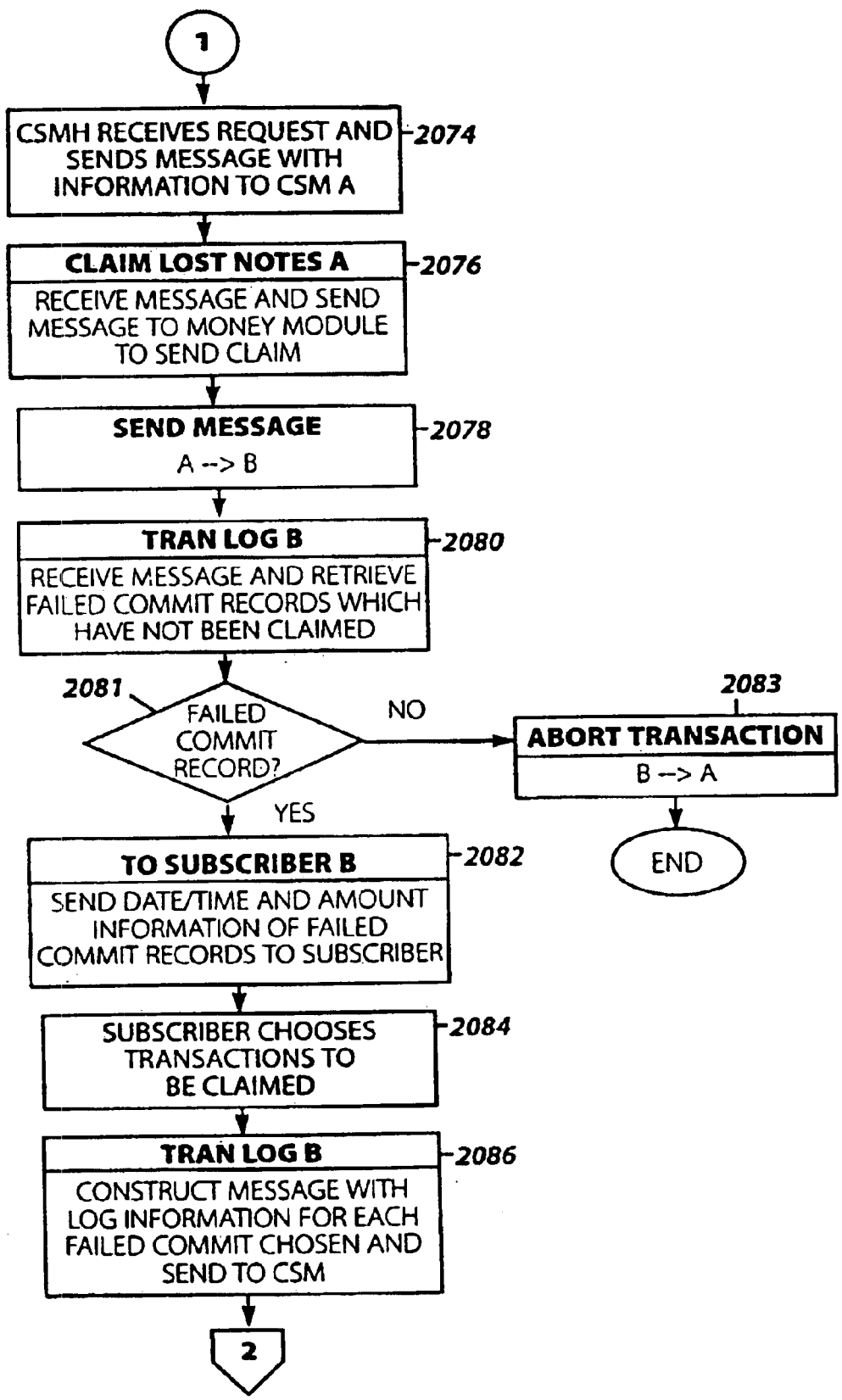
Figure 22C:
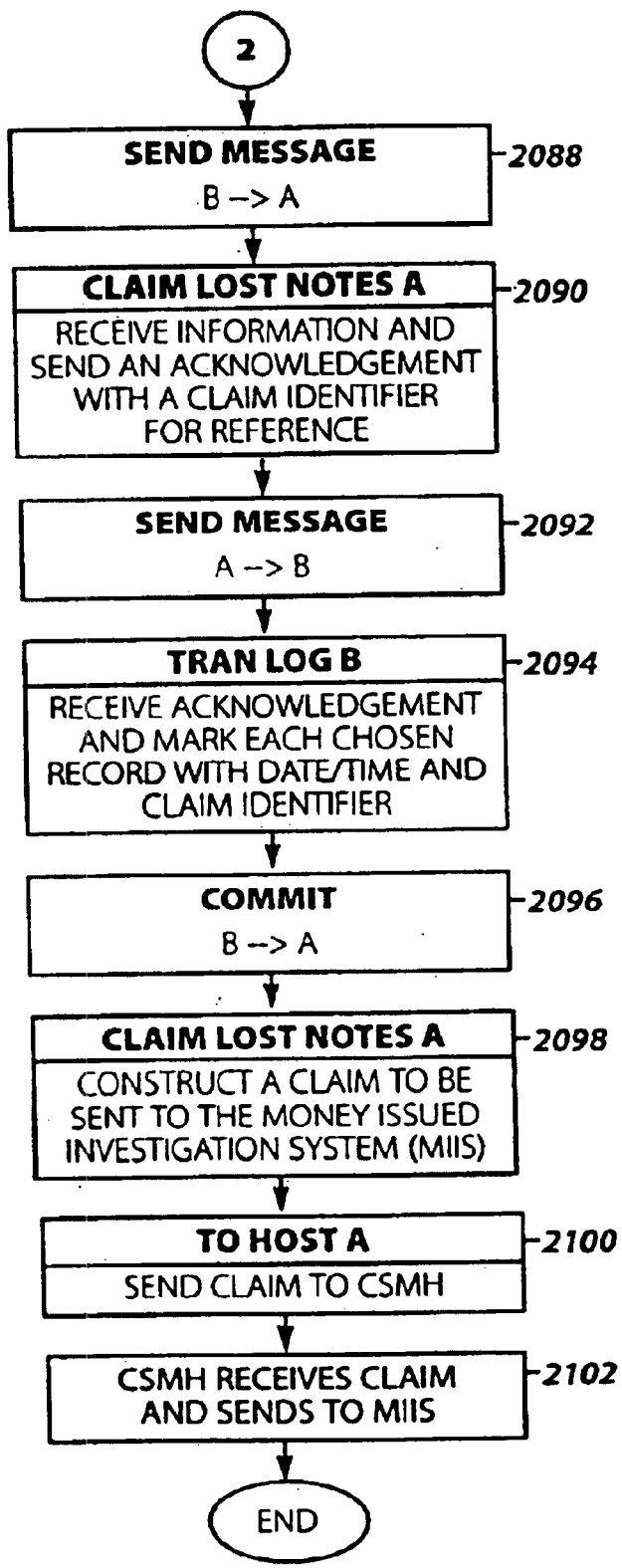
Figure 22D:
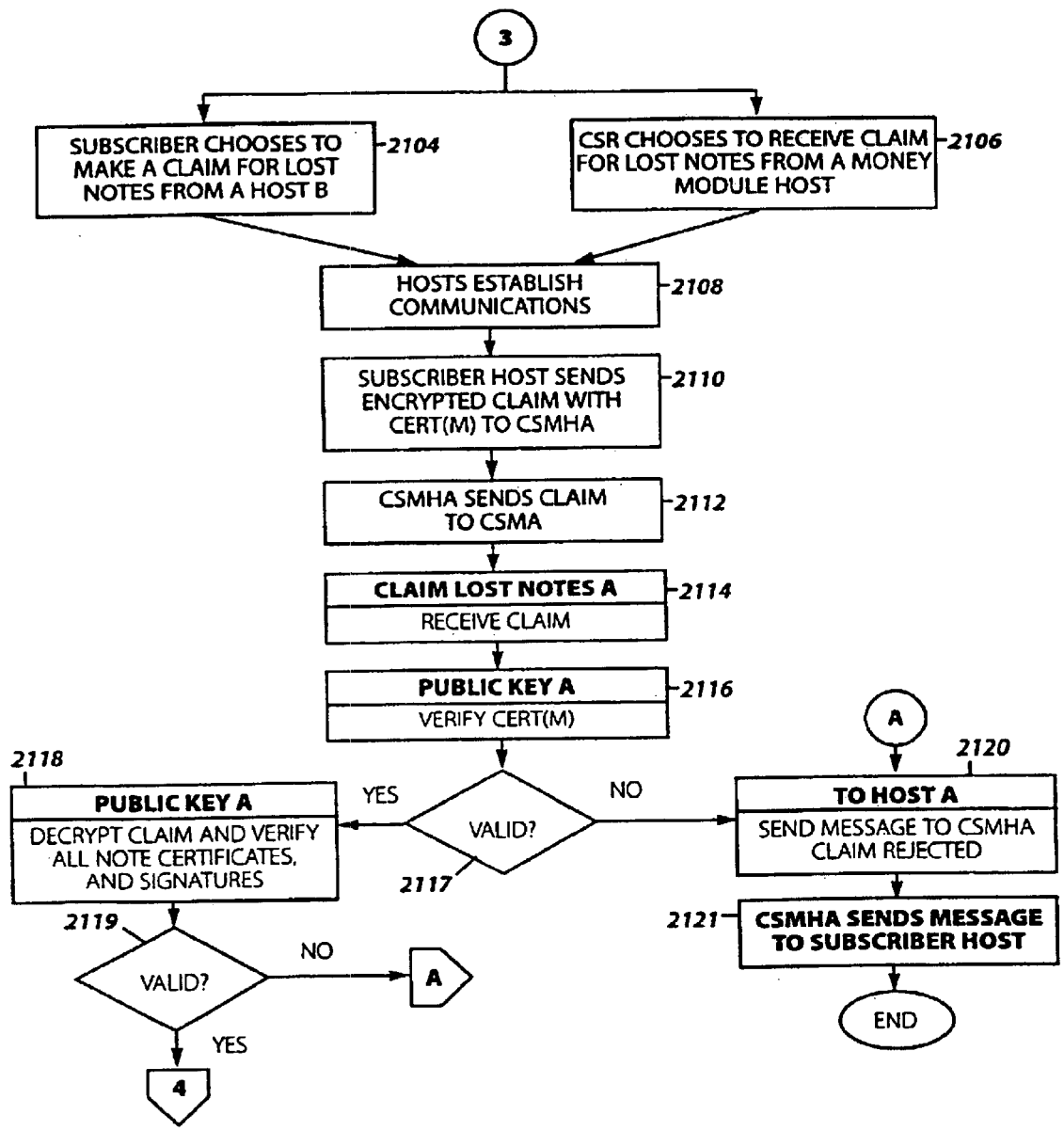
Figure 22E:
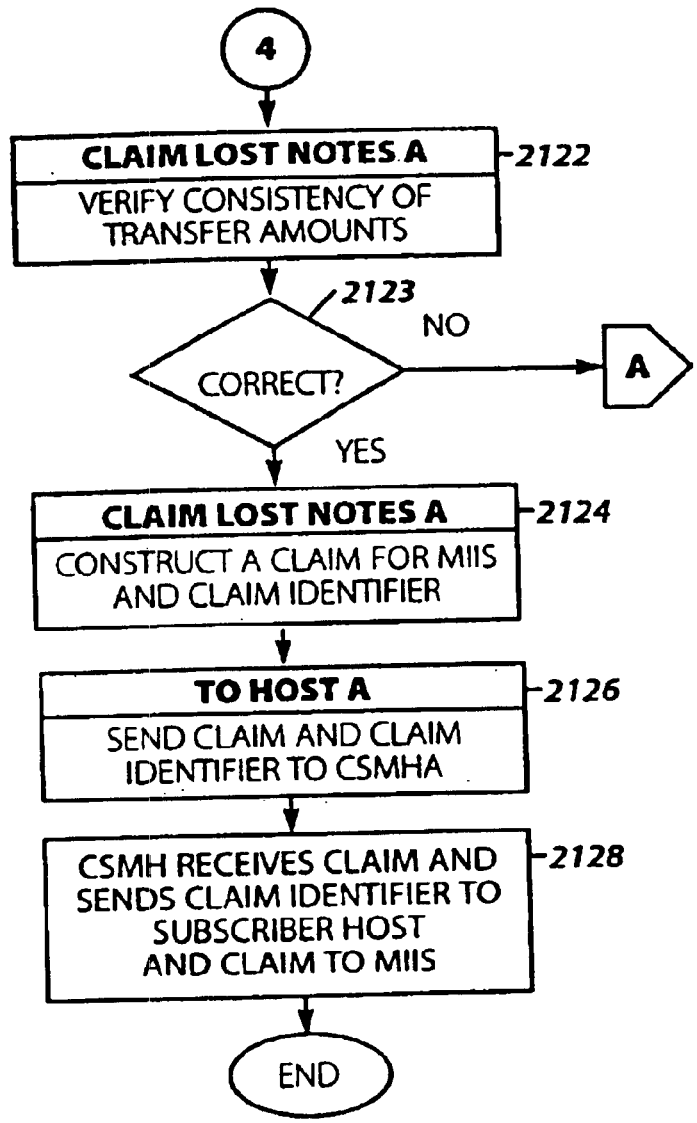

Referring now to FIG. 21A, there is shown a Create Lost Note(s) claim process which may be practiced in accordance with an embodiment of the present invention. The process begins when a subscriber signs on to a money module, To Subscriber A prompts the subscriber for a transaction, and the subscriber selects a Create Lost Note(s) claim option (steps 2032–2036).

Then, several steps occur which consolidate all notes and unclaimed failed commits (steps 2038–2042). Specifically, Note Directory A creates a unique claim sequence number (which is used for identifying a claim) and conveys a copy of the Note Directory with the sequence number to the Packet Manager. Notes A conveys a copy of all notes with signatures and certificates to Packet Manager. Then, Tran Log A sends all unclaimed failed to Commit transactions that were logged during the Abort process to the Packet Manager.

Next, Public Key A uses a money module private key to sign the claim sequence number, note directory, notes, and failed Commits that were sent to the Packet Manager, and Packet Manager A appends the signature to the assembled data, resulting in an assembled data packet (steps 2044–2046), which is then encrypted by Public Key A (step 2048). To the encrypted claim, Public Key A then appends a claim description consisting of the claim sequence number, the total value amount of the claim, and the certificate of money module A (step 2050). To Subscriber A sends this claim to the money module host, which receives and stores the claim—on a medium physically independent of the money—for future use (steps 2052–2054).

It is understood, therefore, that the claim Lost Notes process provides a method for generating and protecting potential money claims which are not destroyed by damage to, or failure of, a money module.

Claim Lost Notes

FIG. 22 shows the protocol for claiming lost notes, which begins when a subscriber requests to make a claim for lost notes to a customer service representative (CSR), the subscriber's identity being revealed to the CSR (step 2056). CSR then conveys the subscriber's identity to customer service module host (CSMH) A, and checks whether the claim is due to a failed commit or due to a loss or destruction of the money module (steps 2058–2060). If a failed commit is the basis for the claim (and the subscriber's money module has not been lost or damaged), then upon the subscriber's selection to make a claim for lost notes from the money module and the CSR's selection to receive a claim for lost notes from a money module, Session Manager B of the subscriber's money module and Session Manager A of a customer service module (CSM) associated with the customer service representative (via a customer service module host (HCSM)) are respectively invoked to establish a secure session between CSM A and money module B (steps 2062–2070).

Once a secure session is established, To Host A of the CSM requests the identity of the subscriber, and HCSM A responds to this request by sending a message containing the subscriber identity to CSM (2072–2074). Claim Lost Notes A receives this message and sends to money module B a message indicating that the claim should be sent (steps 2076–2078).

Tran Log B receives this message and retrieves failed commit records that have not been claimed (step 2080). If no failed commit records are located, then the transaction is aborted (step 2083). Otherwise, To Subscriber B sends information (e.g., date, time, and amount) from the retrieved failed commit records to the subscriber for review (step 2082). From this information, the subscriber selects the transactions to be claimed (step 2084). For instance, the subscriber would not select failed commit transactions that have been resolved separately. Then, for each failed commit transaction selected by the subscriber, Tran Log B constructs a message containing log information for these transactions, and sends this message to CSM (steps 2086–2088).

Claim Lost Notes A receives this message and sends to B an acknowledgement including a claim identifier (e.g., a confirmation number) for future reference to the claim (step 2092). Tran Log B receives the acknowledgement and marks each selected failed commit transaction record with the date/time of the claim and with the claim identifier provided by the CSM (step 2094). Then, B commits to the transaction (step 2096).

After the commit procedure is completed, from the received message containing failed commit transaction information claim Lost Notes A constructs a claim to be sent to the Money Issued Investigation System (MIIS) which preferably forms part of the Transaction Investigation System. To Host A sends this claim to HCSMA, which receives the claim and further sends the claim to the MIIS. (Steps 2098–2102).

Returning now to step 2060 of FIG. 22, if the claim were not due to a failed commit (e.g., due to a lost or damaged money module), then the subscriber may choose to make a claim for lost notes from a host B that has access to any of the subscriber's claims that were generated and off-loaded from the money module computing environment (e.g., onto a FLASH memory) in accordance with the Create Lost Note(s) claim process described hereinabove with reference to FIG. 21. CSR separately chooses to initiate a process to receive a claim for lost notes from a money module host and the hosts establish a communication link according to any known technique (steps 2104–2108).

Then, the subscriber host B sends the claim, including the money module certificate, to CSMHA which sends the claim to CSMA (steps 2108–2112). Claim Lost Notes A receives the claim and sends the claim to Public Key A which validates the money module certificate (2114–2116). If the money module certificate is invalid, then To Host A sends CSMHA a message indicating that the claim has been rejected, and CSMHA routes this message to the subscriber host B, and the claim Lost Notes process is terminated (steps 2120–2121).

If the money module certificate is valid, Public Key A decrypts the claim and verifies all note certificates and signatures within the claim (step 2118). If any of the note certificates and signatures are not valid then the transaction is terminated (steps 2119–2121). If the note certificates and signatures are valid, then claim Lost Notes A, verifies the consistency of transfer amounts to ensure that the value of the money conveyed to a transferree is not greater than that received by the transferor for the transfer history of each note (step 2122–2123). If there is an inconsistency then the transaction will be terminated (steps 2120–2121).

If, however, the transfer amounts are consistent for all notes, then claim Lost Notes A constructs a claim to be sent to the MIIS, and also generates a claim identifier to be associated with the claim. To Host A then sends the constructed claim and claim identifier to CSMHA, which receives the claim and claim identifier and appropriately routes the claim identifier to subscriber host B and sends the claim to the MIIS. (Steps 2124–2128), thus completing the claim Lost Notes process.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

I claim:

1. A method for an electronic module to sign-on to a network having a network server that links said electronic module to a security server, comprising the steps of:

said electronic module sending its certificate to said network server;

said network server generating a random key and a random verification number, and sending an encrypted message including said certificate, said random key, and said random verification number to said security server;

said security server decrypting said encrypted message, storing said random key and random verification number, and verifying the validity of said certificate;

said security server establishing a secure communication session with said electronic module;

said security server sending updated security information, that is digitally signed by a cryptographic key of said security server, to said electronic module;

said electronic module verifying the validity of said digitally signed updated security information, and updating stored security information with said updated security information;

said security server sending said random key, and said random verification number to said electronic module, and ending said secure communication session;

said electronic module generating a destination message by encrypting said random verification number and a destination with said random key, and sending said destination message to said network server;

said network server decrypting said message and verifying said random verification number; and said network server establishing a link to said destination.

2. The method according to claim 1, wherein said electronic module is a transaction module, a customer service module, a money generator module, a trusted agent, or a teller module.

3. The method according to claim 1, further comprising the steps of:

said electronic module sending its date and time information to said security server;

said security server checking said date and time information to determine if it is outside of an acceptable predetermined parameter; and said security server, where said date and time information is outside said acceptable predetermined parameter, sending a new date and time to said electronic module in order to synchronize said electronic module.

4. The method according to claim 1, wherein said encrypted message between said network server and said security server is provided using a local symmetric key stored in said network server and in said security server.

5. The method according to claim 1, wherein said updated security information includes an updated list of bad electronic module and security server identification numbers, an updated public key list, and an updated key length.

6. The method according to claim 1, wherein said step of said security server establishing a secure communication session with said electronic module includes a public key exchange protocol to provide a session key common to said security server and said electronic module.

7. The method according to claim 1, further comprising the step of said security server recertifying said certificate.

8. The method according to claim 7, wherein said step of recertifying occurs in response to said security server sending a recertification request message to said electronic module.

9. The method according to claim 1, wherein said certificate includes an expiration time.

10. The method according to claim 9, wherein further comprising the step of said security server recertifying said certificate in response to said electronic module determining that said certificate has expired.

11. A system, comprising:

at least one primary security server;

a plurality of secondary security servers that each stores a unique security server certificate digitally signed by said primary security server; and a plurality of tamper-proof electronic modules, each having a memory that stores a unique module certificate that is digitally signed by one of said secondary security servers, and each having a processor (1) operative to provide a cryptographically secure channel with and to validate the module certificate of any arbitrary other one of said tamper-proof electronic modules independent of interaction with said at least one primary security server and independent of interaction with said secondary security servers and independent of interaction with a trusted third party certificate authority and independent of interaction with a key directory external to and accessible by the plurality of tamper-proof electronic modules, and (2) operative to provide a cryptographically secure channel with and to validate the security server certificate of any arbitrary one of said secondary security servers independent of interaction with said at least one primary security server and independent of interaction with a trusted third party certificate authority and independent of interaction with a key directory external to and accessible by the plurality of tamper-proof electronic modules.

12. The system according to claim 11, wherein said security server certificate is validated upon said secondary security server interacting with said electronic modules or with said at least one primary security server, and wherein said module certificate is validated upon said electronic module interacting with other of said electronic modules or with said security servers.

13. The system according to claim 11, wherein each of said electronic modules selectively establishes a secure communication channel with another of said electronic modules or with one of said secondary security servers independent of accessing a certificate directory.

14. The system according to claim 11, wherein each of said at least one primary security server has a primary private key and an associated primary public key, and said electronic modules and said secondary security servers store the primary public key for each of said at least one primary security server.

15. The system according to claim 14, wherein each of said electronic modules has a module private key and an associated module public key, each of said secondary security servers has a secondary private key and an associated secondary public key, and wherein said at least one primary security server selectively communicates to said secondary security servers a message to invoke a change in the length of the associated secondary public keys and the associated module public keys.

16. The system according to claim 14, wherein an additional primary security server may be implemented in the system such that the additional primary security server has a second primary public key that may be longer than the length of said primary public keys of the at least one primary security server.

17. The system according to claim 11, wherein upon manufacturing said secondary security servers, the secondary security servers are certified by said at least one primary security server, and wherein upon manufacturing said electronic modules, the electronic modules are certified by said secondary security servers, the certification of said electronic modules being independent of interaction with said at least one primary security server.

18. The system according to claim 11, wherein said module certificates and said security server certificates have expiration times, and wherein said electronic modules are adapted not to transact with other electronic modules or secondary security servers having expired certificates.

19. The system according to claim 11, wherein each of said plurality of electronic modules, said primary security server, and each of said plurality of secondary security servers have a unique identifier indicative of server type or electronic module type.

20. The system according to claim 19, wherein said electronic module type includes a transaction module, a customer service module, a money generator module, and a teller module, and wherein said server type includes said primary security server and said secondary security servers.

21. The system according to claim 19, wherein each said server type and each said electronic module type is associated with a unique range of a type variable, and wherein each said unique identifier maps to a value of said type variable within said unique range assigned to said server type or electronic module type according to a mapping mechanism securely stored in each said electronic module, each said secondary server, and said primary server.

22. The system according to claim 21, wherein each said unique identifier is a unique integer value less than a predetermined prime number, and wherein said value of said type variable is generated according to raising a primitive root of said prime number to a power of said unique identifier under modulo arithmetic over said predetermined prime number, and wherein each of said plurality of electronic modules, said primary security server, and each of said plurality of secondary security servers securely stores said primitive root and said prime number.

23. The system according to claim 11, wherein said primary security server maintains a list of said unique identifiers for bad electronic modules and bad secondary security servers, and wherein said list is provided to said secondary security servers and to said electronic modules.

24. The system according to claim 11, wherein said security server certificate is encrypted by said primary security server, and said module certificate is encrypted by said secondary security server.

25. The system according to claim 24, wherein said security server certificate comprises:
a first and second data field encrypted with the private key of said primary security server, wherein said first data field includes a unique identifier of said secondary security server, a public key of said security server, and an expiration time of said security server certificate, and wherein said second data field includes said first data field digitally signed by said primary security server; and
a third data field including a unique identifier of said primary security server.

26. The system according to claim 25, wherein said unique identifier of said primary security server is encrypted.

27. The system according to claim 24, wherein said module certificate comprises:
a first and second data field encrypted with a secondary security server's private key, wherein said first data field includes a unique identifier of said electronic module, a public key of said electronic module, and an expiration date of said module certificate, and wherein said second data field includes said first data field digitally signed by said secondary security server; and
a third data field including said security server certificate.

28. The system according to claim 21, wherein said primary security server and said secondary security servers share a common symmetric key which is periodically changed using public-key key exchange.

29. The system according to claim 21, wherein said primary security server selectively commands global recertification for said security server certificates and said module certificates.

30. A system, comprising:
a plurality of security servers;
a plurality of tamper-proof electronic modules each having a unique module certificate that is digitally signed by one of said security servers; and
wherein said module certificate is validated upon said electronic module interacting with other of said electronic modules or with said security servers; and
wherein said plurality of security servers selectively command global recertification for said module certificates, requiring every electronic module that interacts with one of said security servers to recertify said module certificate.

31. An electronic module, comprising:
a memory that stores a unique module certificate that is digitally signed by a secondary security server that stores a unique secondary security server certificate that is digitally signed by a primary security server that is precluded from interaction with the electronic module; and a processor operative in validating a unique module certificate of another arbitrary electronic module, independently of interaction with the secondary security server and independently of interaction with the primary security server and independently of interaction with a trusted third party certificate authority and independently of interaction with a key directory external to and accessible by the plurality of tamper-proof electronic modules.

32. The system according to claim 31, wherein said electronic module selectively establishes a secure communication channel with another electronic module or with said secondary security server independent of accessing a certificate directory.

33. A security server system that provides for secure communication between electronic modules that are clients of the security server system, the security server system comprising:

a primary security server;

a plurality of secondary security servers that each stores a unique security server certificate digitally signed by said primary security server, and that digitally sign a unique module certificate for each of a plurality of tamper-proof electronic modules that each have a memory that stores its said unique module certificate that is digitally signed by one of said secondary security servers; and wherein, any arbitrary one of the tamper-proof electronic modules validates the unique module certificate of another arbitrary electronic module, independently of interaction with the plurality of secondary security servers and independently of interaction with the primary security server and independently of interaction with a trusted third party certificate authority and independently of interaction with a key directory external to and accessible by the plurality of tamper-proof electronic modules.

34. The system according to claim 33, wherein each of said electronic modules has a module private key and an associated module public key, each of said secondary security servers has a secondary private key and an associated secondary public key, and wherein said primary security server selectively communicates to said secondary security servers a message to invoke a change in the length of the associated secondary public keys and the associated module public keys.

35. The system according to claim 33, wherein an additional primary security server may be implemented in the system such that the additional primary security server has a second primary public key that may be longer than the length of said primary public keys of the at least one primary security server.

36. The system according to claim 33, wherein said primary security server selectively commands global recertification for said security server certificates and said module certificates.

37. A method for maintaining security in a network with which each of a plurality of electronic modules selectively communicate, each of the electronic modules having a unique module certificate and being capable of selectively communicating or transacting information with another electronic module, said method comprising:

providing at least one primary security server, each primary security server having a public key and an associated private key;

providing a plurality of secondary security servers, each having a respective security certificate digitally signed by one of the primary security server private keys, and wherein said unique module certificate is digitally signed by one of said secondary security servers;

providing a communications hierarchy such that said primary security servers cannot directly communicate or transact information with said electronic modules, and said secondary security servers selectively communicate with at least one of said electronic modules and at least one of said primary security servers;

one or more of said at least one primary security servers maintaining a list that identifies electronic modules and security servers that should be prevented from transacting information with other electronic modules and the secondary security servers, and communicating said list to the other of said primary security servers, said primary security servers communicating said list to said secondary security servers; and communicating said list from a given one of the secondary security servers to a given one of said electronic modules when the given electronic module signs on to said network.

38. The method according to claim 37, wherein said unique module certificate has an expiration time, and further comprising limiting or preventing said electronic modules from transacting information with another electronic module that has an expired module certificate.

39. The method according to claim 38, further comprising requiring electronic modules having expired certificates to sign on to said network in order to obtain recertification.

40. The method according to claim 38, wherein said security certificate has an expiration time, and further comprising limiting or preventing said electronic modules from transacting information with a given said security server that has an expired security certificate.

* * * * *